US012593177B2

(12) United States Patent
Liu

(10) Patent No.: US 12,593,177 B2
(45) Date of Patent: Mar. 31, 2026

(54) CORE, SPEAKER MODULE, AND ELECTRONIC DEVICE

(71) Applicant: Beijing Honor Device Co., Ltd., Beijing (CN)

(72) Inventor: Jinhua Liu, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 131 days.

(21) Appl. No.: 18/574,540

(22) PCT Filed: Jan. 18, 2022

(86) PCT No.: PCT/CN2022/072624
§ 371 (c)(1),
(2) Date: Dec. 27, 2023

(87) PCT Pub. No.: WO2023/273316
PCT Pub. Date: Jan. 5, 2023

(65) Prior Publication Data

US 2024/0323613 A1 Sep. 26, 2024

(30) Foreign Application Priority Data

Jun. 29, 2021 (CN) ......................... 202110723281.3
Aug. 16, 2021 (CN) ......................... 202110938483.X

(51) Int. Cl.
*H04R 9/02* (2006.01)
*H04R 7/04* (2006.01)
(Continued)

(52) U.S. Cl.
CPC ............... *H04R 9/025* (2013.01); *H04R 7/04* (2013.01); *H04R 9/045* (2013.01); *H04R 9/063* (2013.01);
(Continued)

(58) Field of Classification Search
CPC ........ H04R 9/025; H04R 9/045; H04R 9/063; H04R 9/00; H04R 9/06; H04R 9/02;
(Continued)

(56) References Cited

U.S. PATENT DOCUMENTS 8,385,581 B2 2/2013 Li et al.
9,749,742 B2 8/2017 Reining et al.
(Continued)

FOREIGN PATENT DOCUMENTS

CN 201657285 U 11/2010
CN 107852549 A 3/2018
(Continued)

*Primary Examiner* — Ahmad F. Matar
*Assistant Examiner* — Sabrina Diaz
(74) *Attorney, Agent, or Firm* — WOMBLE BOND DICKINSON (US) LLP

(57) ABSTRACT

This application relates to the technical field of electronic devices, and provides a core, a speaker module, and an electronic device, to balance thinning and audio performance of the device. The core includes a diaphragm assembly, a first voice coil set, a second voice coil set, and a magnetic circuit system. The first voice coil set and the second voice coil set are fastened to the diaphragm assembly. The magnetic circuit system includes a magnet assembly. The magnet assembly includes a first central magnet, a second central magnet, and a side magnet. A magnetization direction of the second central magnet is the same as a magnetization direction of the first central magnet. The core provided in embodiments of this application is configured to convert an audio electrical signal into sound.

20 Claims, 33 Drawing Sheets

(51) Int. Cl.
*H04R 9/04* (2006.01)
*H04R 9/06* (2006.01)
*H04R 1/02* (2006.01)

(52) U.S. Cl.
CPC .......... *H04R 1/021* (2013.01); *H04R 2400/11* (2013.01); *H04R 2499/15* (2013.01)

(58) Field of Classification Search
CPC ...... H04R 7/04; H04R 1/021; H04R 2400/11; H04R 2499/11; H04R 2499/15
USPC ................................ 381/412, 401, 421, 420
See application file for complete search history.

(56) References Cited

U.S. PATENT DOCUMENTS

| | | | | |
|---|---|---|---|---|
| 11,516,590 | B2 | 11/2022 | Yan et al. | |
| 2015/0023506 | A1* | 1/2015 | Jansson | H04R 3/12 381/17 |
| 2016/0261966 | A1* | 9/2016 | Won | H04R 9/046 |
| 2016/0277842 | A1* | 9/2016 | Daley | H04R 9/06 |
| 2020/0045451 | A1 | 2/2020 | Zhang et al. | |
| 2022/0417666 | A1 | 12/2022 | Liu et al. | |

FOREIGN PATENT DOCUMENTS

| | | | | | |
|---|---|---|---|---|---|
| CN | 108513232 | A | | 9/2018 | |
| CN | 208258071 | U | | 12/2018 | |
| CN | 209002209 | U | | 6/2019 | |
| CN | 110418251 | A | | 11/2019 | |
| CN | 110418260 | A | | 11/2019 | |
| CN | 111698615 | A | | 9/2020 | |
| CN | 111698617 | A | | 9/2020 | |
| CN | 112312285 | A | | 2/2021 | |
| CN | 112383853 | A | | 2/2021 | |
| CN | 212727396 | U | * | 3/2021 | H04R 9/02 |
| CN | 112866880 | A | | 5/2021 | |
| WO | 2021115031 | A1 | | 6/2021 | |

* cited by examiner

B-B

603

C-C

21

D-D

A

F-F

H-H

J-J

M-M

N-N

CORE, SPEAKER MODULE, AND ELECTRONIC DEVICE

CROSS-REFERECNE TO RELATED APPLICATIONS

This application is a national stage of International Application No. PCT/CN2022/072624, filed on Jan. 18, 2022, which claims priority to Chinese Patent Application No. 202110723281.3, filed on Jun. 29, 2021, and Chinese Patent Application No. 202110938483.X, filed on Aug. 16, 2021. The disclosures of each of the aforementioned applications are hereby incorporated by reference in their entireties.

TECHNICAL FIELD

This application relates to the technical field of electronic devices, and in particular to a core, a speaker module, and an electronic device.

BACKGROUND

At present, electronic devices such as a personal computer (personal computer, PC), a tablet, and a mobile phone are to be designed increasingly thin to meet consumption requirements. In addition, with a higher consumption requirement, these electronic devices are also to achieve better sound effect experience. For an electronic device in the conventional technology, a thinner speaker module is to be designed to implement lightweight design, but a thicker speaker module is to be designed to achieve a larger vibration amplitude, to achieve better sound effect experience. Therefore, thinness and audio performance cannot be balanced for the electronic devices in the conventional technology.

SUMMARY

Embodiments of this application provide a core, a speaker module, and an electronic device, to balance thinning and audio performance of a device.

To achieve the foregoing objective, the following technical solutions are used in the embodiments of this application.

According to a first aspect, some embodiments of this application provide a core. The core includes a diaphragm assembly, a first voice coil set, a second voice coil set, and a magnetic circuit system. The first voice coil set, the second voice coil set, and the magnetic circuit system are located on a same side of the diaphragm assembly, and the first voice coil set and the second voice coil set are fastened to the diaphragm assembly. The magnetic circuit system includes a magnet assembly. The magnet assembly includes a first central magnet, a second central magnet, and a side magnet. The first central magnet is disposed to be spaced apart from the second central magnet. The side magnet is circumferentially disposed around a central magnet set including the first central magnet and the second central magnet. A magnetization direction of the second central magnet is the same as a magnetization direction of the first central magnet. A magnetization direction of the side magnet is opposite to the magnetization direction of the first central magnet. An inner magnetically conductive part is disposed in a gap between the first central magnet and the second central magnet. A first annular magnetic gap is formed between the side magnet, the inner magnetically conductive part, and the first central magnet. A second annular magnetic gap is formed between the side magnet, the inner magnetically conductive part, and the second central magnet. At least a part of the first voice coil set extends into the first annular magnetic gap. At least a part of the second voice coil set extends into the second annular magnetic gap. The first voice coil set and the second voice coil set cooperate with the magnetic circuit system to synchronously drive the diaphragm assembly to vibrate.

For the core provided in this application, designing two voice coils enables the number of turns of voice coils to be far greater than the number of turns of a single voice coil, and a winding length of the voice coils to be longer. As the winding length L of the voice coils is increased, a corresponding power conversion coefficient BL is greater, and a driving force BLi of a speaker module is greater. In addition, on the premise that the driving force remains unchanged, a thickness of a voice coil set and a thickness of the magnetic circuit system may be reduced, to implement a thinning design of the core. Therefore, thinning and audio performance can be balanced to some extent for the core provided in this application. In addition, driven by two voice coils, follow performance of parts of the diaphragm is good. This can not only meet a low frequency requirement, but also meet a high frequency requirement. Therefore, a high-frequency speaker module is not to be disposed in the electronic device. This can simplify a structure of the electronic device. In addition, voice coil mass Mms of the two voice coils is relatively large, and a BL of a multi-path magnetic circuit and the two voice coils are relatively large, to enable the speaker module to have a lower Fo and a larger amplitude. Therefore, better low-frequency performance and low-frequency sensitivity are obtained, a capability of playing sound on speaker is increased by 2 dB to 3 dB, greatly improving effect of playing sound on speaker.

In a possible implementation of the first aspect, the magnet assembly further includes an inner magnet. The inner magnet is disposed in a gap between the first central magnet and the second central magnet. The inner magnet forms an inner magnetically conductive part. The inner magnet is magnetic, and can improve a magnetic field strength of a magnetic loop, to increase a driving force.

In a possible implementation of the first aspect, the side magnet includes a first side magnet, a second side magnet, a third side magnet, and a fourth side magnet. The first side magnet and the second side magnet are respectively disposed on two opposite sides of the central magnet set. An arrangement direction of the first side magnet and the second side magnet is the same as an arrangement direction of the first central magnet and the second central magnet in the central magnet set. The third side magnet and the fourth side magnet are respectively disposed on the other two opposite sides of the central magnet set. An arrangement direction of the third side magnet and the fourth side magnet is perpendicular to an arrangement direction of the first central magnet and the second central magnet in the central magnet set. The side magnets are laid out properly and have a proper quantity, which can reduce structural complexity of the magnetic circuit system while ensuring a magnetic field strength.

In a possible implementation of the first aspect, the inner magnet is located between the third side magnet and the fourth side magnet. The inner magnet includes a first inner magnet segment and a second inner magnet segment. The first inner magnet segment is disposed close to the third side magnet and integrally formed with the third side magnet. The second inner magnet segment is disposed close to the fourth side magnet and integrally formed with the fourth side magnet. In this way, the magnet assembly includes a relatively small quantity of magnets. This helps to reduce structure composition complexity of the magnet assembly.

In a possible implementation of the first aspect, the inner magnet is integrally formed with the third side magnet and the fourth side magnet. In this way, the magnet assembly includes a relatively small quantity of magnets. This helps to reduce structure composition complexity of the magnet assembly.

In a possible implementation of the first aspect, the magnetic circuit system further includes a first magnetically conductive yoke and a second magnetically conductive yoke. The first magnetically conductive yoke is disposed on a surface, close to the diaphragm assembly, of the magnet assembly. The second magnetically conductive yoke is disposed on a surface, away from the diaphragm assembly, of the magnet assembly. The first magnetically conductive yoke is magnetically connected to the second magnetically conductive yoke in a gap between the first central magnet and the second central magnet to form the inner magnetically conductive part. This structure is simple and easy to implement.

In a possible implementation of the first aspect, the first magnetically conductive yoke includes a first central magnetically conductive yoke, a second central magnetically conductive yoke, an edge magnetically conductive yoke, and an inner magnetically conductive yoke. The first central magnetically conductive yoke is disposed on a surface, close to the diaphragm assembly, of the first central magnet. The second central magnetically conductive yoke is disposed on a surface, close to the diaphragm assembly, of the second central magnet. The edge magnetically conductive yoke is disposed on a surface, close to the diaphragm assembly, of the side magnet. The inner magnetically conductive yoke is disposed between the first central magnetically conductive yoke and the second central magnetically conductive yoke. The inner magnetically conductive yoke is magnetically connected to the second magnetically conductive yoke in a gap between the first central magnet and the second central magnet to form the inner magnetically conductive part. This structure is simple and easy to implement.

In a possible implementation of the first aspect, the magnet assembly further includes an intermediate magnetically conductive yoke. The intermediate magnetically conductive yoke is disposed in the gap between the first central magnet and the second central magnet. A surface, close to the diaphragm assembly, of the intermediate magnetically conductive yoke is in magnetic contact with the inner magnetically conductive yoke. A surface, away from the diaphragm assembly, of the intermediate magnetically conductive yoke is in magnetic contact with the second magnetically conductive yoke. The intermediate magnetically conductive yoke forms the inner magnetically conductive part. The inner magnetically conductive yoke is made of a magnetically conductive material such as yoke iron. The yoke iron has good toughness and is easy to process and form. Therefore, the yoke iron can replace the inner magnet for use in a small-sized core.

In a possible implementation of the first aspect, the inner magnetically conductive yoke includes a first protruding part that protrudes in a direction close to the second magnetically conductive yoke. The first protruding part is in magnetic contact with the second magnetically conductive yoke. The first protruding part forms the inner magnetically conductive part. The inner magnetically conductive yoke is made of a magnetically conductive material such as yoke iron. The yoke iron has good toughness and is easy to process and form. Therefore, a protruding part can be formed, to be magnetically connected to the second magnetically conductive yoke. In some embodiments, the first protruding part is molded by stamping. In this way, structure composition complexity of the magnetic circuit system is relatively low, and costs are relatively small.

In a possible implementation of the first aspect, the second magnetically conductive yoke includes a second protruding part that protrudes in a direction close to the inner magnetically conductive yoke. The second protruding part is in magnetic contact with the inner magnetically conductive yoke. The second protruding part forms the inner magnetically conductive part. The second magnetically conductive yoke is made of a magnetically conductive material such as yoke iron. The yoke iron has good toughness and is easy to process and form. Therefore, a protruding part can be formed, to be magnetically connected to the inner magnetically conductive yoke. In some embodiments, the second protruding part is molded by stamping. In this way, structure composition complexity of the magnetic circuit system is relatively low, and costs are relatively small.

In a possible implementation of the first aspect, the inner magnetically conductive yoke includes a first protruding part that protrudes in a direction close to the second magnetically conductive yoke. The second magnetically conductive yoke includes a second protruding part that protrudes in a direction close to the inner magnetically conductive yoke. The first protruding part is in magnetic contact with the second protruding part. The first protruding part and the second protruding part form the inner magnetically conductive part. In this way, a protruding height of the first protruding part and the second protruding part may be reduced. When the first protruding part and the second protruding part are molded by stamping, a yield of molding is relatively high.

In a possible implementation of the first aspect, the first voice coil set includes a first voice coil and a first voice coil former connected between the diaphragm assembly and the first voice coil, and the second voice coil set includes a second voice coil and a second voice coil former connected between the diaphragm assembly and the second voice coil. The first voice coil former and the first voice coil former are respectively configured to adjust a height of the first voice coil and a height of the first voice coil, to adjust the first voice coil and the first voice coil into the magnetic circuit system while ensuring vibration space of the diaphragm assembly. Based on this, a material with a low density and a high structural strength may be selected for the first voice coil former and the second voice coil former, such as aluminum alloy or magnesium-aluminum alloy, to reduce a load of the magnetic circuit system.

In a possible implementation of the first aspect, the first voice coil former includes a first support part and two second support parts. The first support part is disposed between the diaphragm assembly and the first voice coil. The second voice coil former includes a third support part and two fourth support parts. The third support part is disposed between the diaphragm assembly and the second voice coil. The two second support parts are respectively disposed at two corners, away from the third support part, of the first support part. A positive electrode and a negative electrode of the first voice coil are respectively led out from parts, adjacent to the two corners, of the first voice coil. It may also be considered that the two second support parts and the positive electrode and the negative electrode of the first voice coil are respectively located at two corners, away from the second voice coil set, of the first voice coil set. The two fourth support parts are respectively disposed at two corners, away from the first support part, of the third support part. A positive electrode and a negative electrode of the second voice coil are respectively led out from parts, adjacent to the two corners, of the second voice coil. It may also be considered that the two fourth support parts and the positive electrode and the negative electrode of the second voice coil are respectively located at two corners, away from the first voice coil set, of the second voice coil set.

In a possible implementation of the first aspect, the second support part includes a first outward extension unit, a first connection unit, and a second outward extension unit. The first outward extension unit extends from an outer edge of the first support part to a direction away from a central axis of the first support part. The first connection unit extends from an outer end of the first outward extension unit to a side, away from a top surface, of a bottom surface of the first support part. The outer end of the first outward extension unit means an end, away from the central axis of the first support part, of the first outward extension unit. The second outward extension unit extends from one end, away from the first support part, of the first connection unit to a direction away from the central axis of the first support part. In this way, a section of the second support part is of a "right-angled zigzag"-shaped structure. In some other embodiments, the section of the second support part may also be of a "right-angled horizontal U"-shaped structure, an "L"-shaped structure, or an "I"-shaped structure. This structure is simple and easy to implement.

In a possible implementation of the first aspect, the fourth support part includes a third outward extension unit, a second connection unit, and a fourth outward extension unit. The third outward extension unit extends from an outer edge of the third support part to a direction away from a central axis of the third support part. The second connection unit extends from an outer end of the third outward extension unit to a side, away from a top surface, of a bottom surface of the third support part. The outer end of the third outward extension unit means an end, away from the central axis of the third support part, of the third outward extension unit. The fourth outward extension unit extends from one end, away from the third support part, of the second connection unit to a direction away from the central axis of the third support part. In this way, a section of the fourth support part is of a "right-angled zigzag"-shaped structure. In some other embodiments, a section of the fourth support part 2322 may also be of a "right-angled horizontal U"-shaped structure, an "L"-shaped structure, or an "I"-shaped structure. This structure is simple and easy to implement.

In a possible implementation of the first aspect, the core further includes a basket. The first voice coil set and the second voice coil set are located in the basket. The core further includes a second electrical connection structure. The second electrical connection structure includes a first electrical connection unit and a second electrical connection unit. The first electrical connection unit is connected between a positive electrode of the first voice coil set, a negative electrode of the first voice coil set, and the basket. The second electrical connection unit is connected between a positive electrode of the second voice coil, a negative electrode of the second voice coil, and the basket. In this way, electrodes of the first voice coil set and electrodes of the second voice coil set are respectively led out by using the first electrical connection unit and the second electrical connection unit, and a layout is proper.

In a possible implementation of the first aspect, the basket includes a first side and a second side that are opposite to each other. The first voice coil set is located between the first edge and the second voice coil set. The second voice coil set is located between the first voice coil set and the second edge. The first electrical connection unit is connected between the positive electrode of the first voice coil set, the negative electrode of the first voice coil set, and the first side. The second electrical connection unit is connected between the positive electrode of the second voice coil set, the negative electrode of the second voice coil set, and the second side. In this way, a connection path between the first electrical connection unit and the second electrical connection unit is relatively short, and a volume may be manufactured to be relatively small. This helps to reduce costs for the core.

In a possible implementation of the first aspect, the positive electrode and the negative electrode of the first voice coil set are respectively located at two corners, away from the second voice coil set, of the first voice coil set, and the positive electrode and the negative electrode of the second voice coil set are respectively located at two corners, away from the first voice coil set, of the second voice coil set. In this way, the connection path between the first electrical connection unit and the second electrical connection unit is further shortened, and a volume of the second electrical connection structure is reduced.

In a possible implementation of the first aspect, the first electrical connection unit includes two first ends and two second ends. The two first ends of the first electrical connection unit are respectively connected to a positive electrode and negative electrode of the first voice coil set. The two second ends of the first electrical connection unit are fastened to the basket. In the first electrical connection unit, the two first ends of the first electrical connection unit are respectively electrically connected to the two second ends of the first electrical connection unit. The second electrical connection unit includes two first ends. The two first ends of the second electrical connection unit are respectively connected to a positive electrode and negative electrode of the second voice coil set. The two second ends of the second electrical connection unit are fastened to the basket. In the second electrical connection unit, the two first ends of the second electrical connection unit are respectively electrically connected to the two second ends of the second electrical connection unit. In this way, four external terminals of the core are formed.

In a possible implementation of the first aspect, the second electrical connection structure further includes an electrical connection segment. The electrical connection segment electrically connects one second end of the first electrical connection unit to one second end of the second electrical connection unit. In this way, the first voice coil set and second voice coil set are connected in series through the electrical connection segment, to enable the core to be externally connected through two external terminals. This reduces the number of external terminals of the core.

In a possible implementation of the first aspect, the core further includes a basket. The first voice coil set and the second voice coil set are located in the basket. The core further includes a second electrical connection structure. The second electrical connection structure includes a first electrical connection unit and a second electrical connection unit. The first electrical connection unit is connected between one electrode of the first voice coil set, one electrode of the second voice coil set, and the basket. The second electrical connection unit is connected between the other electrode of the first voice coil set, the other electrode of the second voice coil set, and the basket. The electrode of the first voice coil set is one of a positive electrode and a negative electrode, and the other electrode of the first voice coil set is the other of the positive electrode and the negative electrode. The electrode of the second voice coil set is one of a positive electrode and a negative electrode, and the other electrode of the second voice coil set is the other of the positive electrode and the negative electrode.

In a possible implementation of the first aspect, the basket includes a first side and a second side that are opposite to each other. An arrangement direction of the first voice coil set and the second voice coil set is the same as an extension direction of the first side or the second side. Two corners, away from the second voice coil set, of the first voice coil set are respectively a first corner and a second corner. The first corner is located between the first side and the second corner. The second corner is located between the first corner and the second side. The electrode of the first voice coil set is located at the first corner, and the other electrode of the first voice coil set is located at the second corner. Two corners, away from the first voice coil set, of the second voice coil set are respectively a third corner and a fourth corner. The third corner is located between the first side and the fourth corner. The fourth corner is located between the third corner and the second side. The electrode of the second voice coil set is located at the third corner, and the other electrode of the second voice coil set is located at the fourth corner. In this way, a distance between the first corner or the third corner and the first side is relatively short, and a distance between the second corner or the fourth corner and the second short side is relatively short. This shortens a connection path between the first electrical connection unit and the second electrical connection unit and reduces a volume of the second electrical connection structure.

In a possible implementation of the first aspect, the first electrical connection unit includes two first ends and two second ends. The two first ends of the first electrical connection unit are respectively connected to the electrode of the first voice coil set and the electrode of the second voice coil set. The two second ends of the first electrical connection unit are connected to the basket. In the first electrical connection unit, the two first ends of the first electrical connection unit are respectively electrically connected to the two second ends of the first electrical connection unit. The second electrical connection unit includes two first ends. The two first ends of the second electrical connection unit are respectively connected to the other electrode of the first voice coil set and the other electrode of the second voice coil set. In addition, the second electrical connection unit electrically connects the two first ends of the second electrical connection unit. In this way, the first voice coil set and the second voice coil set are connected in series through the second electrical connection unit, and two external terminals of the core may be formed only by using the two second ends of the first electrical connection unit. This enables a quantity of external terminals of the core to be small and facilitates external connection.

In a possible implementation of the first aspect, the basket is rectangularly frame-shaped. The basket includes a first short side and a second short side that are opposite to each other. The first short side forms a first side. The second short side forms a second side. In this way, a volume of the first electrical connection unit and a volume of the second electrical connection unit may be further reduced.

In a possible implementation of the first aspect, the basket further includes a first long side and a second long side that are opposite to each other. The first long side and the second long side respectively form the first side and the second side.

In a possible implementation of the first aspect, the diaphragm assembly includes a dome. The dome is rectangularly plate-shaped. The first voice coil set and the second voice coil set are fastened to the dome, and the first voice coil set and the second voice coil set are arranged in a length direction of the dome. This structure is simple, and layout space of an inner magnetically conductive part is large. The inner magnetically conductive part may be formed by using an inner magnet, to increase a magnetic field strength of the magnetic circuit system.

In a possible implementation of the first aspect, the diaphragm assembly includes a dome. The dome is rectangularly plate-shaped. The first voice coil set and the second voice coil set are fastened to the dome, and the first voice coil set and the second voice coil set are arranged in a width direction of the dome. In this way, a sectional width of the dome in a symmetrical plane between the first voice coil set and the second voice coil set is relatively large, and a strength is relatively high. When the first voice coil set and the second voice coil set are in a process of driving the diaphragm assembly, the dome is hardly broken when the first voice coil set and the second voice coil set cannot move synchronously due to an error.

In a possible implementation of the first aspect, each of the first electrical connection unit and the second electrical connection unit includes a body, a first branch, and a second branch. The body includes a central part and two second ends located on two opposite sides of the central part. The first branch includes a head end, one first end, and a connection segment connected between the head end and the first end. The second branch includes a head end, the other first end, and a connection segment connected between the head end and the other first end. Both the head end of the first branch and the head end of the second branch are connected to the central part of the body. For example, both the head end of the first branch is connected to the head end of the second branch, and the head end of the first branch and the head end of the second branch are spliced, and then connected to the central part of the body. In some other embodiments, the head end of the first branch and the head end of the second branch are respectively connected to different positions at the central part of the body, and a gap is formed between the head end of the first branch and the head end of the second branch. The two first ends are spaced apart, and are spaced apart from the body. The two first ends are movable ends, and may move relative to the body. When a force is applied to the two first ends, to enable the two first ends to move relative to the body, the connection segment of the first branch may be driven to move relative to the body and the connection segment of the second branch. This may prevent the first electrical connection unit from hindering movement of the first voice coil set.

In a possible implementation of the first aspect, the core further includes four auxiliary diaphragms. Each auxiliary diaphragm includes a first fastening part, a bent annular part, and a second fastening part that are sequentially connected. The first fastening part is located on an inner side of the bent annular part. The second fastening part is located on an outer side of the bent annular part. A sectional shape of the bent annular part is arc-shaped or approximately arc-shaped, and an extension track of the bent annular part is arc-shaped. The bent annular part is concave. When an external force is applied to the bent annular part, deformation can occur. This enables the first fastening part and the second fastening part to vibrate relative to each other. First fastening parts of the two auxiliary diaphragms are fastened to ends, away from the diaphragm assembly, of the first voice coil set, and first fastening parts of the other two auxiliary diaphragms are fastened to ends, away from the diaphragm assembly, of the second voice coil set. The second fastening parts of the four auxiliary diaphragms are all fastened to the basket. In this way, ends, away from the diaphragm assembly, of the voice coil sets (including the first voice coil set and the second voice coil set) are supported on the basket by using the four auxiliary diaphragms. This can enable the voice coil sets to be back in position, prevent the voice coil sets from vibrating during operation, and prevent generation of rolling vibration.

In a possible implementation of the first aspect, both the bent annular part of the auxiliary diaphragm and a bent annular part of a diaphragm in the diaphragm assembly are concave. In this way, during vibration of the voice coil set, a deformation direction of the bent annular part of the diaphragm in the diaphragm assembly is the same as a deformation direction of the bent annular part of the auxiliary diaphragm. This may better suppress swinging of the voice coil set. In some other parallel embodiments that produce same effect, both the bent annular part of the diaphragm in the diaphragm assembly and the bent annular part of the auxiliary diaphragm are convex.

In a possible implementation of the first aspect, central axes of the bent annular parts of the four auxiliary diaphragms are respectively collinear with central axes of four rounded corners of the bent annular parts in the diaphragm. In this way, a resistance force of the diaphragm and the auxiliary diaphragm to the voice coil set may be reduced, to ensure smooth vibration of the voice coil set.

In a possible implementation of the first aspect, radii of the bent annular parts of the four auxiliary diaphragms may be respectively equal to or different from radii of the four rounded corners of the bent annular parts in the diaphragm.

According to a second aspect, some embodiments of this application provide a speaker module. The speaker module includes a housing and the core described in any one of the foregoing technical solutions. The core is disposed in the housing, and the housing is separated by a diaphragm assembly of the core into a front cavity and a rear cavity. A first voice coil set, a second voice coil set, and a magnetic circuit system of the core are located in the rear cavity. A sound output channel is disposed at the housing, and the front cavity is connected to the sound output channel.

Because the speaker module provided in the embodiments of this application includes the core described in any one of the foregoing technical solutions, by using the speaker module or the core, a same technical problem can be resolved, and same effect can be achieved.

According to a third aspect, some embodiments of this application provide an electronic device. The electronic device includes an external housing, a main board, and the speaker module described in the foregoing technical solution. The main board and the speaker module are disposed in the external housing, the speaker module is electrically connected to the main board, a sound output hole is provided at the external housing, and a sound output channel is connected to the sound output hole.

Because the electronic device provided in some embodiments of this application includes the speaker module described in the foregoing technical solutions, audio performance of the electronic device can be improved while a thinning design of the electronic device is met.

DESCRIPTION OF EMBODIMENTS

In embodiments of this application, terms "first", "second", "third", and "fourth" are used merely for the purpose of description, and shall not be construed as indicating or implying relative importance or implying a quantity of indicated technical features. Therefore, a feature limited by "first", "second", "third", and "fourth" may explicitly or implicitly include one or more features.

In the embodiments of this application, the term "include", "have", or any other variant thereof is intended to cover non-exclusive inclusion, so that a process, a method, an article, or an apparatus that includes a series of elements includes not only those elements but also other elements that are not explicitly listed, or includes elements inherent to such process, method, article, or apparatus. In absence of more constraints, an element preceded by "includes a . . . " does not preclude the existence of other identical elements in the process, method, article, or apparatus that includes the element.

In the embodiments of this application, "and/or" indicates merely an association relationship for describing associated objects and represents the presence of three relationships. For example, A and/or B may represent the presence of three cases: only A, both A and B, and only B. In addition, the character "/" in this specification generally indicates an "or" relationship between the associated objects.

This application provides an electronic device. T the electronic device is an electronic device that has a sound play function. Specifically, the electronic device includes but is not limited to a mobile phone, a tablet personal computer (tablet personal computer), a laptop computer (laptop computer), a personal digital assistant (personal digital assistant, PDA), a personal computer, a notebook computer, an in-vehicle device, a wearable device, a personal stereo, a radio, or the like. The wearable device includes but is not limited to a smart band, a smart watch, a smart head-mounted display, smart glasses, or the like.

Figure 1:
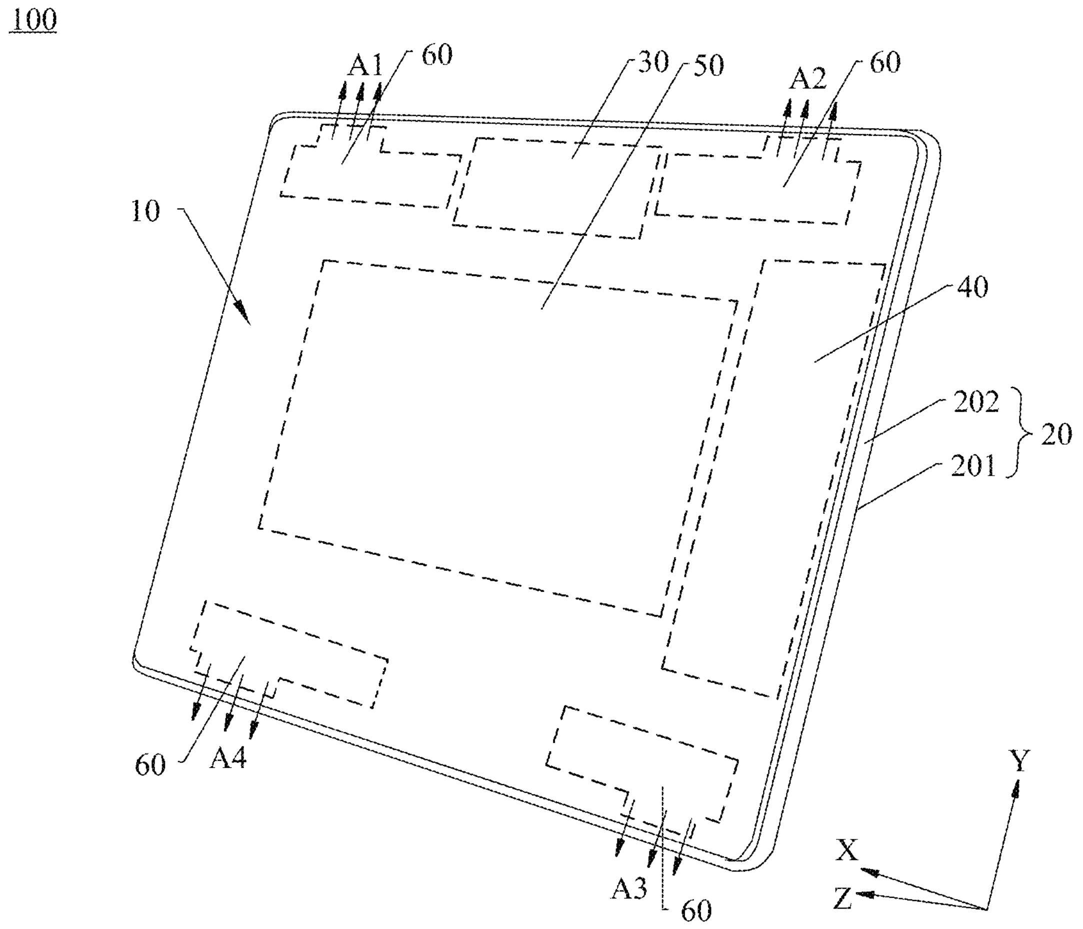
FIG. 1 is a three-dimensional view of an electronic device according to some embodiments of this application.

FIG. 1 is a three-dimensional view of an electronic device 100 according to some embodiments of this application. The electronic device 100 shown in FIG. 1 is described by using a tablet computer as an example. In the example, the electronic device 100 includes a screen 10, a back housing 20, a main control board 30, an interface main board 40, a battery 50, and a speaker module 60. The main control board 30, the interface main board 40, the battery 50, and the speaker module 60 are located inside the electronic device 100. Therefore, dashed lines are used to show outlines.

It may be understood that FIG. 1 and the following related drawings show only some components included in the electronic device 100. Actual shapes, actual sizes, actual positions, and actual constructions of these components are not limited by FIG. 1 and the following accompanying drawings. In addition, when the electronic device 100 is a device of some other shapes, the electronic device 100 may not include the screen 10, the interface main board 40, and the battery 50.

In the embodiments shown in FIG. 1, the electronic device 100 is rectangularly flat plate-shaped. To facilitate description of the following embodiments, an XYZ coordinate system is established. Specifically, it is specified that a length direction of the electronic device 100 is an X-axis direction, a width direction of the electronic device 100 is a Y-axis direction, and a thickness direction of the electronic device 100 is a Z-axis direction. It may be understood that the coordinate system of the electronic device 100 may be flexibly set based on an actual requirement, which is not specifically limited herein. In some other embodiments, the electronic device 100 may also be of a squarely flat plate shape, a circularly flat plate shape, an ovally flat plate shape, or the like.

The screen 10 is used to display an image, a video, and the like. The screen 10 includes a transparent cover plate and a display screen (a panel, also referred to as a display panel). The transparent cover plate is laminated with the display screen, and is fastened by adhesive or the like. The transparent cover plate is mainly used to protect the display screen and prevent dust. A material of the transparent cover plate includes but is not limited to glass. The display screen may be a flexible display screen, or may be a rigid display screen. For example, the flexible display screen may be an organic light-emitting diode (organic light-emitting diode, OLED) display screen, an active-matrix organic light-emitting diode (active-matrix organic light-emitting diode, AMOLED) display screen, a mini light-emitting diode (mini organic light-emitting diode) display screen, a micro light-emitting diode (micro organic light-emitting diode) display screen, a micro organic light-emitting diode (micro organic light-emitting diode) display screen, a quantum dot light-emitting diode (quantum dot light-emitting diodes, QLED) display screen, a liquid crystal display (liquid crystal display, LCD) screen, or the like.

The back housing 20 forms an external housing of the electronic device 100. The back housing 20 is configured to protect an inner electronic component of the electronic device 100. A material of the back housing 20 includes but is not limited to metal, ceramic, plastic, and glass. To implement lightness and thinning of the electronic device 100 and ensure structural strength of the back housing 20, a material of the back housing 20 may be metal. The back housing 20 includes a back cover 201 and a frame 202. The back cover 201 is located on a side, away from the transparent cover plate, of the display screen and is laminated with the transparent cover plate and the display screen. The frame 202 is located between the back cover 201 and the transparent cover plate, and the frame 202 is fastened to the back cover 201. For example, the frame 202 may be fastened to the back cover 201 by adhesive. The frame 202 and the back cover 201 may also be integrated to form a structure. In other words, the frame 202 and the back cover 201 are an integral structure. The transparent cover plate is fastened to the frame 202. In some embodiments, the transparent cover plate may be fastened to the frame 202 by adhesive. The transparent cover plate, the back cover 201, and the frame 202 enclose inner accommodating space of the electronic device 100. The inner accommodating space accommodates the display screen, the main control board 30, the interface main board 40, the battery 50, and the speaker module 60.

In an inner accommodating cavity of the electronic device 100, the main control board 30, the interface main board 40, the battery 50, and the speaker module 60 may be fastened to an inner surface of the back cover 201, or may be fastened to a surface, close to the back cover 201, of the screen 10.

The main control board 30 is configured to integrate a main control chip. The main control chip may be, for example, an application processor (application processor, AP), a double data rate (double data rate, DDR), a universal flash storage (universal flash storage, UFS), and the like. In some embodiments, the main control board 30 is electrically connected to the screen 10, and the main control board 30 is configured to control the screen 10 to display an image or a video.

The main control board 30 may be a rigid circuit board, a flexible circuit board, or a rigid-flexible combined circuit board. The main control board 30 may be an FR-4 dielectric board, a Rogers (Rogers) dielectric board, an FR-4-Rogers mixed dielectric board, or the like. Herein, FR-4 is a grade designation for a flame-retardant material, and the Rogers dielectric plate is a high frequency plate.

The interface main board 40 is integrated with a universal serial bus (universal serial bus, USB) component. The USB component may be a USB Type-C interface component, a USB Type-A interface component, a USB Type Micro-B interface component, or a USB Type-B interface component. A socket 70 is disposed at a position, corresponding to the USB component, on the frame 202, and accessories such as a charger, earphones, and a data cable may be electrically connected to the USB component by using the socket 70, to implement power supply transmission, signal transmission, and data transmission.

The interface main board 40 may be a rigid circuit board, a flexible circuit board, or a rigid-flexible combined circuit board. The interface main board 40 may be an FR-4 dielectric board, a Rogers (Rogers) dielectric board, an FR-4-Rogers mixed dielectric board, or the like.

In addition to the main control board 30 and the interface main board 40, the electronic device 100 may further include an antenna main board (not shown in the figure). The antenna main board is integrated with components such as an antenna and a transceiver. The antenna is configured to transmit and receive an electromagnetic wave signal. The antenna includes but is not limited to a wireless local area network (wireless local area networks, WLAN) (such as a wireless fidelity (wireless fidelity, Wi-Fi) network) antenna, a Bluetooth (Bluetooth, BT) antenna, a global navigation satellite system (global navigation satellite system, GNSS) antenna, or a near field communication (near field communication, NFC) antenna. The transceiver is configured to transmit and receive an antenna signal. In some other embodiments, the antenna may be independent of the antenna main board. For example, when the frame 202 or the back cover 201 of the tablet computer is a conductive structure, the antenna may further be formed of a part of a frame or a part of the back cover. In this way, the antenna is formed on the frame 202 or the back cover 201.

The main control board 30 is electrically connected to the interface main board 40, and the main control board 30 is electrically connected to the antenna main board, to implement signal transmission and data transmission between the main control board 30 and the interface main board 40 and between the main control board 30 and the antenna main board. In some embodiments, the main control board 30 is electrically connected to the interface main board 40 by using a flexible printed circuit board (flexible printed circuit board, FPC), and the main control board 30 is electrically connected to the antenna main board by using a flexible printed circuit board. In addition, a conducting wire or a varnished wire may alternatively be used for electric connection between the main control board 30 and the interface main board 40 and between the main control board 30 and the antenna main board. In some other embodiments, the three main boards may be integrated into one. In other words, the three main boards are a same main board.

The battery 50 is located in a middle region of inner accommodating space of the electronic device 100. The battery 50 is configured to supply power to electronic components such as the display screen, the main control board 30, the interface main board 40, and the antenna main board in the electronic device 100.

The speaker module 60 is electrically connected to at least one of the main control board 30, the interface main board 40, and the antenna main board, to obtain an audio electrical signal such as music or a voice. The speaker module 60 is configured to restore the audio electrical signal to a voice, and can support a function of playing sound on speaker. There may be one or more speaker modules 60. As there are more speaker modules 60, better performance of sound playing on speaker and better sound effect are achieved. In the embodiment shown in FIG. 1, there are four speaker modules 60. The four speaker modules are respectively disposed close to four corners of edges of the tablet computer. In addition, the four speaker modules 60 outputs sound in a direction A1, a direction A2, a direction A3, and a direction A4 respectively. A sound output hole (not shown in the figure) is formed in a region on the frame 202 in a sound output direction. Sound may be transmitted to an outside of the electronic device 100 by using the sound output hole.

In this embodiment, the speaker module 60 may be used as a low-frequency speaker, an intermediate-frequency speaker, or a high-frequency speaker, or may be alternatively used as the low-frequency speaker, the intermediate-frequency speaker, and the high-frequency speaker simultaneously.

Figure 2:
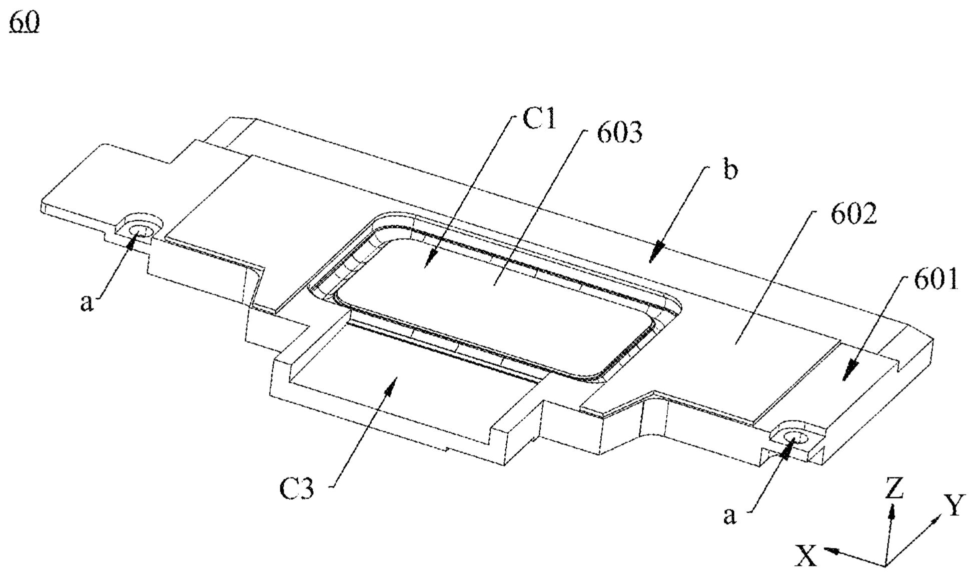
FIG. 2 is a three-dimensional view of a speaker module in the electronic device shown in FIG. 1.
Figure 3:
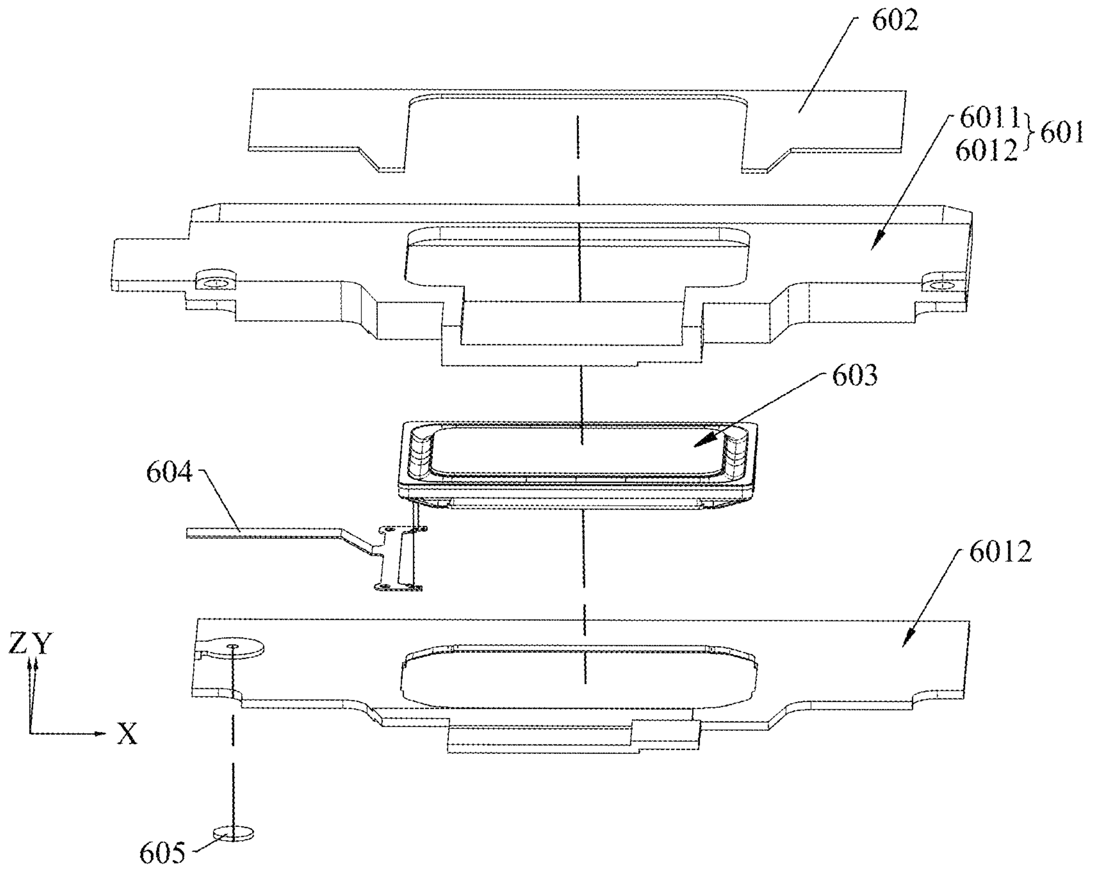
FIG. 3 is an exploded view of the speaker module shown in FIG. 2.

Refer to FIG. 2 and FIG. 3. FIG. 2 is a three-dimensional view of a speaker module 60 in the electronic device 100 shown in FIG. 1. FIG. 3 is an exploded view of the speaker module 60 shown in FIG. 2. In this embodiment, the speaker module 60 includes a housing 601, a sealing structure 602, a core 603, a first electrical connection structure 604, and a sealing cover 605.

It should be noted that FIG. 2 and FIG. 3 show only an example of some components included in the speaker module 60. Actual shapes, actual sizes, actual positions, and actual constructions of these components are not limited by FIG. 2 and FIG. 3. In addition, a coordinate system in FIG. 2 and a coordinate system in FIG. 1 are represented as a same coordinate system. To be specific, an azimuth relationship between components in the speaker module 60 in FIG. 2 in the coordinate system shown in FIG. 2 is the same as an azimuth relationship between components in the speaker module 60 in the coordinate system shown in FIG. 1 when the speaker module 60 is used in the electronic device 100 shown in FIG. 1. In some other embodiments, the speaker module 60 may alternatively not include the sealing structure 602 and the sealing cover 605.

A fastening part is disposed on the housing 601. The fastening part includes but is not limited to a through hole, a threaded hole, a buckle, a slot, a limiting step, and the like. In the embodiment shown in FIG. 2 and FIG. 3, the fastening part includes two through holes a and one limiting step b. The through hole a is used to cooperate with a screw, and the limiting step b is configured to match a structure such as a main board support, to fasten the speaker module 60 to the electronic device 100 shown in FIG. 1.

A material of the housing 601 includes but is not limited to metal and plastic. In some embodiments, the material of the housing 601 is plastic. The plastic has low costs and is easy to mold, helping to reduce processing costs for the speaker module 60.

The housing 601 may be an integrated structure, or may be formed by assembling a plurality of parts. In some embodiments, the housing 601 includes a front housing 6011 and a rear housing 6012. The housing 601 is formed by assembling the front housing 6011 and the rear housing 6012, helping to reduce a forming difficulty and an assembling difficulty of the housing 601.

Figure 4:
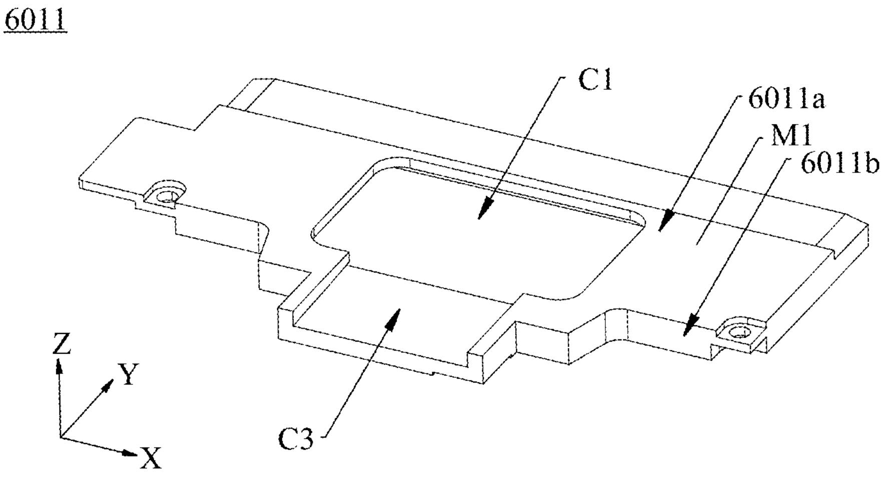
FIG. 4 is a schematic diagram of a structure of a front housing in the speaker module shown in FIG. 3.
Figure 5:
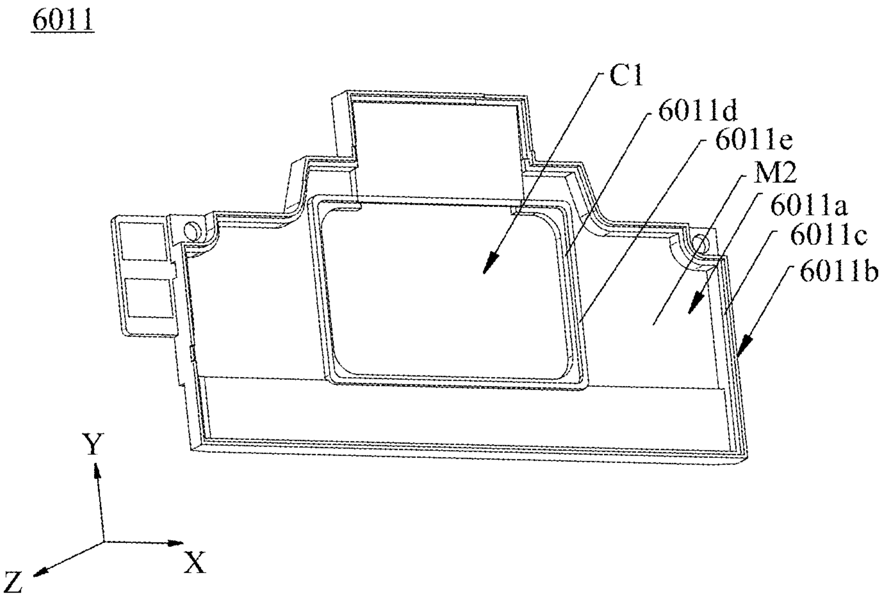
FIG. 5 is a schematic diagram of a structure of the front housing shown in FIG. 4 when viewed from the bottom up.

Specifically, refer to FIG. 4 and FIG. 5. FIG. 4 is a schematic diagram of a structure of the front housing 6011 in the speaker module 60 shown in FIG. 3. FIG. 5 is a schematic diagram of a structure of the front housing 6011 shown in FIG. 4 when viewed from the bottom up. The front housing 6011 includes a front cover plate 6011*a*. The front cover plate 6011*a* includes an outer surface M1 and an inner surface M2 that are opposite to each other. The outer surface M1 faces outer space of the housing 601, and the inner surface M2 faces inner space of the housing 601. A first opening C1 communicating with the outer surface M1 and the inner surface M2 is disposed at the front cover plate 6011*a*.

Figure 6:
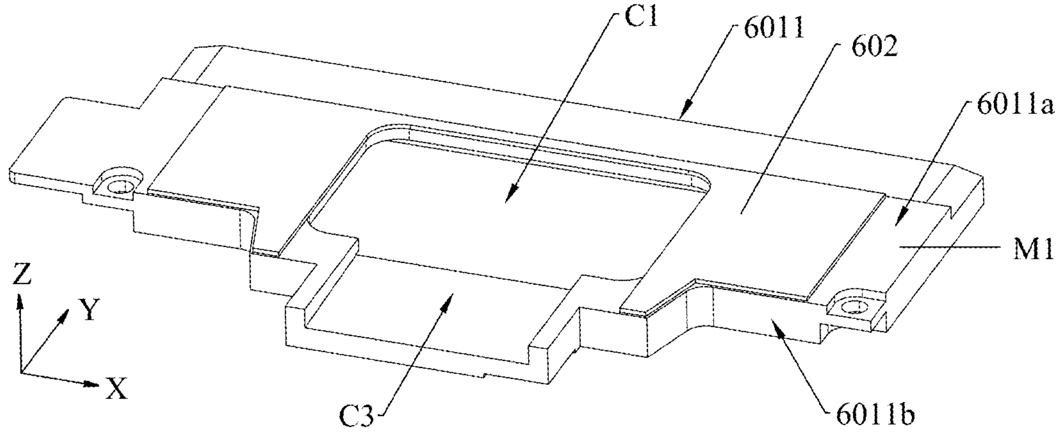
FIG. 6 is an assembly diagram of the front housing shown in FIG. 4 and FIG. 5 and a sealing structure.

FIG. 6 is an assembly diagram of the front housing 6011 shown in FIG. 4 and FIG. 5 and a sealing structure 602. The sealing structure 602 is disposed on the outer surface M1 of the front cover plate 6011*a*. Specifically, the sealing structure 602 may be disposed on the outer surface M1 of the front cover plate 6011*a* in a manner of attaching by adhesive, clamping, thread connection, or the like. A material of the sealing structure 602 includes but is not limited to rubber, silicone, and foam. The sealing structure 602 is disposed around the first opening C1. When the speaker module 60 is installed in the electronic device 100 shown in FIG. 1, the outer surface M1 of the front cover plate 6011*a* faces the screen 10, and the sealing structure 602 is located between the front cover plate 6011*a* and the screen 10. The sealing structure 602 may seal a gap that is between the front cover plate 6011*a* and the screen 10 and that is in a circumferential direction of the first opening C1. An inner wall of the first opening C1, an inner edge of the sealing structure 602, and the screen 10 enclose a front cavity of the speaker module 60. Based on this, still refer to FIG. 4 and FIG. 6. A groove C3 is further disposed at the outer surface M1 of the front cover plate 6011*a*, and the screen 10 further covers an opening of the groove C3. An inner wall of the groove C3 and the screen 10 enclose a sound output channel of the speaker module 60, and the sound output channel is connected to the front cavity C1. An air flow formed by the front cavity of the speaker module 60 may be led from the sound output channel to form sound. The sound output channel is connected to the sound output hole at the frame of the electronic device 100 shown in FIG. 1. In this embodiment, the speaker module 60 and the screen 10 enclose the front cavity and the sound output channel. This can reduce a height of the speaker module 60 in a Z-axis, facilitating a thinning design of the electronic device.

In some other embodiments, the front cavity and the sound output channel of the speaker module 60 may alternatively be formed on an inner side of the front cover plate 6011*a*. "The inner side of the front cover plate 6011*a*" means a side, away from the outer surface M1, of the inner surface M2 of the front cover plate 6011*a*. In this embodiment, the first opening C1 does not need to be disposed on the front cover plate 6011*a*, and the sealing structure 602 does not need to be disposed on the outer surface M1 of the front cover plate 6011*a*. This may reduce structural complexity of the speaker module 60.

Still refer to FIG. 5. The front housing 6011 further includes a side frame 6011*b*. The side frame 6011*b* is located on a side, away from the outer surface M1, of the inner surface M2. The side frame 6011*b* is circumferentially disposed around an edge of the inner surface M2 and is fastened to the front cover plate 6011*a*. A first step surface 6011*c* is provided on one end, away from the front cover plate 6011*a*, of the side frame 6011*b*. The first step surface 6011*c* is circumferentially disposed around the side frame 6011*b*. The front housing 6011 is configured to be fastened to the rear housing 6012 in FIG. 3 by using the first step surface 6011*c*.

Figure 7:
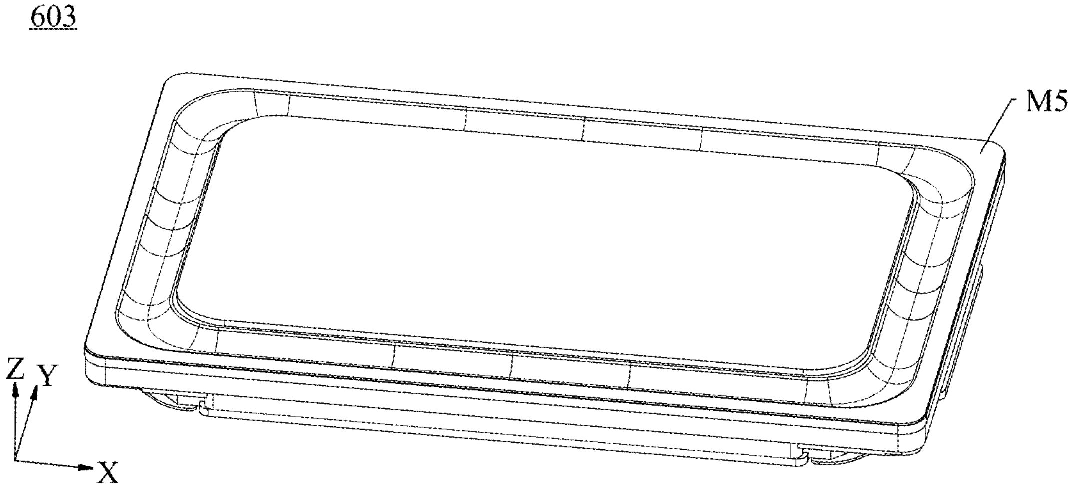
FIG. 7 is a schematic diagram of a structure of a core in the speaker module shown in FIG. 3.

The core 603 is disposed in the front housing 6011. FIG. 7 is a schematic diagram of a structure of the core 603 in the speaker module 60 shown in FIG. 3. The core 603 includes a fastening surface M5. The fastening surface M5 is formed by an outer edge part of a diaphragm. The core 603 is configured to be fastened to the front housing 6011 by using the fastening surface M5.

Specifically, refer to FIG. 5. The inner surface M2 of the front cover plate 6011*a* includes a second step surface 6011*d*. The second step surface 6011*d* is disposed around the first opening C1. A shape and a size of the second step surface 6011*d* are corresponding to a shape and a size of a fastening surface M5.

Figure 8:
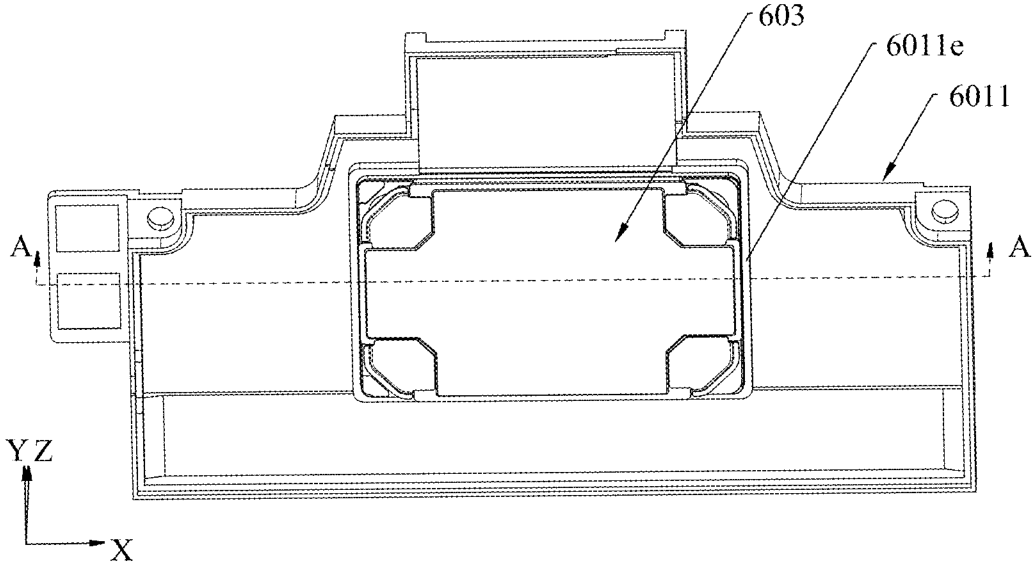
FIG. 8 is an assembly diagram of the core shown in FIG. 7 and the front housing shown in FIG. 5.
Figure 9:
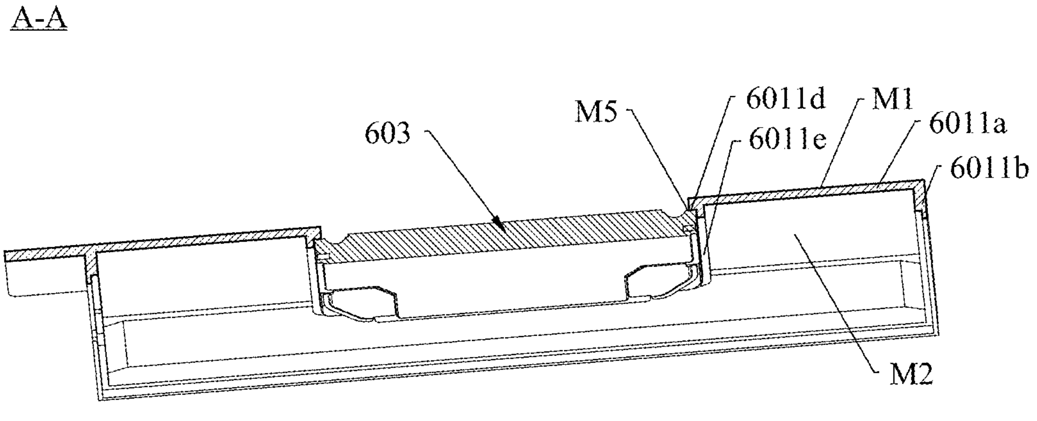
FIG. 9 is a three-dimensional sectional view of an assembly structure shown in FIG. 8 in a line A-A.

Refer to FIG. 8 and FIG. 9. FIG. 8 is an assembly diagram of the core 603 shown in FIG. 7 and the front housing 6011 shown in FIG. 5. FIG. 9 is a three-dimensional sectional view of an assembly structure shown in FIG. 8 in a line A-A. It should be noted that "in an A-A line" means a plane in which the A-A line and arrows at both ends of the A-A line are located. Descriptions of similar drawings are to be understood similarly, and details are not described herein. The core 603 is disposed on a side, away from the outer surface M1, of the inner surface M2. The fastening surface M5 of the core 603 is fastened to the second step surface 6011*d*. Therefore, the core 603 is disposed in the front housing 6011, and the core 603 is fastened to the front housing 6011.

Based on this, optionally, refer to FIG. 5. A limiting convex edge 6011*e* is disposed on the inner surface M2, around the second step surface 6011*d*, of the front cover plate 6011*a*. The limiting convex edge 6011*e* is annular. When the core 603 is disposed in the front housing 6011, refer to FIG. 8 and FIG. 9. The limiting convex edge 6011*e* is disposed around a circumferential direction of the core 603. By using the limiting convex edge 6011*e*, the core 603 may be limited, to prevent the core 603 from being misplaced in an XY plane, and to improve alignment accuracy between the fastening surface M5 and the second step surface 6011*d*. In addition, apart from being fastened to the second step surface 6011*d*, the core 603 may be fastened to the limiting convex edge 6011*e* by using a side surface of the core 603. This may increase a fastening area between the core 603 and the front housing 6011 and ensure connection stability between the core 603 and the front housing 6011.

Figure 10:
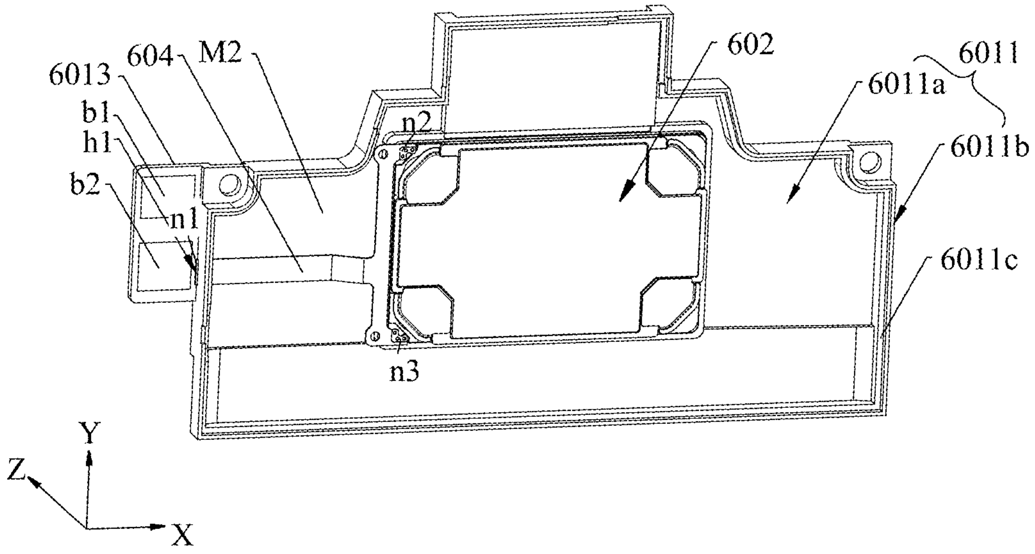
FIG. 10 is an assembly diagram of the front housing and the core shown in FIG. 8, and a first electrical connection structure.

The core 603 is a core electronic component of the speaker module 60. To introduce an audio electrical signal into the core 603 by using the main board (specifically, the main control board 30, the interface main board 40, or the antenna main board) of the electronic device 100 shown in FIG. 1, in some embodiments, FIG. 10 is an assembly diagram of the front housing 6011 and the core 603 shown in FIG. 8, and a first electrical connection structure 604. The speaker module 60 further includes a terminal support part 6013. In some embodiments, the terminal support part 6013 is fastened to the front housing 6011. Specifically, the terminal support part 6013 may be fastened to the front housing 6011 by adhesive, or may be integrally formed with the front housing 6011. In some other embodiments, the terminal support part 6013 may alternatively be disposed on the rear housing 6012.

A first terminal b1 and a second terminal b2 are disposed on the terminal support part 6013. One of the first terminal b1 and the second terminal b2 is a positive terminal, and the other is a negative terminal. The speaker module 60 is configured to be electrically connected to the main board of the electronic device 100 shown in FIG. 1 by using the first terminal b1 and the second terminal b2, to introduce an audio electrical signal into a position of the housing 601 of the speaker module 60.

Based on this, further, the first electrical connection structure 604 includes a first end n1, a second end n2, and a third end n3. The first end n1 of the first electrical connection structure 604 is located outside the front housing 6011, and is electrically connected to the first terminal b1 and the second terminal b2 on the terminal support part 6013. The second end n2 and the third end n3 of the first electrical connection structure 604 extend inside the front housing 6011, passing through the front housing 6011. In some embodiments, a second opening h1 is disposed on the side frame 6011*b* of the front housing 6011, and the second end n2 and the third end n3 of the first electrical connection structure 604 extend into the front housing 6011 through the second opening h1, and are respectively electrically connected to a positive electrode and negative electrode of the core 603. The first electrical connection structure 604 is configured to transmit an audio electrical signal from the first terminal b1 to the second terminal n2 for output, and transmit an audio electrical signal from the second terminal b2 to the third terminal n3 for output. Therefore, the audio electrical signal is further introduced into the core 603 from a position of the housing 601 by using the first electrical connection structure 604.

The first electrical connection structure 604 includes but is not limited to a flexible circuit board (flexible printed circuit, FPC), a conducting wire, a varnished wire, and a structure formed by connecting a plurality of conducting wires through a flexible structure. In the embodiment shown in FIG. 10, the first electrical connection structure 604 is an FPC.

Figure 11:
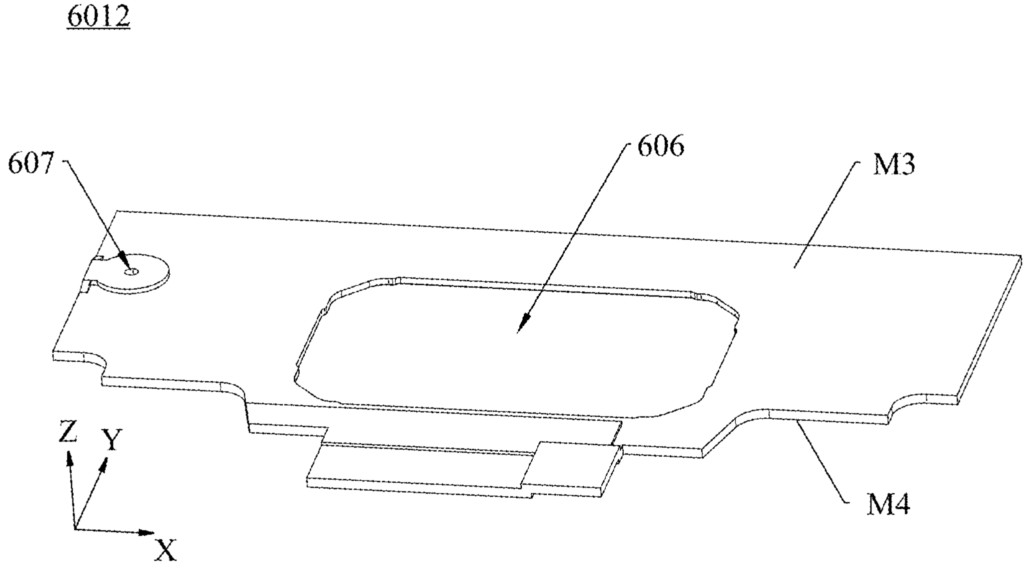
FIG. 11 is a schematic diagram of a structure of a rear housing in the speaker module shown in FIG. 3.
Figure 12:
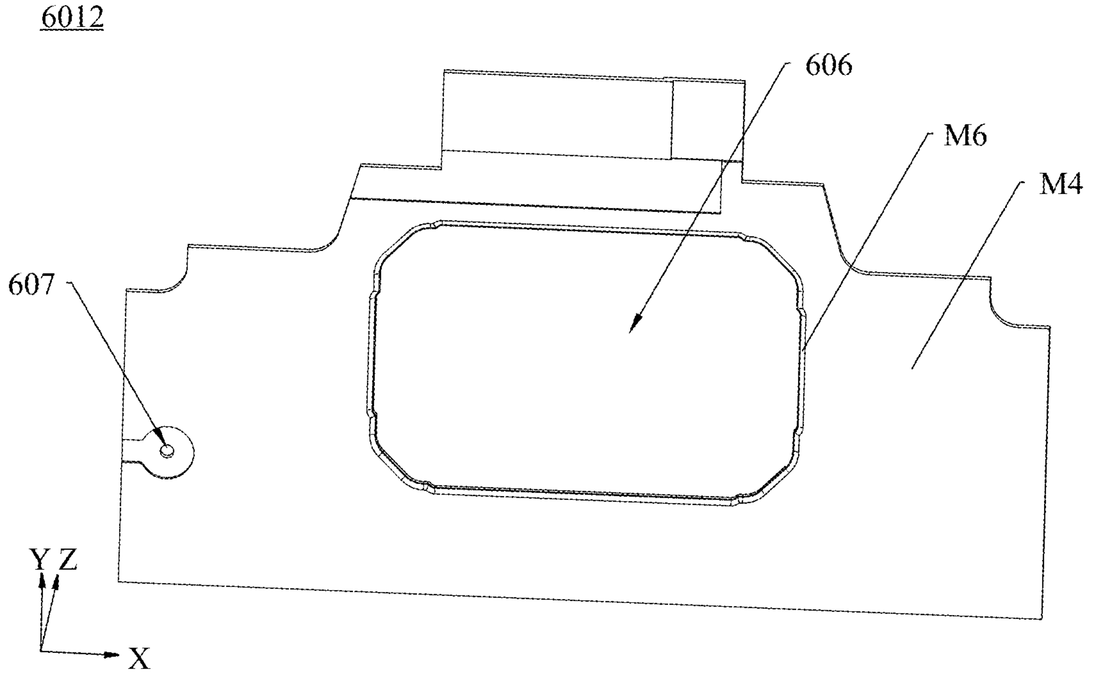
FIG. 12 is a schematic diagram of a structure of the rear housing shown in FIG. 11 when viewed from the bottom up.

Refer to FIG. 11 and FIG. 12. FIG. 11 is a schematic diagram of a structure of the rear housing 6012 in the speaker module 60 shown in FIG. 3. FIG. 12 is a schematic diagram of a structure of the rear housing 6012 shown in FIG. 11 when viewed from the bottom up. The rear housing 6012 is approximately flat plate-shaped. The rear housing 6012 includes an inner surface M3 and an outer surface M4 that are opposite to each other. The inner surface M3 faces inner space of the housing 601, and the outer surface M4 faces outer space of the housing 601.

Figure 13:
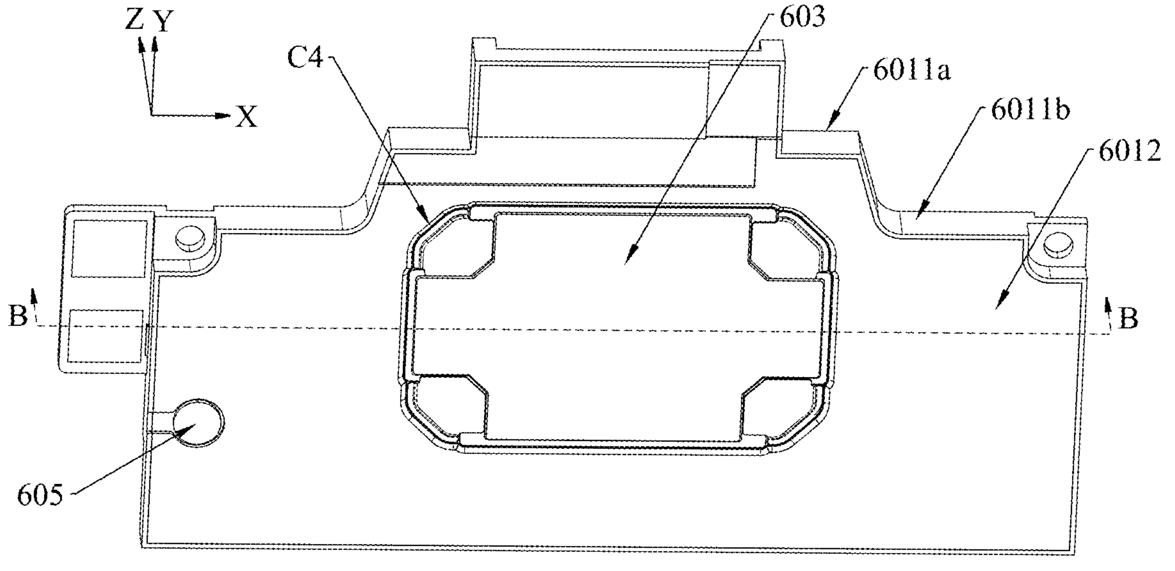
FIG. 13 is an assembly diagram of the rear housing shown in FIG. 11 and FIG. 12 and the front housing, the core, and the first electrical connection structure shown in FIG. 10.
Figure 14:
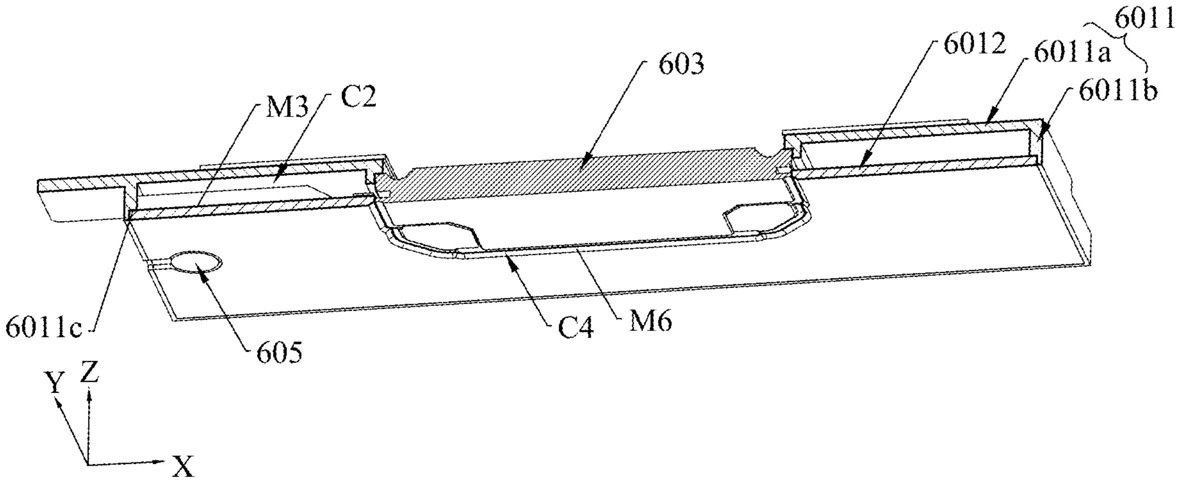
FIG. 14 is a three-dimensional sectional view of an assembly structure shown in FIG. 13 in a line B-B.

Refer to FIG. 13 and FIG. 14. FIG. 13 is an assembly diagram of the rear housing 6012 shown in FIG. 11 and FIG. 12 and the front housing 6011, the core 603, and the first electrical connection structure 604 shown in FIG. 10. FIG. 14 is a three-dimensional sectional view of an assembly structure shown in FIG. 13 in a line B-B. An edge of the inner surface M3 of the rear housing 6012 is circumferentially fastened to a first step surface 6011*c* of the front housing 6011. This implements assembling of the front housing 6011 and the rear housing 6012. The structure is simple, helping to reduce a forming difficulty and an assembling difficulty of the housing 601.

The rear housing 6012 and the front housing 6011 enclose a rear cavity C2 of the speaker module 60. The core 603 is disposed in the rear cavity C2, and the rear cavity C2 is separated from a front cavity.

To reduce a height of the speaker module 60 in the Z-axis direction, in some embodiments, refer to FIG. 11 and FIG. 12. A third opening 606 that passes through the inner surface M3 and the outer surface M4 is provided at the rear housing 6012. Refer to FIG. 13 and FIG. 14. An end, away from the front cover plate 6011*a*, of the core 603 is located in the third opening 606 of the rear housing 6012. In this way, by using the third opening 606 to form avoidance for the core 603, the height of the speaker module 60 in the Z-axis direction may be reduced to an extent, facilitating a thinning design of the electronic device 100.

Based on the foregoing embodiment, a part, located in the third opening 606, of the core 603 is further configured to block the third opening 606, to enable the rear cavity C2 to become a closed cavity. Based on this, to ensure blocking effect of the core 603 on the third opening 606, in one aspect, a part, located in the third opening 606, of the core 603 is a closed structure. To be specific, a ventilation structure such as a through hole or a through groove that connects an inside and an outside of the rear cavity C2 does not exist in the part. In another aspect, an inner edge of the third opening 606 is connected to the core 603 in a sealing manner, to block a gap between the inner edge of the third opening 606 and the core 603.

To implement a sealed connection between the inner edge of the third opening 606 and the core 603, in some embodiments, refer to FIG. 12. A guide slope M6 is disposed at a corner between the outer surface M4 of the rear housing 6012 and an inner side surface of the third opening 606. After the rear housing 6012 and the core 603 are assembled, refer to FIG. 13 and FIG. 14. The guide slope M6 and a sidewall of the core 603 enclose an annular sealant groove C4. The annular sealant groove C4 is filled with sealant (not shown in the figure). The sealant includes but is not limited to one or more of a UV adhesive (also referred to as a shadow adhesive), a polyurethane, a silicone rubber, a polysulfide rubber, a chloroprene rubber, and an epoxy resin sealant. A gap between the inner edge of the third opening 606 and the core 603 may be sealed by using the sealant, to enable the rear cavity C2 to be formed as a closed cavity. This structure is simple, easy to operate, and suitable for sealing gaps of different shapes. This structure applies to a wide range of application, and has better flexibility. The sealant further adheres the core 603 to the rear housing 6012. This can improve connection stability between the core 603 and the housing 601.

In some other embodiments, an end, away from the front cover plate 6011*a*, of the core 603 may alternatively be located on an inner side of the rear housing 6012. "The inner side of the rear housing 6012" means a side, away from the outer surface M4, of the inner surface M3 of the rear housing 6012. In this way, the core 603 is entirely located in the rear cavity C2, and a third opening 606 does not need to be formed at the rear housing 6012, and a sealing structure does not need to be disposed. This may reduce structural complexity of the speaker module 60.

To improve low-frequency performance of the speaker module 60, in some embodiments, refer to FIG. 11 and FIG. 12. A filling opening 607 is disposed at the rear housing 6012. The filling opening 607 is connected to the rear cavity C2, and a sound absorbing material may be filled in the rear cavity C2 by using the filling opening 607. The sound absorbing material includes but is not limited to one or more of a melamine sound absorbing material, a zeolite, glass fiber, or active carbon. The sound absorbing material may increase equivalent space of the rear cavity C2, and improve a low-frequency characteristic of the speaker module 60.

The sealing cover 605 is disposed at the filling opening 607. Specifically, the sealing cover 605 may be disposed at the filling opening 607 in a manner of thread connection, clamping, soldering, or the like.

Based on descriptions of various structures in the foregoing speaker module 60, when the core 603 is powered on and is operating, air in the front cavity may be pushed to vibrate, to form a sound, converting an audio electrical signal into a sound signal. The core 603 is a core component that generates sound in the speaker module 60. A thickness and audio performance of the core directly affect a thickness and audio performance of the speaker module. Therefore, a structure of the core 603 is mainly described as follows.

Figure 15:
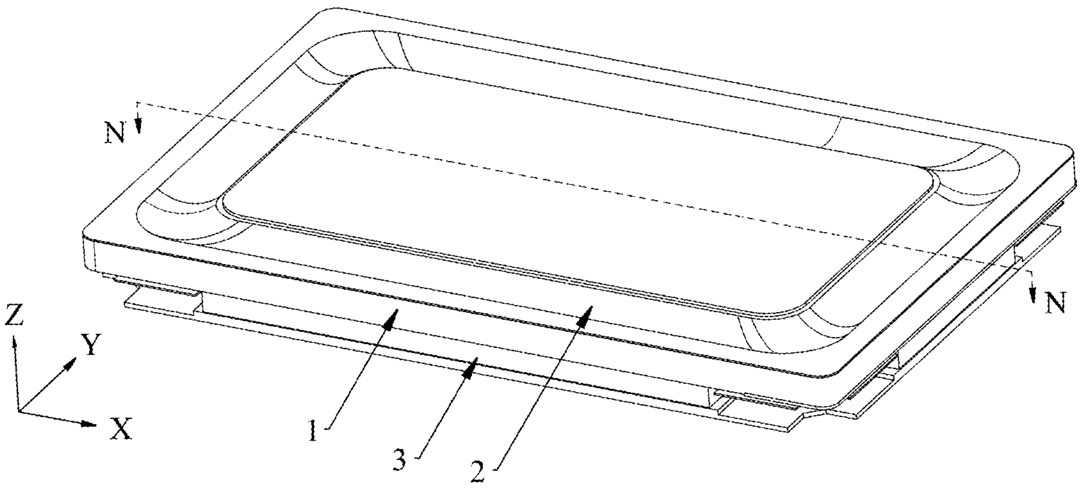
FIG. 15 is a three-dimensional view of a core according to some embodiments of this application.
Figure 16:
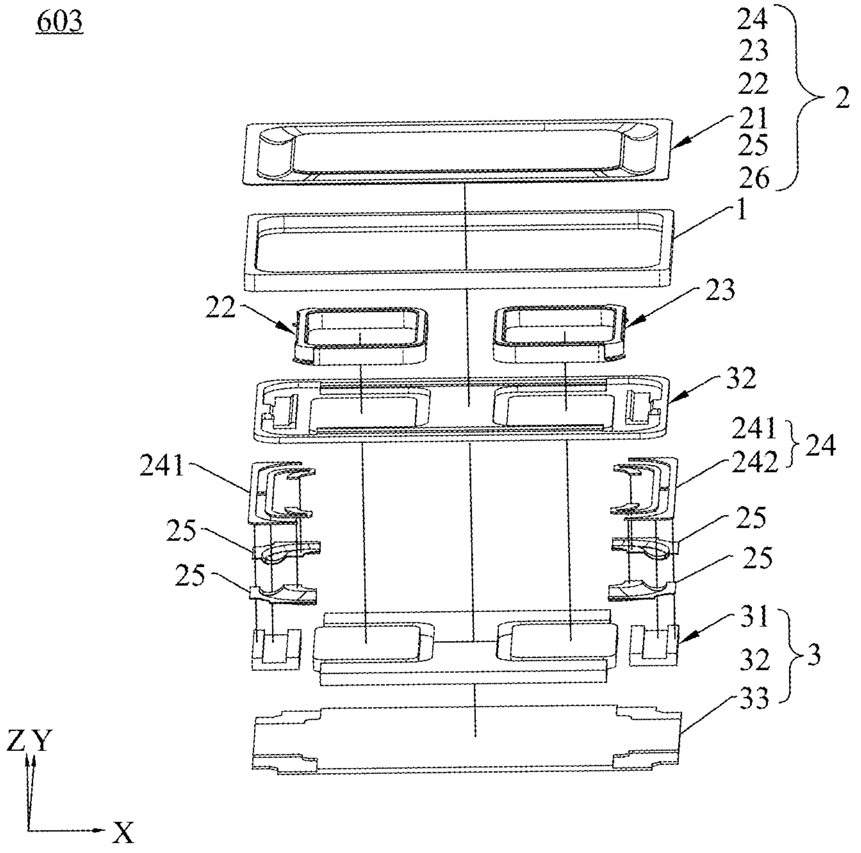
FIG. 16 is an exploded view of the core shown in FIG. 15.

Specifically, refer to FIG. 15 and FIG. 16. FIG. 15 is a three-dimensional view of a core 603 according to some embodiments of this application. FIG. 16 is an exploded view of the core 603 shown in FIG. 15. The core 603 includes a basket 1, a vibrating system 2, and a magnetic circuit system 3.

It should be noted that FIG. 15 and FIG. 16 show only some components included in the core 603. Actual shapes, actual sizes, actual positions, and actual constructions of these components are not limited by FIG. 15 and FIG. 16. In addition, a coordinate system in FIG. 15 and a coordinate system in FIG. 2 are represented as a same coordinate system. To be specific, an azimuth relationship between components in the core 603 in FIG. 15 in the coordinate system shown in FIG. 15 is the same as an azimuth relationship between components in the core 603 in the coordinate system shown in FIG. 2 when the core 603 is used in the speaker module 60 shown in FIG. 2.

It may be understood that "top" used for components in the core 603 in the following description means a part, close to the front cavity, of a described component when the core 603 is used in the speaker module 60, "bottom" means a part, away from the front cavity, of a described component when the core 603 is used in the speaker module 60, "inside" means a part, close to a central axis of the core 603, of a described component, and "outside" means a part, away from the central axis of the core 603, of a described component. "Top", "bottom", "inside", or "outside" does not indicate or imply that a specified apparatus or component is to have a specific orientation or is constructed or operated in a specific orientation. Therefore, this is not understood as a limitation to this application. In addition, in the following description, "rectangular" or "square" used for describing a shape of each component in the core 603 indicates an approximate shape, an angle may be disposed between adjacent sides, or an angle is not disposed. In addition, in the following description, azimuth definitions such as "parallel", "vertical", "consistent in direction", "same in direction", or "opposite in direction" that are used for components in the core 603 all indicate approximate azimuths with an error allowed.

The basket 1 is used as a "support skeleton" of the core 603, to support the vibrating system 2 and fasten the magnetic circuit system 3. A material of the basket 1 includes but is not limited to metal and plastic.

Figure 17:
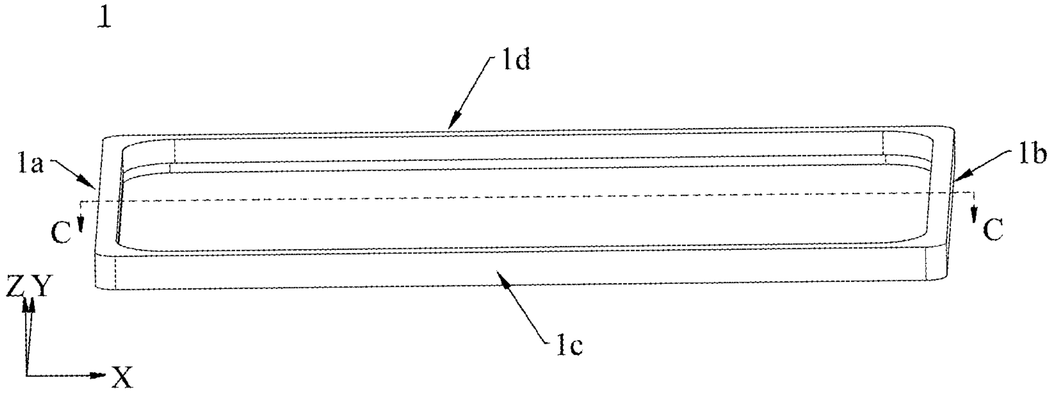
FIG. 17 is a three-dimensional view of a basket in the core shown in FIG. 15 and FIG. 16.

FIG. 17 is a three-dimensional view of the basket 1 in the core 603 shown in FIG. 15 and FIG. 16. The basket 1 is a rectangular frame. Specifically, the basket 1 includes a first short side 1*a* and a second short side 1*b* that are opposite to each other, and a first long side 1*c* and a second long side 1*d* that are opposite to each other. An extension direction of the first long side 1*c* and an extension direction of the second long side d are parallel to an X-axis, and an extension direction of the first short side 1*a* and an extension direction of the second short side 1*b* are parallel to a Y-axis. A length of the first long side 1*c* and the second long side Id is greater than a length of the first short side 1*a* and the second short side 1*b*. The basket 1 is enclosed and formed by sequentially connecting the first short side 1*a*, the first long side 1*c*, the second short side 1*b*, and the second long side 1*d*.

Figure 18:
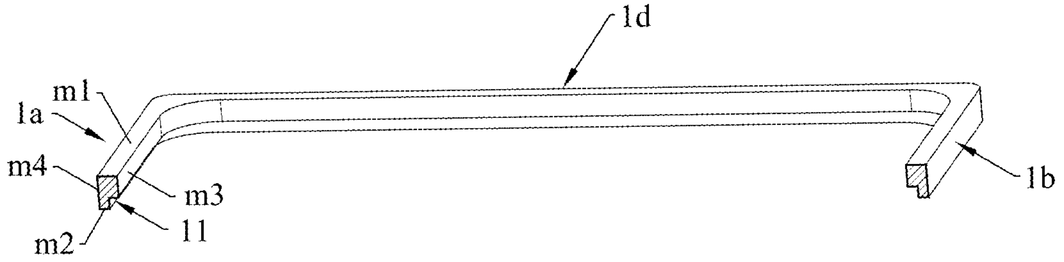
FIG. 18 is a three-dimensional sectional view of the basket shown in FIG. 17 in a line C-C.

FIG. 18 is a three-dimensional sectional view of the basket 1 shown in FIG. 17 in a line C-C. The basket 1 includes a top surface m1 and a bottom surface m2 that are opposite to each other. The basket 1 further includes an inner side surface m3 and an outer side surface m4 that are disposed opposite to each other. The inner side surface m3 and the outer side surface m4 are connected between the top surface m1 and the bottom surface m2. The top surface m1, the bottom surface m2, the inner side surface m3, and the outer side surface m4 of the basket 1 are all annular surfaces disposed around a circumferential direction of the basket 1. A fastening groove 11 that is concave in a direction close to the outer side surface m4 is disposed on the inner side surface m3 of the basket 1. The fastening groove 11 is disposed around the circumferential direction of the basket 1, and the fastening groove 11 communicates with the bottom surface m2.

The basket 1 may be an integral structural member, or may be formed by assembling a plurality of parts in a manner of bonding, clamping, thread connection, or the like.

It may be understood that the basket 1 is configured to support the vibrating system 2 and fasten the magnetic circuit system 3. When this requirement is met, the basket 1 may also be designed in another shape, and is not limited to a shape in this embodiment.

Refer to FIG. 16. The vibrating system 2 includes a diaphragm assembly 21, a first voice coil set 22, a second voice coil set 23, a second electrical connection structure 24, and four auxiliary diaphragms 25.

The diaphragm assembly 21 is a body that pushes air in the front cavity of the speaker module 60 to move. When the core 603 shown in FIG. 16 is used in the speaker module 60 shown in FIG. 13 and FIG. 14, the core 603 separates the rear cavity C3 and the front cavity of the speaker module 60 by using the diaphragm assembly 21.

Figure 19:
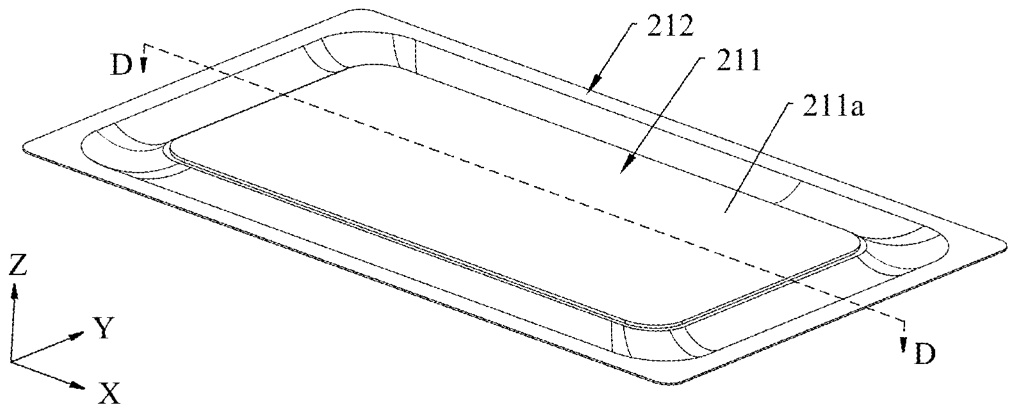
FIG. 19 is a schematic diagram of a structure of a diaphragm assembly in the core shown in FIG. 16.
Figure 20A:
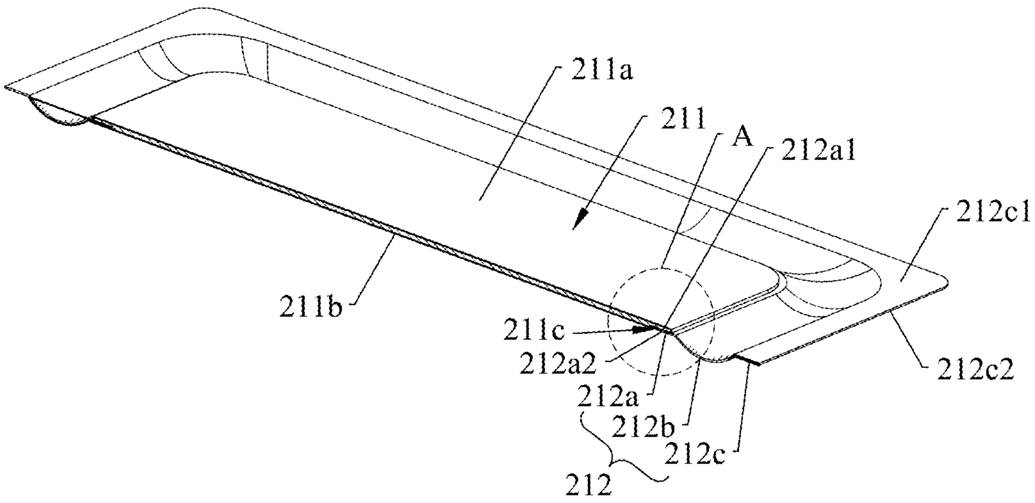
FIG. 20*a* is a three-dimensional sectional view of the diaphragm assembly shown in FIG. 19 in a line D-D.
Figure 20B:
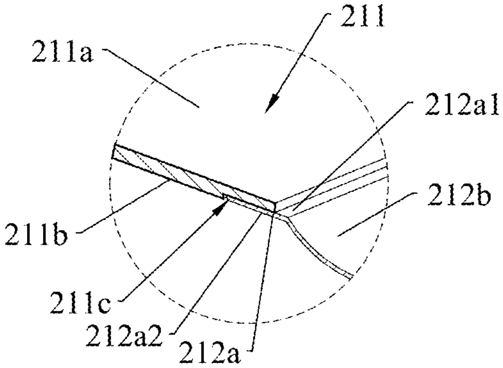
FIG. 20*b* is an enlarged view of a region A in the three-dimensional sectional view shown in FIG. 20*a;*

Refer to FIG. 19, FIG. 20*a*, and FIG. 20*b*. FIG. 19 is a schematic diagram of a structure of the diaphragm assembly 21 in the core 603 shown in FIG. 16. FIG. 20*a* is a three-dimensional sectional view of the diaphragm assembly 21 shown in FIG. 19 in a line D-D. FIG. 20*b* is an enlarged view of a region A in the three-dimensional sectional view shown in FIG. 20*a*. The diaphragm assembly 21 includes a dome 211 and a diaphragm 212.

The dome 211 is rectangularly plate-shaped. A length direction of the dome 211 is parallel to an X-axis, a width direction of the dome 211 is parallel to a Y-axis, and a thickness direction of the dome 211 is parallel to a Z-axis. The dome 211 includes a top surface 211*a* and a bottom surface 211*b* that are disposed opposite to each other. A limiting groove 211*c* is disposed in an edge region of the bottom surface 211*b* of the dome 211.

The diaphragm 212 is rectangularly annular. An extension direction of a long side of the diaphragm 212 is parallel to the X-axis, and an extension direction of a short side of the diaphragm 212 is parallel to the Y-axis. The diaphragm 212 includes a first fastening part 212*a*, a suspension ring 212*b*, and a second fastening part 212*c* that are sequentially connected. The first fastening part 212*a* is located on an inner of the bent annular part 212*b*, and the second fastening part 212*c* is located on an outer side of the bent annular part 212*b*.

The first fastening part 212*a* is partially accommodated in the limiting groove 211*c* of the dome 211, and is fastened to the dome 211. Based on this, the first fastening part 212*a* of the diaphragm 21 includes a top surface 212*al* and a bottom surface 212*a*2. The top surface 212*al* of the first fastening part 212*a* contacts a bottom wall of the limiting groove 211*c*. The bottom surface 212*a*2 of the first fastening part 212*a* is flush with a bottom surface 211*b* of the dome 211. A surface formed by splicing the bottom surface 212*a*2 of the first fastening part 212*a* and the bottom surface 211*b* of the dome 211 is used to fasten the first voice coil set 22 and the second voice coil set 23, to help to fasten the first voice coil set 22 and the second voice coil set 23.

The second fastening part 212*c* includes a top surface 212*cl* and a bottom surface 212*c*2 that are opposite to each other. The top surface 212*cl* of the second fastening part 212*c* forms the fastening surface M5 of the core 603 shown in FIG. 7. When the core 603 is installed in the speaker module 60, the diaphragm assembly 21 is fastened to the inner surface of the front housing of the speaker module 60 by using the top surface 212*cl* of the second fastening part 212*c*. The bottom surface 212*c*2 of the second fastening part 212*c* is used to be fastened to the top surface m1 of the basket 1 shown in FIG. 17 and FIG. 18.

A sectional shape of the bent annular part 212*b* of the diaphragm 212 is arc-shaped or approximately arc-shaped, and an extension track of the bent annular part 212*b* is rounded rectangular. A long side extension direction of the extension track of the bent annular part 212*b* is parallel to the X-axis, and a short side extension direction of the extension track of the bent annular part 212*b* is parallel to the Y-axis. The bent annular part 212*b* of the diaphragm 212 is concave. To be specific, the bent annular part 212*b* is concave toward a side, away from the top surface 212*al* of the first fastening part 212*a*, of the bottom surface 212*a*2 of the first fastening part 212*a*. When an external force is applied to the bent annular part 212*b* of the diaphragm 212, deformation can occur. This enables the dome 211 to vibrate up and down relative to the second fastening part 212*c* in the Z-axis direction.

In this embodiment of this application, because the bent annular part 212*b* of the diaphragm 212 is disposed to be concave, space of an upper part of the core 603 can be reduced. This can reduce space of the front cavity.

Figure 21A:
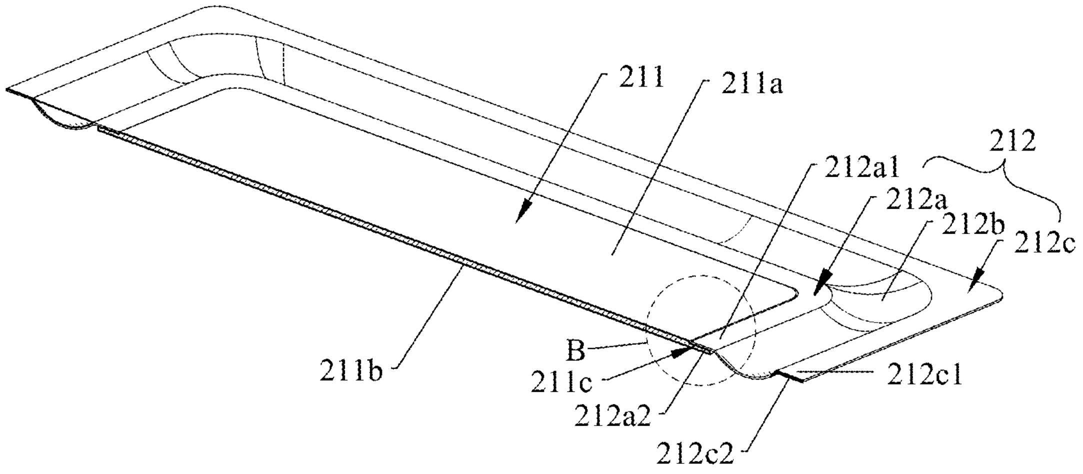
FIG. 21*a* is a three-dimensional sectional view of a diaphragm assembly according to some other embodiments of this application.
Figure 21B:
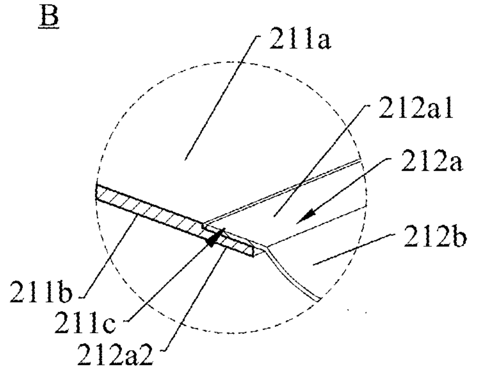
FIG. 21*b* is an enlarged view of a region B in the three-dimensional sectional view shown in FIG. 21*a;*

Refer to FIG. 21*a* and FIG. 21*b*. FIG. 21*a* is a three-dimensional sectional view of a diaphragm assembly 21 according to some other embodiments of this application. FIG. 21*b* is an enlarged view of a region B in the three-dimensional sectional view shown in FIG. 21*a*. A difference between the diaphragm assembly 21 in this embodiment and the diaphragm assembly 21 shown in FIG. 20*a* is as follows. In this embodiment, a limiting groove 211*c* of a dome 211 is disposed in an edge region of a top surface 211*a* of the dome 211. Based on this, the first fastening part 212*a* of the diaphragm 21 includes a top surface 212*al* and a bottom surface 212*a*2. The bottom surface 212*a*2 of the first fastening part 212*a* contacts a bottom wall of the limiting groove 211*c*. The top surface 212*al* of the first fastening part 212*a* is flush with a top surface 211*a* of a dome 211. In this way, when a core is used in a speaker module, airflow smoothness in a front cavity of the speaker module can be ensured, and noise is prevented.

Figure 22:
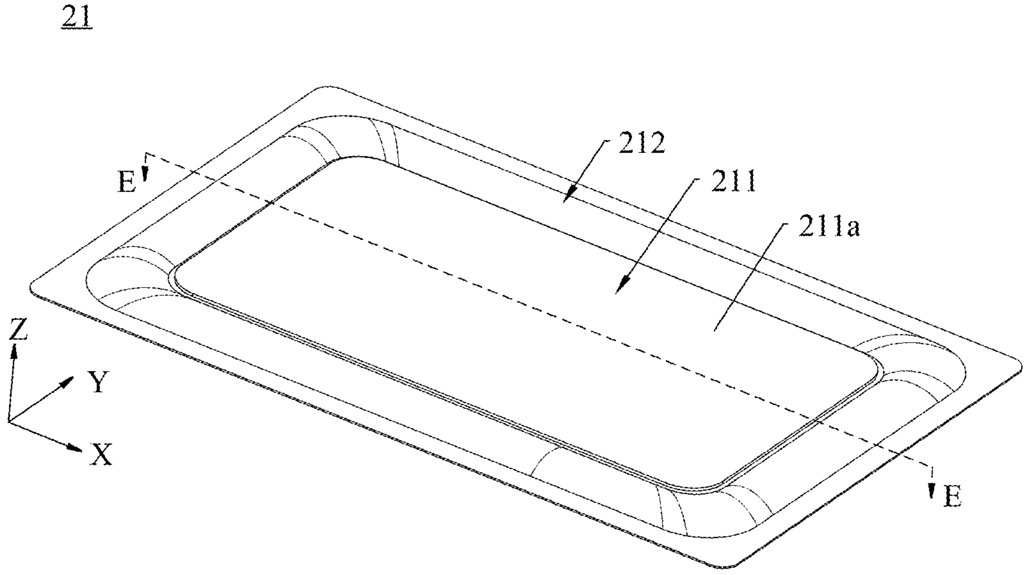
FIG. 22 is a schematic diagram of a structure of a diaphragm assembly according to some other embodiments of this application.
Figure 23:
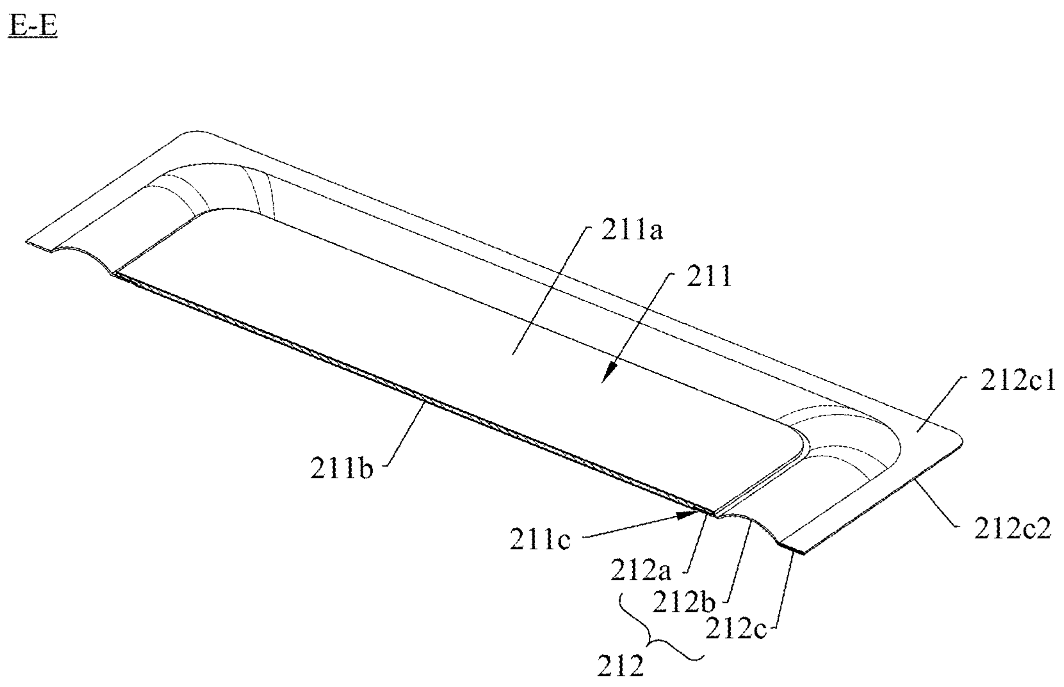
FIG. 23 is a three-dimensional sectional view of the diaphragm assembly shown in FIG. 22 in a line E-E.

Refer to FIG. 22 and FIG. 23. FIG. 22 is a schematic diagram of a structure of a diaphragm assembly 21 according to some other embodiments of this application. FIG. 23 is a three-dimensional sectional view of the diaphragm assembly 21 shown in FIG. 22 in a line E-E. A difference between the diaphragm assembly 21 provided in this embodiment and the diaphragm assembly 21 shown in FIG. 20*a* is as follows. In this embodiment, a bent annular part 212*b* of a diaphragm 212 is disposed to be convex. To be specific, the bent annular part 212*b* is convex toward a side, away from a bottom surface 212*a*2 of a first fastening part 212*a*, of a top surface 212*al* of a first fastening part 212*a*. In this way, space below a diaphragm 212 is released, and a magnetic circuit system 3 located below the diaphragm 212 is allowed to be set with a larger height. This increases a magnetic induction strength of a core 603 and increases sensitivity of the core 603.

Figure 24:
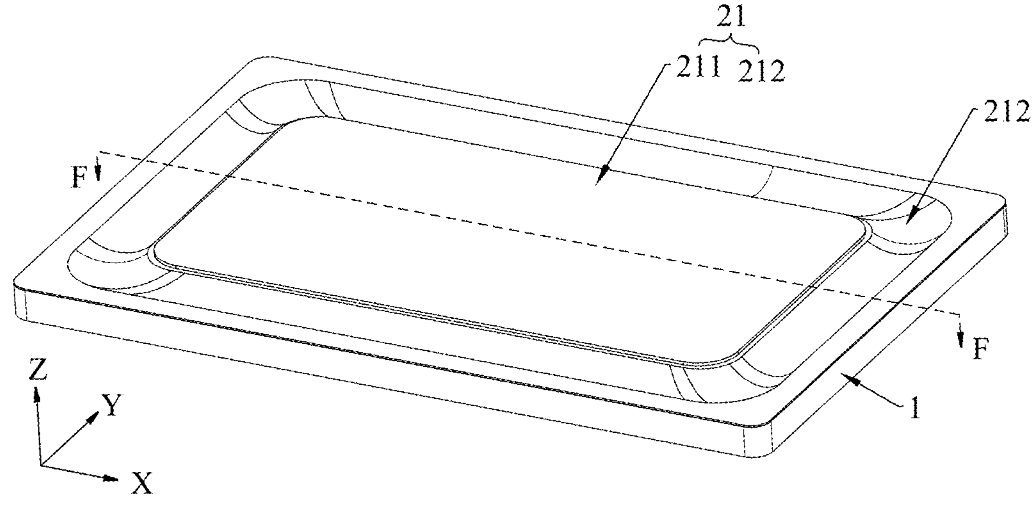
FIG. 24 is an assembly diagram of the diaphragm assembly shown in FIG. 19 and the basket shown in FIG. 17.
Figure 25:
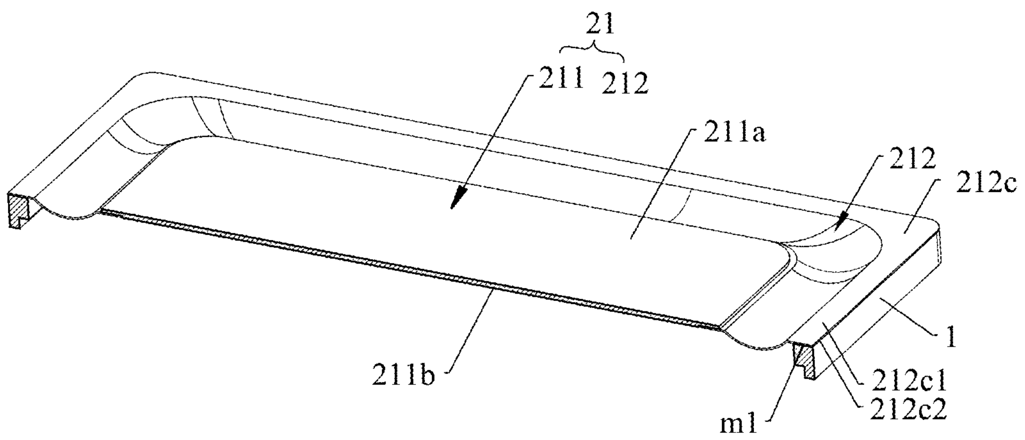
FIG. 25 is a three-dimensional sectional view of the assembly diagram shown in FIG. 24 in a line F-F.

Refer to FIG. 24 and FIG. 25. FIG. 24 is an assembly diagram of the diaphragm assembly 21 shown in FIG. 19 and the basket 1 shown in FIG. 17. FIG. 25 is a three-dimensional sectional view of the assembly diagram shown in FIG. 24 in a line F-F. In the diaphragm assembly 21, the bottom surface 212*c*2 of the second fastening part 212*c* of the diaphragm 212 faces the basket 1, and is fastened to a top surface m1 of the basket 1.

Figure 26:
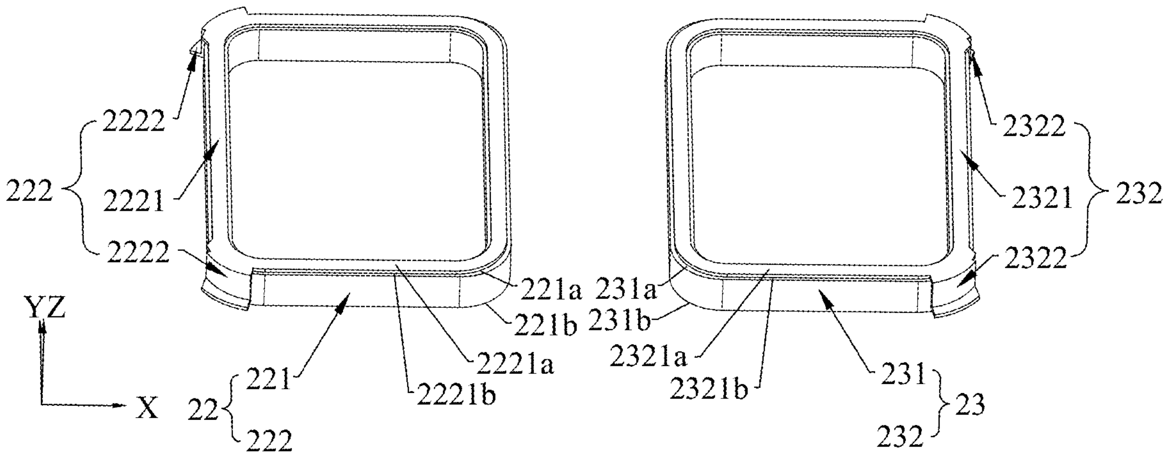
FIG. 26 is a schematic diagram of a structure of a first voice coil set and a second voice coil set in FIG. 16.

FIG. 26 is a schematic diagram of a structure of the first voice coil set 22 and the second voice coil set 23 in FIG. 16. The first voice coil set 22 and the second voice coil set 23 are arranged in an X-axis direction. The first voice coil set 22 and the second voice coil set 23 are approximately square-shaped. In some other embodiments, the first voice coil set 22 and the second voice coil set 23 may alternatively be rectangularly annular. Extension directions of two pairs of adjacent sides of the first voice coil set 22 are respectively the same as the X-axis direction and a Y-axis direction. Extension directions of two pairs of adjacent sides of the second voice coil set 23 are respectively the same as the X-axis direction and the Y-axis direction. The first voice coil set 22 and the second voice coil set 23 are configured to match the magnetic circuit system 3 to synchronously drive the diaphragm assembly 21, pushing air in the front cavity of the speaker module 60 to move to generate sound.

Figure 27:
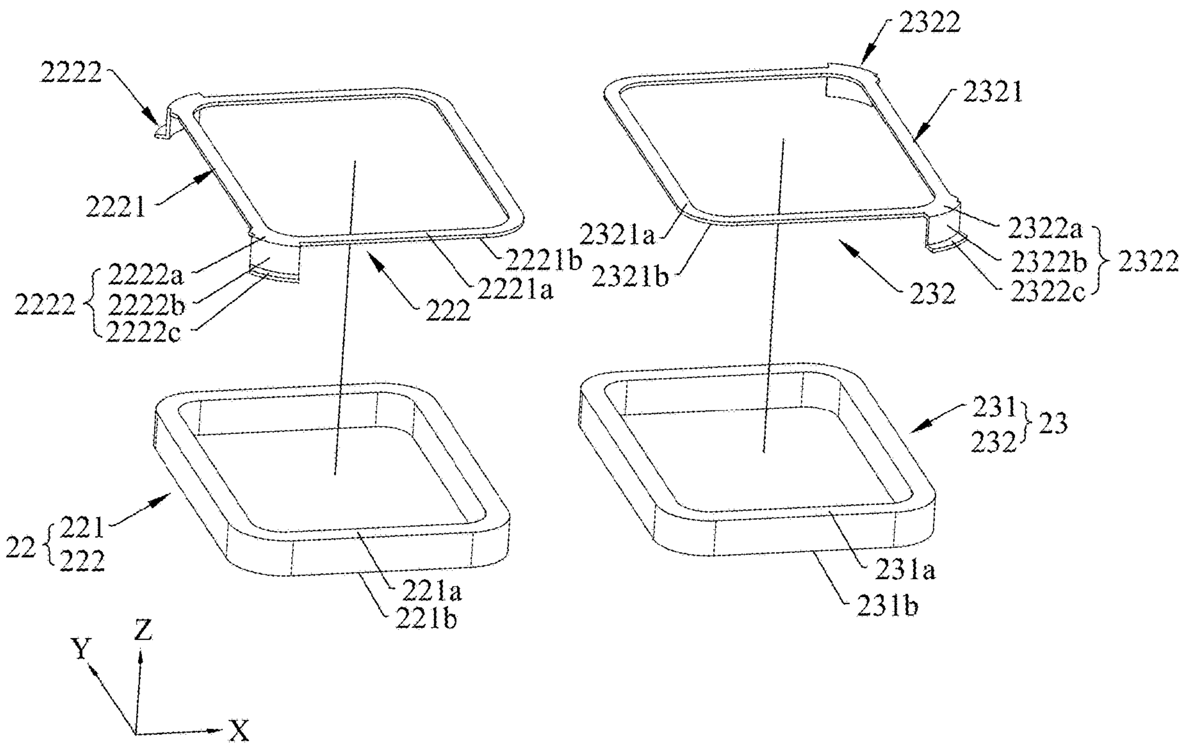
FIG. 27 is an exploded view of the first voice coil set and the second voice coil set shown in FIG. 26.

Refer to FIG. 26 and FIG. 27. FIG. 27 is an exploded view of the first voice coil set 22 and the second voice coil set 23 shown in FIG. 26. In this embodiment, the first voice coil set 22 includes a first voice coil 221 and a first voice coil former 222, and the second voice coil set 23 includes a second voice coil 231 and a second voice coil former 232.

The first voice coil 221 includes a top surface 221*a* and a bottom surface 221*b* that are opposite to each other. The second voice coil 231 includes a top surface 231*a* and a bottom surface 231*b* that are opposite to each other. An end at which the top surface 221*a* of the first voice coil 221 is located and an end at which the top surface 231*a* of the second voice coil 231 is located are configured to be fastened to a dome 211 of the diaphragm assembly 21. An end at which the bottom surface 221*b* of the first voice coil 221 is located and an end at which the bottom surface 231*b* of the second voice coil 231 is located are configured to extend into the magnetic circuit system 3, to match the magnetic circuit system 3.

The first voice coil former 222 and the second voice coil former 232 are respectively configured to adjust a height of the first voice coil 221 and a height of the first voice coil 221 in a Z-axis direction, to adjust the first voice coil 221 and the first voice coil 221 into the magnetic circuit system 3 while ensuring vibration space of the diaphragm assembly 21. Based on this, a material with a low density and a high structural strength may be selected for the first voice coil former 222 and the second voice coil former 232, such as aluminum alloy or magnesium aluminum alloy, to reduce a load of the magnetic circuit system 3.

In some embodiments, the first voice coil former 222 includes a first support part 2221 and two second support parts 2222. The first support part 2221 includes a top surface 2221*a* and a bottom surface 2221*b* that are opposite to each other. The bottom surface 2221*b* of the first support part 2221 is fastened to the top surface 221*a* of the first voice coil 221. The top surface 2221*a* of the first support part 2221 is used to be fastened to the dome 211.

The second voice coil former 232 includes a third support part 2321 and two fourth support parts 2322. The third support part 2321 includes a top surface 2321*a* and a bottom surface 2321*b* that are opposite to each other. The bottom surface 2321*b* of the third support part 2321 is fastened to the top surface 231*a* of the second voice coil 231. The top surface 2321*a* of the third support part 2321 is fastened to the dome 211.

The two second support parts 2222 are respectively disposed at two corners, away from the third support part 2321, of the first support part 2221. A positive electrode and a negative electrode (not shown in the figure) of the first voice coil 221 are respectively led out from parts, adjacent to the two corners, of the first voice coil 221. It may also be considered that the two second support parts 2222 and the positive electrode and the negative electrode of the first voice coil 221 are respectively located at two corners, away from the second voice coil set 23, of the first voice coil set 22.

The two fourth support parts 2322 are respectively disposed at two corners, away from the first support part 2221, of the third support part 2321. A positive electrode and a negative electrode (not shown in the figure) of the second voice coil 231 are respectively led out from parts, adjacent to the two corners, of the second voice coil 231. It may also be considered that the two fourth support parts 2322 and the positive electrode and the negative electrode of the second voice coil 231 are respectively located at two corners, away from the first voice coil set 22, of the second voice coil set 23.

The two second support parts 2222 and the two fourth support parts 2322 are all configured to fasten and support ends of the second electrical connection structure 24 in FIG. 16. In addition, the positive electrode and the negative electrode of the first voice coil 221 and the positive electrode and the negative electrode of the second voice coil 231 are further configured to be electrically connected to the ends of the second electrical connection structure 24.

Specifically, refer to FIG. 27. The second support part 2222 includes a first outward extension unit 2222*a*, a first connection unit 2222*b*, and a second outward extension unit

2222*c*. The first outward extension unit 2222*a* extends from an outer edge of the first support part 2221 to a direction away from the central axis of the first support part 2221. The first connection unit 2222*b* extends from an outer end of the first outward extension unit 2222*a* to a side, away from the top surface 2221*a*, of the bottom surface 2221*b* of the first support part 2221. The outer end of the first outward extension unit 2222*a* means an end, away from the central axis of the first support part 2221, of the first outward extension unit 2222*a*. The second outward extension unit 2222*c* extends from one end, away from the first support part 2221, of the first connection unit 2222*b* to a direction away from the central axis of the first support part 2221. In this way, a section of the second support part 2222 is of a "right-angled zigzag"-shaped structure, and the second support part 2222 may support an end of the second electrical connection structure 24 in FIG. 16 by using the second outward extension unit 2222*c*. In some other embodiments, a section of the second support part 2222 may also be of a "right-angled horizontal U"-shaped structure, an "L"-shaped structure, or an "I"-shaped structure. This is not specifically limited in this application.

Similarly, still refer to FIG. 27. The fourth support part 2322 includes a third outward extension unit 2322*a*, a second connection unit 2322*b*, and a fourth outward extension unit 2322*c*. The third outward extension unit 2322*a* extends from an outer edge of the third support part 2321 to a direction away from a central axis of the third support part 2321. The second connection unit 2322*b* extends from an outer end of the third outward extension unit 2322*a* to a side, away from the top surface 2321*a*, of the bottom surface 2321*b* of the third support part 2321. The outer end of the third outward extension unit 2322*a* means an end, away from the central axis of the third support part 2321, of the third outward extension unit 2322*a*. The fourth outward extension unit 2322*c* extends from one end, away from the third support part 2321, of the second connection unit 2322*b* to a direction away from the central axis of the third support part 2321. In this way, a section of the fourth support part 2322 is of a "right-angled zigzag"-shaped structure, and the fourth support part 2322 may support an end of the second electrical connection structure 24 in FIG. 16 by using the fourth outward extension unit 2322*c*. In some other embodiments, a section of the fourth support part 2322 may also be of a "right-angled horizontal U"-shaped structure, an "L"-shaped structure, or an "I"-shaped structure. This is not specifically limited in this application.

The first voice coil former 222 may be an integrated structure, or may be formed by assembling a plurality of parts. This is not specifically limited in this application. Similarly, the second voice coil former 232 may be an integrated structure, or may be formed by assembling a plurality of parts. This is not specifically limited in this application.

In some other embodiments, the first voice coil former 222 and the second voice coil former 232 may not be disposed in the core 603, and the first voice coil 221 and the second voice coil 231 may be directly fastened to the diaphragm assembly 21.

Figure 28:
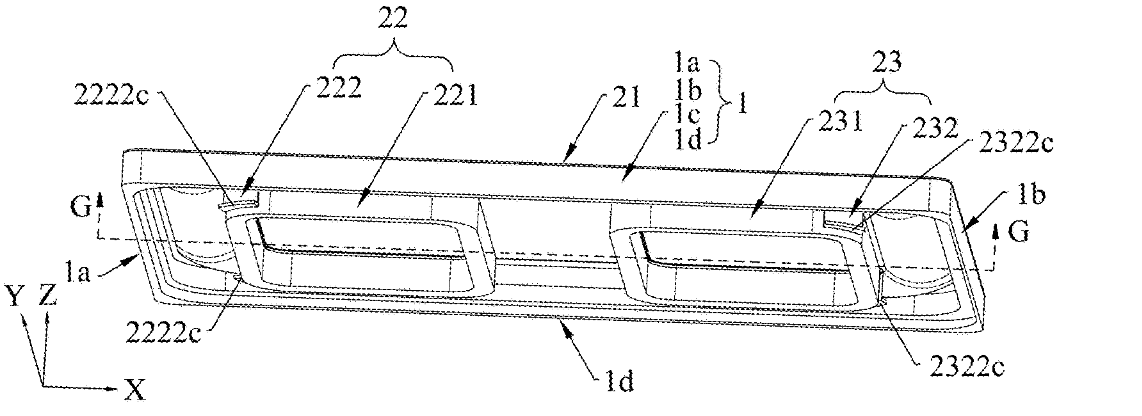
FIG. 28 is an assembly diagram of the first voice coil set and the second voice coil set shown in FIG. 26 and FIG. 27 and the diaphragm assembly and the basket shown in FIG. 24.
Figure 29A:
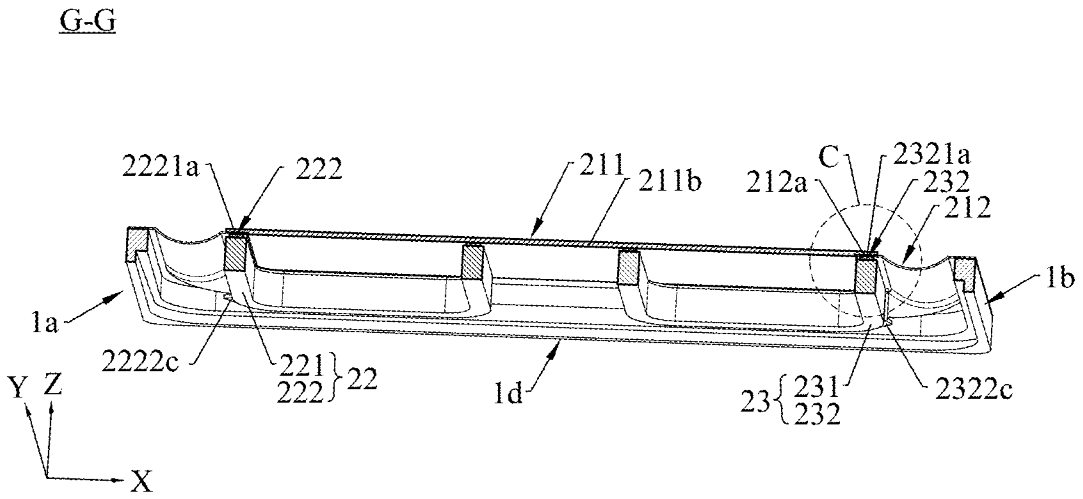
FIG. 29*a* is a three-dimensional sectional view of an assembly structure shown in FIG. 28 in a line G-G.
Figure 29B:
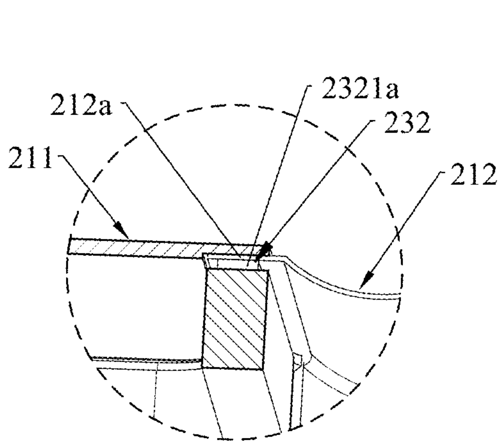
FIG. 29*b* is an enlarged view of a region C in the three-dimensional sectional view shown in FIG. 29*a;*
Figure 30:
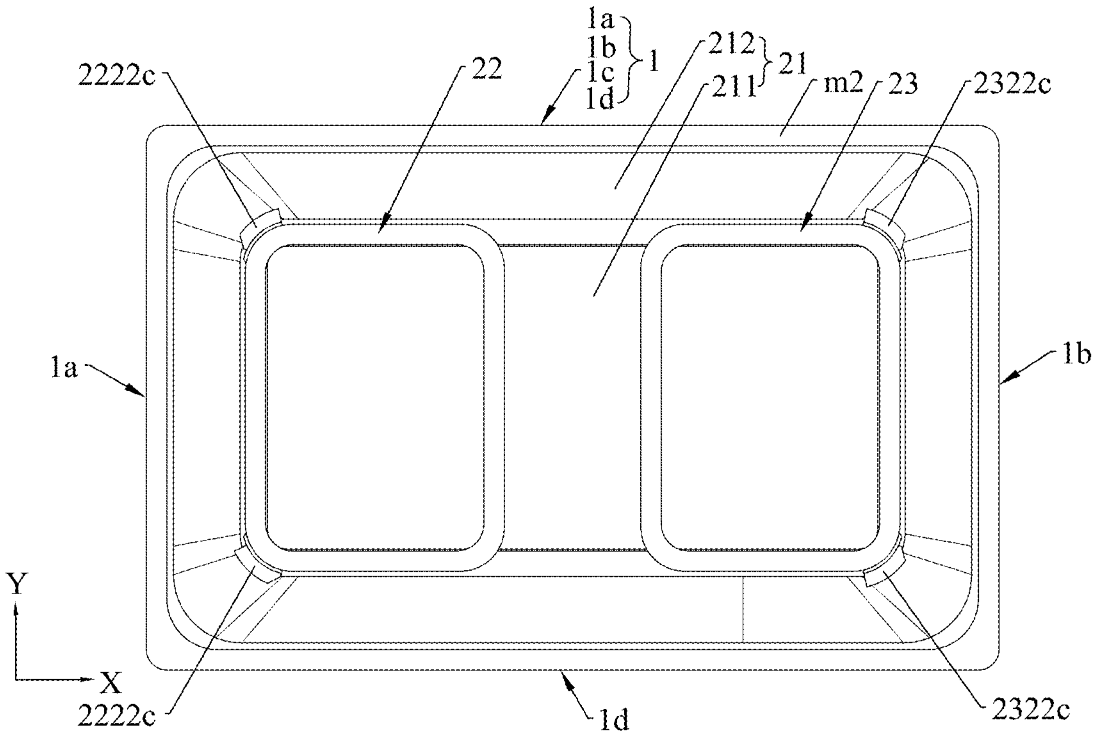
FIG. 30 is a bottom view of an assembly structure shown in FIG. 28.

Refer to FIG. 28 to FIG. 30. FIG. 28 is an assembly diagram of the first voice coil set 22 and the second voice coil set 23 shown in FIG. 26 and FIG. 27 and the diaphragm assembly 21 and the basket 1 shown in FIG. 24. FIG. 29*a* is a three-dimensional sectional view of an assembly structure shown in FIG. 28 in a line G-G. FIG. 29*b* is an enlarged view of a region C in the three-dimensional sectional view shown in FIG. 29*a*. FIG. 30 is a bottom view of an assembly structure shown in FIG. 28. The first voice coil set 22 and the second voice coil set 23 are located in the basket 1. The top surface 2221*a* of the first support part 2221 in the first voice coil set 22 and the top surface 2321*a* of the third support part 2321 in the second voice coil set 23 are fastened to the dome 211. The first voice coil set 22 and the second voice coil set 23 are arranged in an X-axis direction. To be specific, the first voice coil set 22 and the second voice coil set 23 are arranged in a length direction of the dome 211 in the diaphragm assembly 21. The first voice coil set 22 is located between a first short edge 1*a* and the second voice coil set 23. The second voice coil set 23 is located between the first voice coil set 22 and a second short edge 1*b*. The second outward extension units 2222*c* of the two second support parts 2222 in the first voice coil set 22 are disposed close to the first short side 1*a*. The fourth outward extension units 2322*c* of the two fourth support parts 2322 in the second voice coil set 23 are disposed close to the second short side 1*b*.

Figure 31:
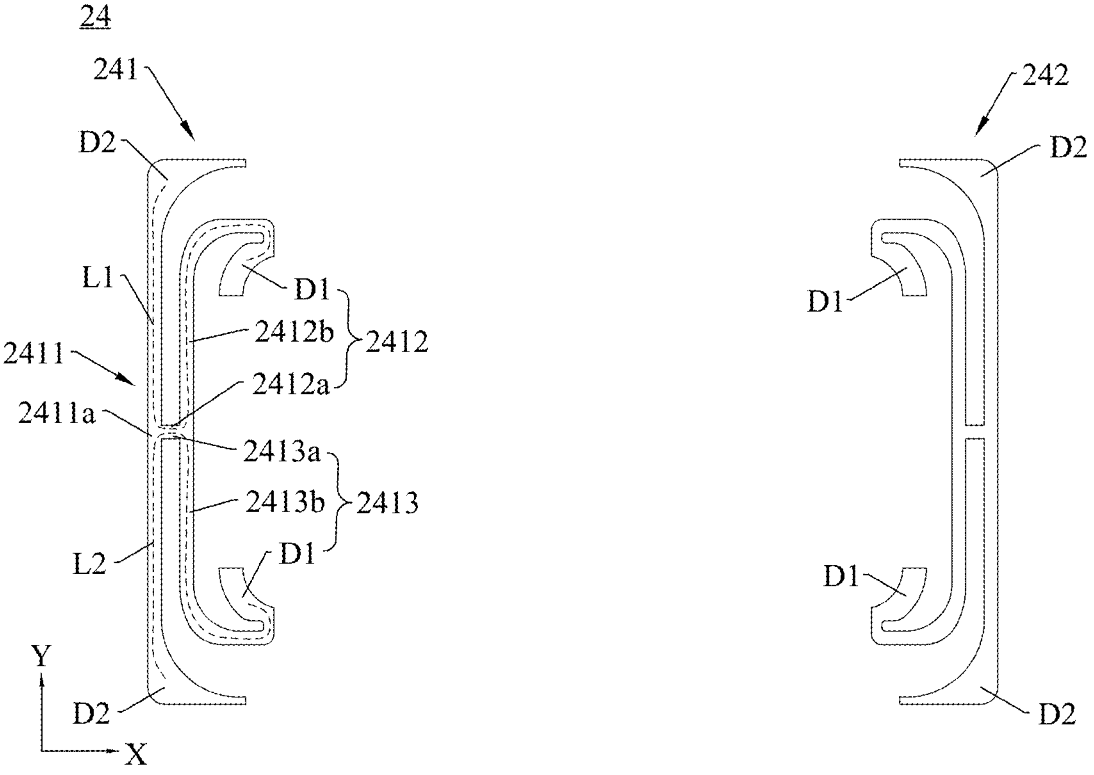
FIG. 31 is a schematic diagram of a structure of a second electrical connection structure in the core shown in FIG. 16.
Figure 32:
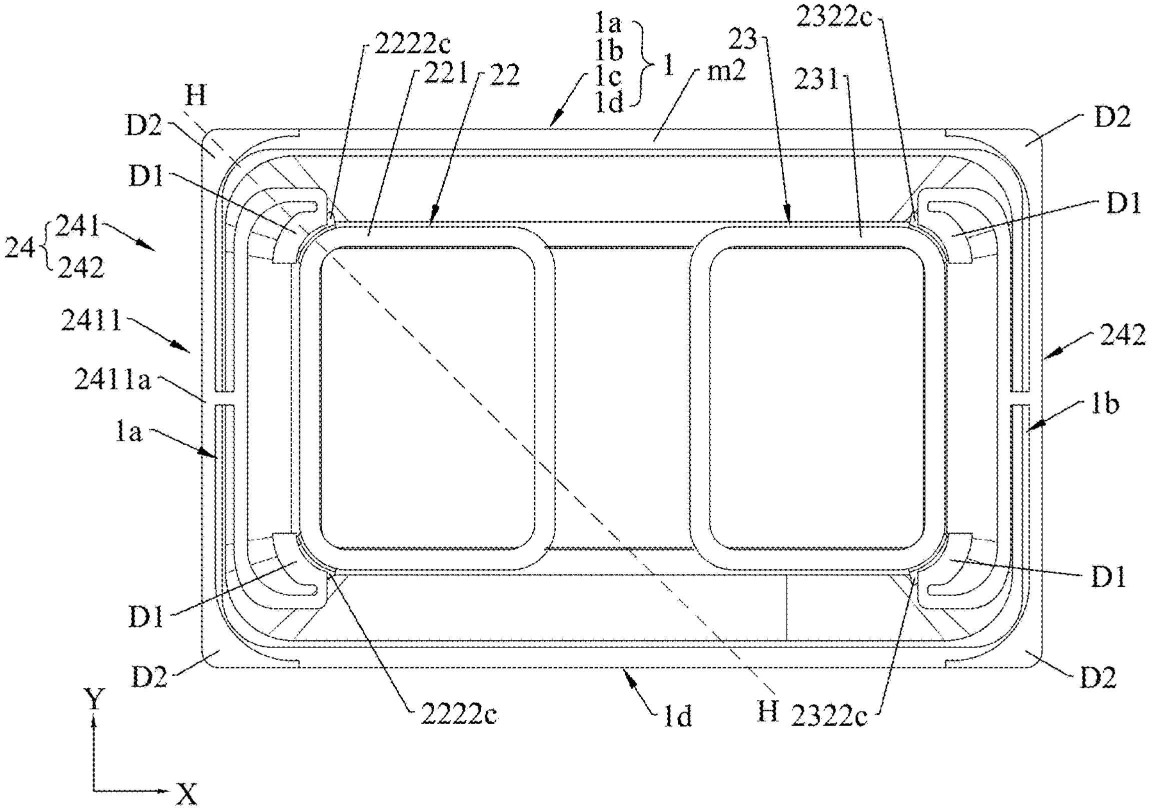
FIG. 32 is an assembly diagram of the second electrical connection structure shown in FIG. 31 and the first voice coil set, the second voice coil set, and the basket in FIG. 30.

Based on this, FIG. 31 is a schematic diagram of a structure of the second electrical connection structure 24 in the core 603 shown in FIG. 16. The second electrical connection structure 24 includes a first electrical connection unit 241 and a second electrical connection unit 242. FIG. 32 is an assembly diagram of the second electrical connection structure 24 shown in FIG. 31 and the first voice coil set 22, the second voice coil set 23, and the basket 1 in FIG. 30. The first electrical connection unit 241 is connected between the first short side 1*a* of the basket 1 and the first voice coil set 22. The second electrical connection unit 242 is connected between the second short side 1*b* of the basket 1 and the second voice coil set 23. In this way, a connection path between the first electrical connection unit 241 and the second electrical connection unit 242 is relatively short, and a volume may be manufactured to be relatively small. This helps to reduce costs for the core 603.

Specifically, still refer to FIG. 31 and FIG. 32. The first electrical connection unit 241 includes two first ends D1. The two first ends D1 of the first electrical connection unit 241 are respectively connected to two corners, away from the second voice coil set 23, of the first voice coil set 22. Specifically, the two first ends D1 are respectively fastened to the second outward extension units 2222*c* at the two corners, and are respectively electrically connected to the positive electrode and negative electrode of the first voice coil 221 at the two corners.

Figure 33:
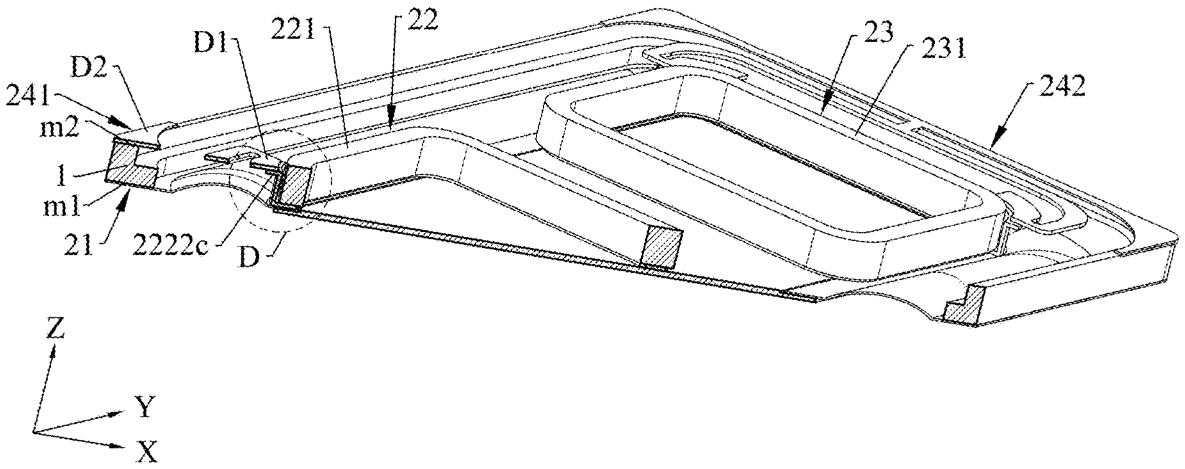
FIG. 33 is a three-dimensional sectional view of an assembly structure shown in FIG. 32 in a line H-H.
Figure 34:
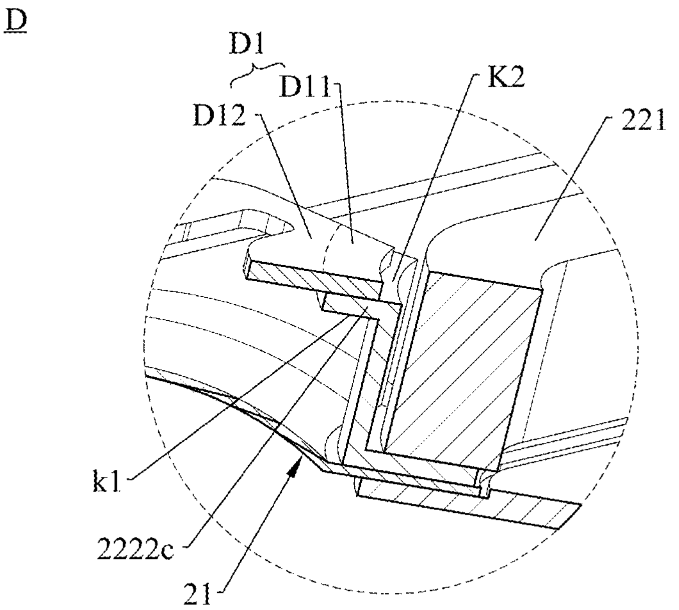
FIG. 34 is an enlarged view of a region D in the three-dimensional sectional view shown in FIG. 33.

The two first ends D1 of the first electrical connection unit 241 are respectively connected to the two corners of the first voice coil set 22 in a same manner. A connection structure at an upper left corner of the first voice coil set 22 in FIG. 32 is used as an example for the following description. Specifically, refer to FIG. 33 and FIG. 34. FIG. 33 is a three-dimensional sectional view of an assembly structure shown in FIG. 32 in a line H-H. FIG. 34 is an enlarged view of a region D in the three-dimensional sectional view shown in FIG. 33. The second outward extension unit 2222*c* includes a top surface K1 and a bottom surface K2. The top surface K1 faces the diaphragm assembly 21, and the bottom surface K2 is opposite to the top surface K1. The first end D1 of the first electrical connection unit 241 includes a first part D11 and a second part D12. The second part D12 is located on a side, away from the central axis of the core 603, of the first part D11. In some other embodiments, the second part D12 may alternatively be located on a side, close to the central axis of the core 603, of the first part D11, or the second part D12 and the first part D11 are arranged in a circumferential direction of the first voice coil set 22. The first end D1 of the first electrical connection unit 241 is fastened to the bottom surface K2 of the second outward extension unit 2222*c* by using the first part D11. The first end D1 of the first electrical connection unit 241 is electrically connected to the positive electrode or the negative electrode (not shown in the figure) of the first voice coil 221 by using the second part D12.

Similarly, refer to FIG. 31 and FIG. 32. The second electrical connection unit 242 includes two first ends D1. The two first ends D1 of the second electrical connection unit 242 are respectively connected to two corners, away from the first voice coil set 22, of the second voice coil set 23. Specifically, the two first ends D1 are respectively fastened to the fourth outward extension unit 2322*c* at the two corners, and are respectively electrically connected to a positive electrode and negative electrode of the second voice coil 231 at the two corners. For a specific connection manner in which the two first ends D1 of the second electrical connection unit 242 are respectively connected to the two corners of the second voice coil set 23, refer to the specific connection manner in which the first ends D1 of the first electrical connection unit 241 are respectively connected to the corners of the first voice coil set 22 shown in FIG. 33 and FIG. 34. The details are not described herein again.

In this way, the connection path between the first electrical connection unit 241 and the second electrical connection unit 242 is further shortened, and a volume of the second electrical connection structure 24 is reduced.

Figure 35:
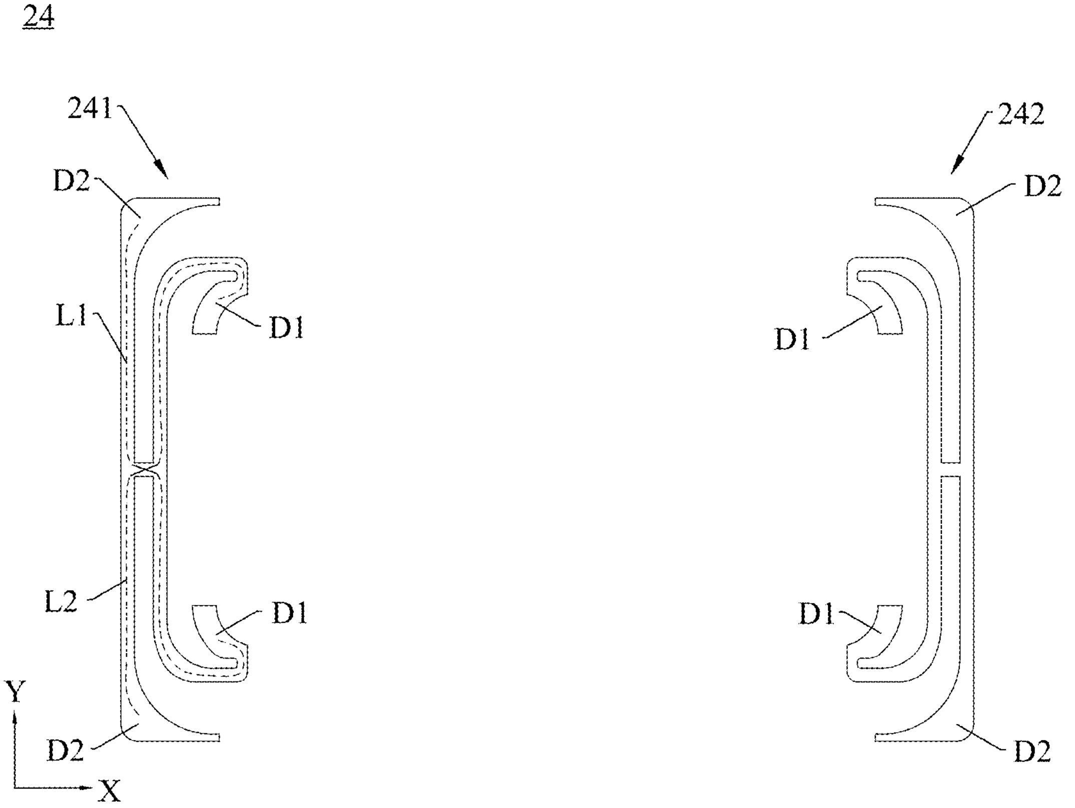
FIG. 35 is a schematic diagram of another structure of a second electrical connection structure in the core shown in FIG. 16.

Based on the foregoing embodiment, still refer to FIG. 31 and FIG. 32. The first electrical connection unit 241 further includes two second ends D2. The two second ends D2 of the first electrical connection unit 241 are respectively disposed at two ends of the first short side 1*a* of the basket 1. Specifically, the two second ends D2 of the first electrical connection unit 241 are respectively disposed at two ends, in a region on the first short side 1*a*, of a bottom surface m2 of the basket 1. In the first electrical connection unit 241, the two first ends D1 of the first electrical connection unit 241 are respectively electrically connected to the two second ends D2 of the first electrical connection unit 241. Specifically, electrical connection paths respectively between the two first ends D1 of the first electrical connection unit 241 and the two second ends D2 of the first electrical connection unit 241 may be a path L1 and a path L2 in FIG. 31, or a path L1 and a path L2 in FIG. 35 respectively.

In this way, an electrical input end of the first voice coil 221 is led out to two ends of the first short side 1*a*, and two second ends D2 of the first electrical connection unit 241 form two external terminals of the core 603. The two external terminals are configured to be respectively electrically connected to the second end n2 and the third end n3 of the first electrical connection structure 604 in FIG. 10, to further introduce an audio electrical signal into the first voice coil 221. Because a length of the first short side 1*a* is relatively short, a distance between two the external terminals of the core 603 is relatively short. This helps to reduce a distance between the second end n2 and the third end n3 of the first electrical connection structure 604, and reduces a volume occupied by the first electrical connection structure 604 in the rear cavity of the speaker module 60.

Similarly, the second electrical connection unit 242 further includes two second ends D2. The two second ends D2 of the second electrical connection unit 242 are respectively disposed at two ends of the second short side 1*b* of the basket 1. Specifically, the two second ends D2 of the second electrical connection unit 242 are respectively disposed at two ends of a region on the second short side 1*b* of the bottom surface m2 of the basket 1. In the second electrical connection unit 242, the two first ends D1 of the second electrical connection unit 242 are respectively electrically connected to the two second ends D2 of the second electrical connection unit 242.

In this way, an electrical input end of the second voice coil 231 is led out to two ends of the second short side 1*b*, and two second ends D2 of the second electrical connection unit 242 form two other external terminals of the core 603. The two external terminals are configured to be respectively electrically connected to the second end n2 and the third end n3 of the first electrical connection structure 604 in FIG. 10, to further introduce an electrical signal into the second voice coil 231.

In some other embodiments, the two second ends D2 of the first electrical connection unit 241 may alternatively be disposed at two ends of a first long side 1*c*, and the two second ends D2 of the second electrical connection unit 242 may alternatively be disposed on two ends of a second long side 1*d*. This is not specifically limited herein.

In the foregoing embodiment, because the two second ends D2 of the first electrical connection unit 241 are respectively disposed at the two ends of the first short side 1*a*, the two second ends D2 of the second electrical connection unit 242 are respectively disposed at the two ends of the second short side 1*b*, and the basket 1 is enclosed and formed by sequentially connecting the first short side 1*a*, the first long side 1*c*, the second short side 1*b*, and the second long side 1*d*, from another perspective, one second end D2 of the first electrical connection unit 241 and one second end D2 of the second electrical connection unit 242 are respectively located at the two ends of the first long side 1*c* of the basket 1, and the other second end D2 of the first electrical connection unit 241 and the other second end D2 of the second electrical connection unit 242 are respectively located at the two ends of the second long side Id of the basket 1.

Figure 36:
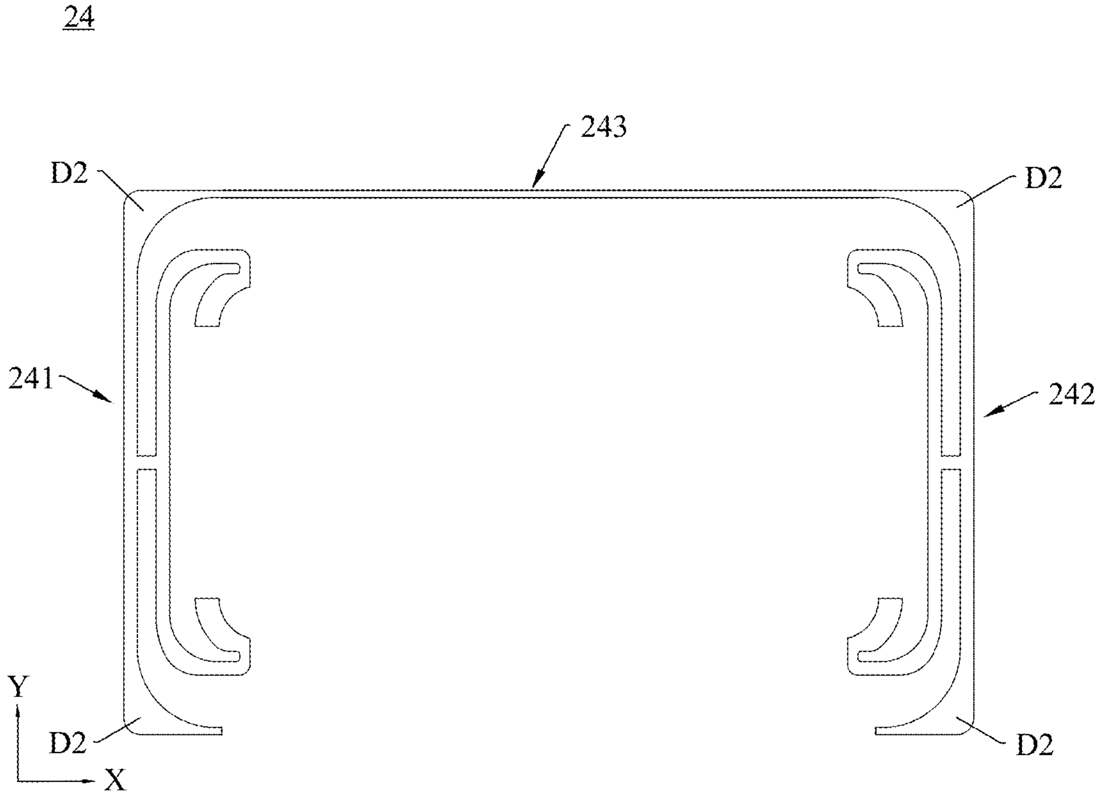
FIG. 36 is a schematic diagram of a structure of a second electrical connection structure according to some other embodiments of this application.
Figure 37:
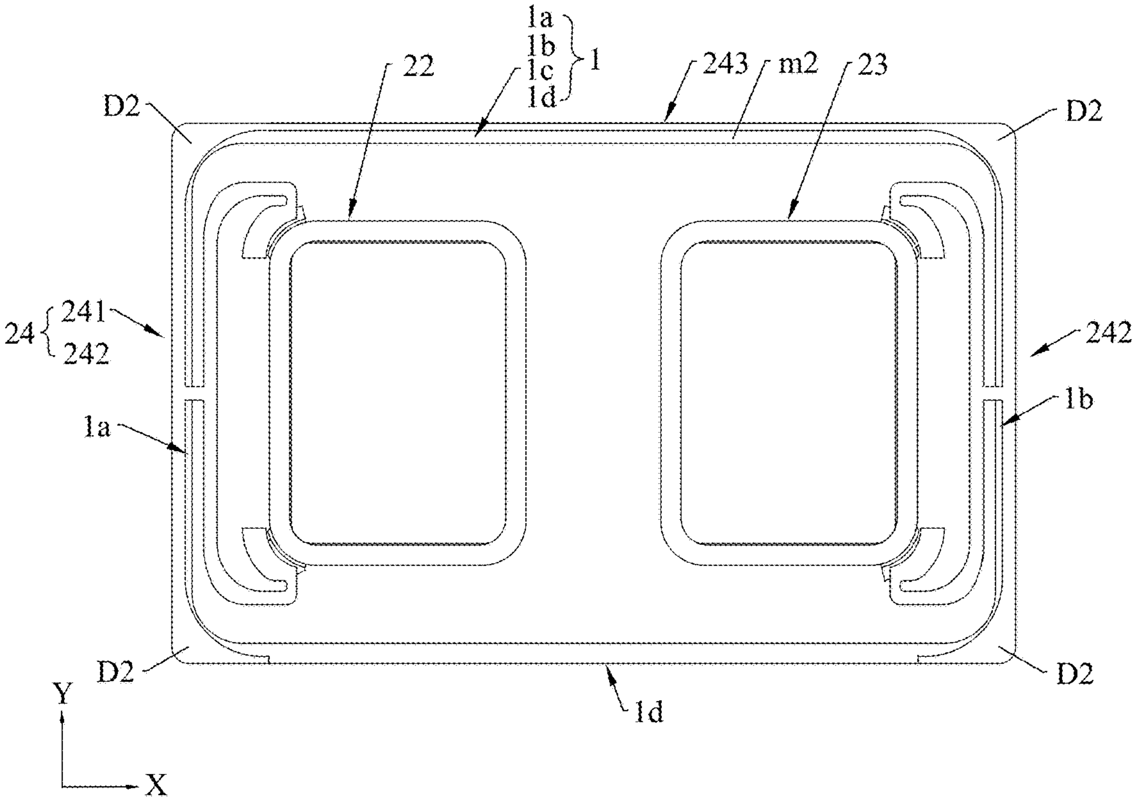
FIG. 37 is an assembly diagram of the second electrical connection structure shown in FIG. 36 and the first voice coil set, the second voice coil set, and the basket in FIG. 30.

Based on this, to reduce a quantity of external terminals of the core 603 for being electrically connected to the first electrical connection structure 604 in FIG. 10, in some examples, refer to FIG. 36 and FIG. 37. FIG. 36 is a schematic diagram of a structure of a second electrical connection structure 24 according to some other embodiments of this application. FIG. 37 is an assembly diagram of the second electrical connection structure 24 shown in FIG. 36 and the first voice coil set 22, the second voice coil set 23, and the basket 1 in FIG. 30. In addition to the first electrical connection unit 241 and the second electrical connection unit 242, the second electrical connection structure 24 provided in this embodiment further includes an electrical connection segment 243. The electrical connection segment 243 is fastened to a first long side 1*c*, and electrically connects two second ends D2 located at two ends of the first long side 1*c*. In this way, the first voice coil set 22 and the second voice coil set 23 are connected in series through the electrical connection segment 243, and two second ends D2 located at two ends of a second long side 1*d* form two external terminals of the core 603. This reduces a quantity of external terminals of the core 603, to help to be electrically connected to the first electrical connection structure 604 in FIG. 10.

In some other embodiments, the electrical connection segment 243 is fastened to the second long side 1*d* and electrically connects the two second ends D2 located at the two ends of the second long side 1*d*. In this way, the first voice coil set 22 and the second voice coil set 23 are connected in series through the electrical connection segment 243, and two second ends D2 located at two ends of the first long side 1*c* form two external terminals of the core 603. This reduces a quantity of external terminals of the core 603, to help to be electrically connected to the first electrical connection structure 604 in FIG. 10.

With reference to the first electrical connection unit 241 described in any one of the foregoing embodiments, to prevent the first electrical connection unit 241 from hindering movement of the first voice coil set, in some embodiments, refer to FIG. 31 and FIG. 32. The first electrical connection unit 241 is a flexible electrical connection structure. The flexible electrical connection structure includes but is not limited to an FPC and a structure formed by connecting a plurality of conducting wires by using a flexible structure. The flexible electrical connection structure includes a body 2411, a first branch 2412, and a second branch 2413. The body 2411 includes a central part 2411*a* and two second ends D2 located on two opposite sides of the central part 2411*a*. The central part 2411*a* is disposed in a region, on the second short side 1*b*, of the bottom surface m2 of the basket 1. The first branch 2412 includes a head end 2412*a*, one first end D1, and a connection segment 2412*b* connected between the head end 2412*a* and the first end D1. The second branch 2413 includes a head end 2413*a*, the other first end D1, and a connection segment 2413*b* connected between the head end 2413*a* and the other first end D1.

Both the head end 2412*a* of the first branch 2412 and the head end 2413*a* of the second branch 2413 are connected to the central part 2411*a* of the body 2411. For example, the head end 2412*a* of the first branch 2412 is connected to the head end 2413*a* of the second branch 2413, and the head end 2412*a* and the head end 2413*a* are spliced, and then connected to the central part 2411*a* of the body 2411. In some other embodiments, the head end 2412*a* of the first branch 2412 and the head end 2413*a* of the second branch 2413 are respectively connected to different positions at the central part 2411*a* of the body 2411, and a gap is formed between the head end 2412*a* and the head end 2413*a*.

The two first ends D1 are spaced apart, and are spaced apart from the body 2411. The two first ends D1 are movable ends, and may move relative to the body 2411. When a force is applied to the two first ends D1, to enable two first ends D1 to move relative to the body 2411, the connection segment 2412*b* of the first branch 2412 may be driven to move relative to the body 2411 and the connection segment 2413*b* of the second branch 2413. This may prevent the first electrical connection unit 241 from hindering movement of the first voice coil set 22.

The second electrical connection unit 242 is also a flexible electrical connection structure. Specifically, a structure of the second electrical connection unit 242 may be the same as and symmetric to the structure of the first electrical connection unit 241, to prevent the second electrical connection unit 242 from hindering movement of the second voice coil set 23. The structure of the second electrical connection unit 242 is not described in this application.

Figure 38:
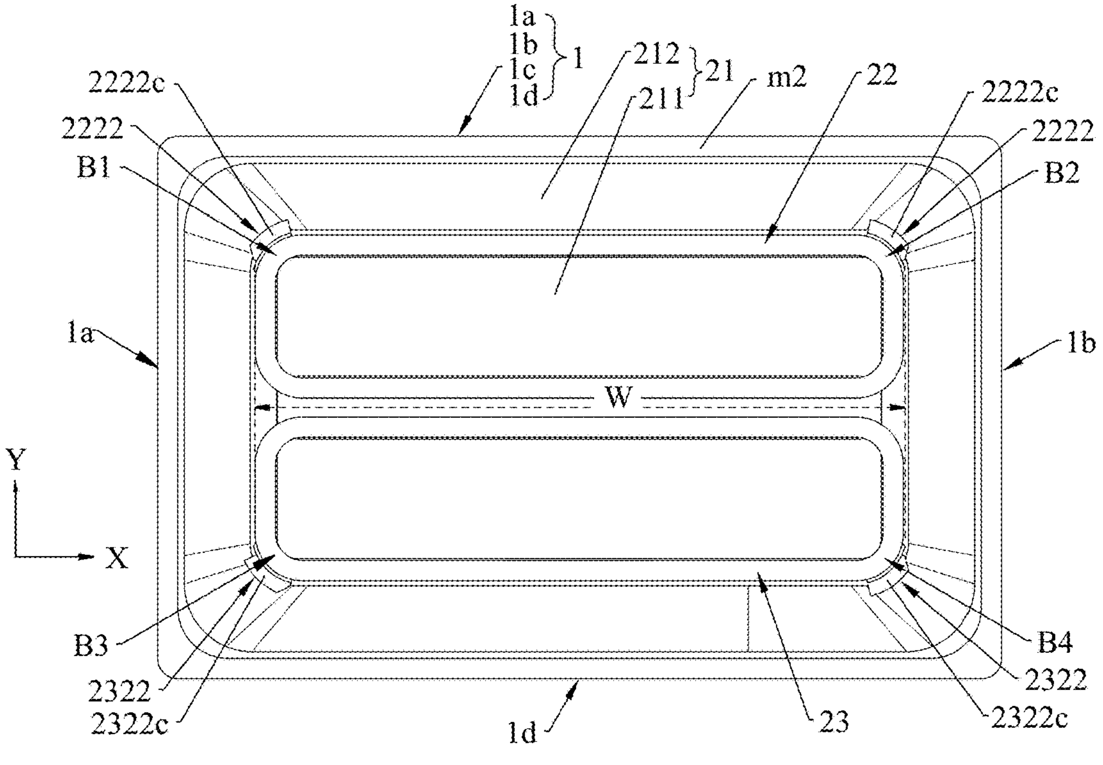
FIG. 38 is a bottom view of an assembly structure of a first voice coil set, a second voice coil set, a diaphragm assembly, and a basket in a core according to some other embodiments of this application.

In some other embodiments, FIG. 38 is a bottom view of an assembly structure of a first voice coil set 22, a second voice coil set 23, a diaphragm assembly 21, and a basket 1 in a core 603 according to some other embodiments of this application. A difference between this embodiment and the embodiment shown in FIG. 28 to FIG. 30 is as follows. In this embodiment, the first voice coil set 22 and the second voice coil set 23 are arranged in a Y-axis direction. In other words, the first voice coil set 22 and the second voice coil set 23 are arranged in a width direction of a dome 211 in the diaphragm assembly 21. In this way, a sectional width (that is, W in FIG. 38) of the dome 211 in a symmetrical plane between the first voice coil set 22 and the second voice coil set 23 is relatively large, and a strength is relatively high. When the first voice coil set 22 and the second voice coil set 23 are in a process of driving the diaphragm assembly 21, the dome 211 is hardly broken when the first voice coil set 22 and the second voice coil set 23 cannot move synchronously due to an error.

A difference between the foregoing embodiment and the embodiment shown in FIG. 28 to FIG. 30 is as follows. Still refer to FIG. 38. The first voice coil set 22 and the second voice coil set 23 are rectangularly annular. An extension direction of the long side of the first voice coil set 22 and an extension direction of the long side of the second voice coil set 23 are the same as an X-axis direction. An extension direction of the short side of the first voice coil set 22 and an extension of the short side of the second voice coil set 23 are the same as a Y-axis direction. Two corners, away from the second voice coil set 23, of the first voice coil set 22 are respectively a first corner B1 and a second corner B2. The first corner B1 is located between the first short side 1*a* of the basket 1 and the second corner B2. The second corner B2 is located between the first corner B1 and the second short side 1*b* of the basket 1. The two second support parts 2222 of the first voice coil set 22 are respectively disposed at the first corner B1 and the second corner B2, and the positive electrode and the negative electrode of the first voice coil 221 in the first voice coil set 22 are respectively led out from the first corner B1 and the second corner B2. Two corners, away from the first voice coil set 22, of the second voice coil set 23 are respectively a third corner B3 and a fourth corner B4. The third corner B3 is located between the first short side 1*a* of the basket 1 and the fourth corner B4. The fourth corner B4 is located between the third corner B3 and the second short side 1*b* of the basket 1. The two fourth support parts 2322 of the second voice coil set 23 are respectively disposed at the third corner B3 and the fourth corner B4, and the positive electrode and the negative electrode of the second voice coil 231 in the second voice coil set 23 are respectively led out from the third corner B3 and the fourth corner B4.

In this way, a distance between the first corner B1 or the third corner B3, and the first short side 1*a* is relatively short, and a distance between the second corner B2 or the fourth corner B4, and the second short side 1*b* is relatively short, to help to dispose the second electrical connection structure 24.

Figure 39:
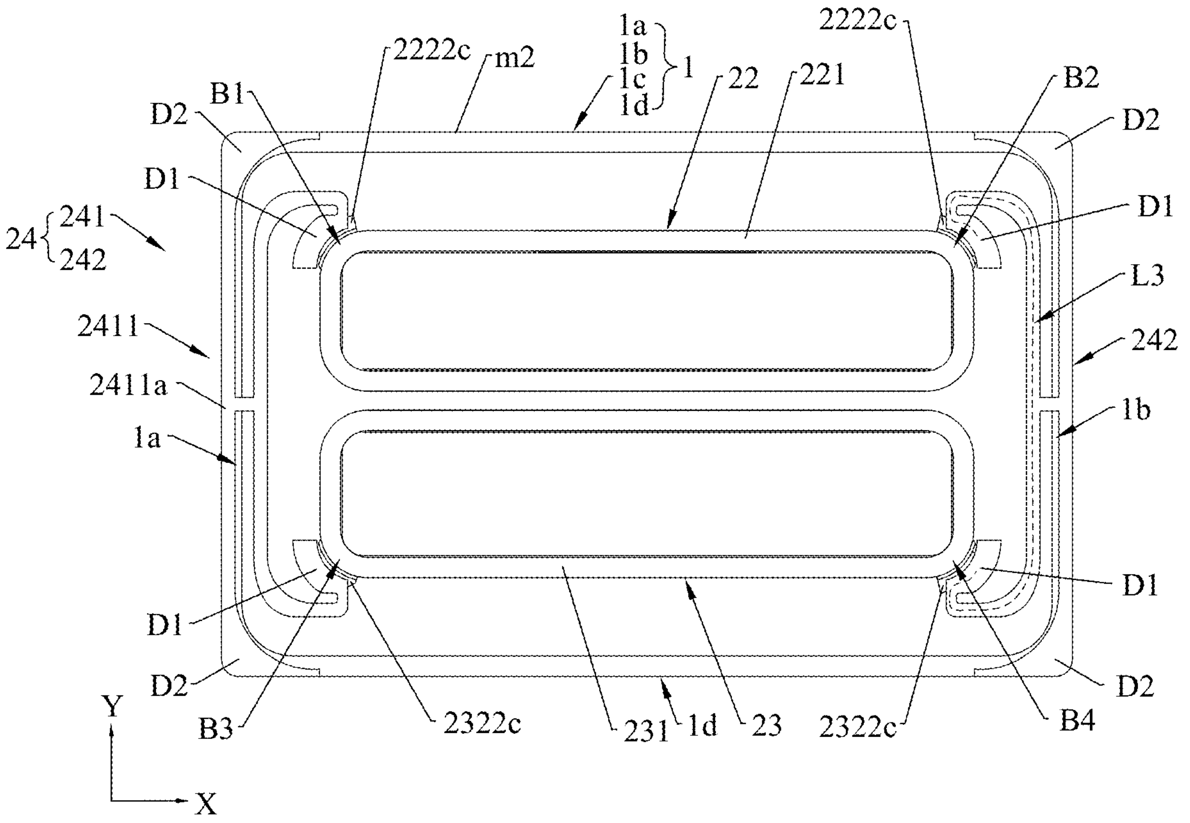
FIG. 39 is an assembly diagram of the first voice coil set, the second voice coil set, the basket, and a second electrical connection structure in FIG. 38.

Based on this, the core 603 further includes a second electrical connection structure 24. The second electrical connection structure 24 has a same shape as the second electrical connection structure 24 shown in FIG. 31. FIG. 39 is an assembly diagram of the first voice coil set 22, the second voice coil set 23, the basket 1, and the second electrical connection structure 24 in FIG. 38. The second electrical connection structure 24 includes a first electrical connection unit 241 and a second electrical connection unit 242. The first electrical connection unit 241 is connected between the first voice coil set 22, the second voice coil set 23, and the first short side 1*a* that is of the basket 1. The second electrical connection unit 242 is connected between the first voice coil set 22, the second voice coil set 23, and the second short side 1*b* that is of the basket 1. In this way, a connection path between the first electrical connection unit 241 and the second electrical connection unit 242 is relatively short, and a volume may be manufactured to be relatively small. This helps to reduce costs for the core 603.

Specifically, still refer to FIG. 39. The first electrical connection unit 241 includes two first ends D1. The two first ends D1 of the first electrical connection unit 241 are respectively connected to the first corner B1 of the first voice coil set 22 and the third corner B3 of the second voice coil set 23. Specifically, the first end D1 at the first corner B1 is fastened to a second outward extension unit 2222*c* at the first corner B1, and is electrically connected to the positive electrode or negative electrode of the first voice coil 221 at the first corner B1. The first end D1 at the third corner B3 is fastened to a fourth outward extension unit 2322*c* at the third corner B3, and is electrically connected to the positive electrode or negative electrode of the second voice coil 231 at the third corner B3.

Specifically, a connection structure of each corner may be the same as a connection structure of the corner shown in FIG. 34. The details are not described herein again.

Similarly, the second electrical connection unit 242 includes two first ends D1. The two first ends D1 of the second electrical connection unit 242 are respectively connected to the second corner B2 of the first voice coil set 22 and the fourth corner B4 of the second voice coil set 23. Specifically, the first end D1 at the second corner B2 is fastened to the second outward extension unit 2222*c* at the second corner B2, and is electrically connected to the negative electrode or positive electrode of the first voice coil 221 at the second corner B2. The first end D1 at the fourth corner B4 is fastened to the fourth outward extension unit 2322*c* at the fourth corner B4, and is electrically connected to the negative electrode or positive electrode of the second voice coil 231 at the fourth corner B4.

In this way, the connection path between the first electrical connection unit 241 and the second electrical connection unit 242 is further shortened, and a volume of the second electrical connection structure 24 is reduced.

Based on the foregoing embodiment, still refer to FIG. 39. The first electrical connection unit 241 further includes two second ends D2. The two second ends D2 of the first electrical connection unit 241 are respectively disposed at two ends of the first short side 1*a* of the basket 1. Optionally, the two second ends D2 of the first electrical connection unit 241 are respectively disposed at two ends, in a region on the first short side 1*a*, of a bottom surface m2 of the basket 1. In the first electrical connection unit 241, the two first ends D1 of the first electrical connection unit 241 are respectively electrically connected to the two second ends D2 of the first electrical connection unit 241.

In this way, an electrical input end of the first voice coil 221 is led out to two ends of the first short side 1*a*, and two second ends D2 of the first electrical connection unit 241 form two external terminals of the core 603. The two external terminals are configured to be respectively electrically connected to the second end n2 and the third end n3 of the first electrical connection structure 604 in FIG. 10, to further introduce an electrical signal into the first voice coil 221. Because a length of the first short side 1*a* is relatively short, a distance between two the external terminals of the core 603 is relatively short. This helps to reduce a distance between the second end n2 and the third end n3 of the first electrical connection structure 604, and reduces a volume occupied by the first electrical connection structure 604 in the rear cavity of the speaker module 60.

Based on the foregoing embodiment, optionally, the second electrical connection unit 242 electrically connects the two first ends D1 of the second electrical connection unit 242. For example, an electrical connection path between the two first ends D1 of the second electrical connection unit 242 may be L3. In this way, the first voice coil set 22 and the second voice coil set 23 are connected in series through the second electrical connection unit 242. Two external terminals of the core 603 may be formed by using only the two second ends D2 of the first electrical connection unit 241. This reduces a quantity of external terminals of the core 603, to help to be electrically connected to the first electrical connection structure 604 in FIG. 10.

It should be noted that, in addition to the X-axis direction or the Y-axis direction, an arrangement direction of the first voice coil set 22 and the second voice coil set 23 may be another direction in an XY plane. This is not specifically limited in this application.

Figure 40:
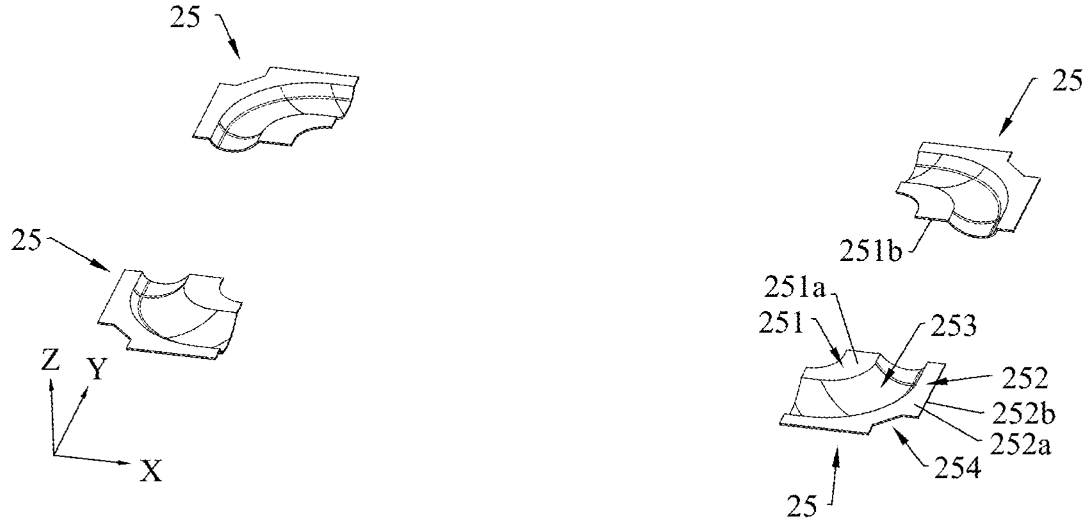
FIG. 40 is a schematic diagram of a structure of four auxiliary diaphragms in the core shown in FIG. 16.

FIG. 40 is a schematic diagram of a structure of four auxiliary diaphragms 25 in the core 603 shown in FIG. 16. The four auxiliary diaphragms 25 are configured to: during operation of the core 603, play a role of suppressing swinging of the first voice coil set 22 and the second voice coil set 23, to suppress the first voice coil set 22 and the second voice coil set 23 from swinging, and prevent the first voice coil set 22 and the second voice coil set 23 from generating rocking. This enables the core 603 to have good sound quality.

Specifically, the four auxiliary diaphragms 25 have a same structure. The auxiliary diaphragm 25 is approximately sector-shaped. The auxiliary diaphragm 25 includes a first fastening part 251, a bent annular part 252, and a second fastening part 253 that are connected sequentially. The first fastening part 251 is located on an inner side of the bent annular part 252. The first fastening part 251 includes a top surface 251*a* and a bottom surface 251*b*. The second fastening part 253 is located on an outer side of the bent annular part 252. The second fastening part 253 includes a top surface 253*a* and a bottom surface 253*b*. A sectional shape of the bent annular part 252 of the auxiliary diaphragm 25 is arc-shaped or approximately arc-shaped, and an extension track of the bent annular part 252 is arc-shaped. The bent annular part 252 of the auxiliary diaphragm 25 is concave. To be specific, the bent annular part 252 is concave toward a side, away from the top surface 251*a* of the first fastening part 251, of the bottom surface 251*b* of the first fastening part 251. When an external force is applied to the bent annular part 252 of the auxiliary diaphragm 25, the first fastening part 251 and the second fastening part 253 vibrate relative to each other in a Z-axis direction. A notch 254 is formed on a side, away from the first fastening part 251, of the second fastening part 253 of the auxiliary diaphragm 25. The notch 254 is configured to expose the second end D2 of the second electrical connection structure 24 in FIG. 32.

Figure 41:
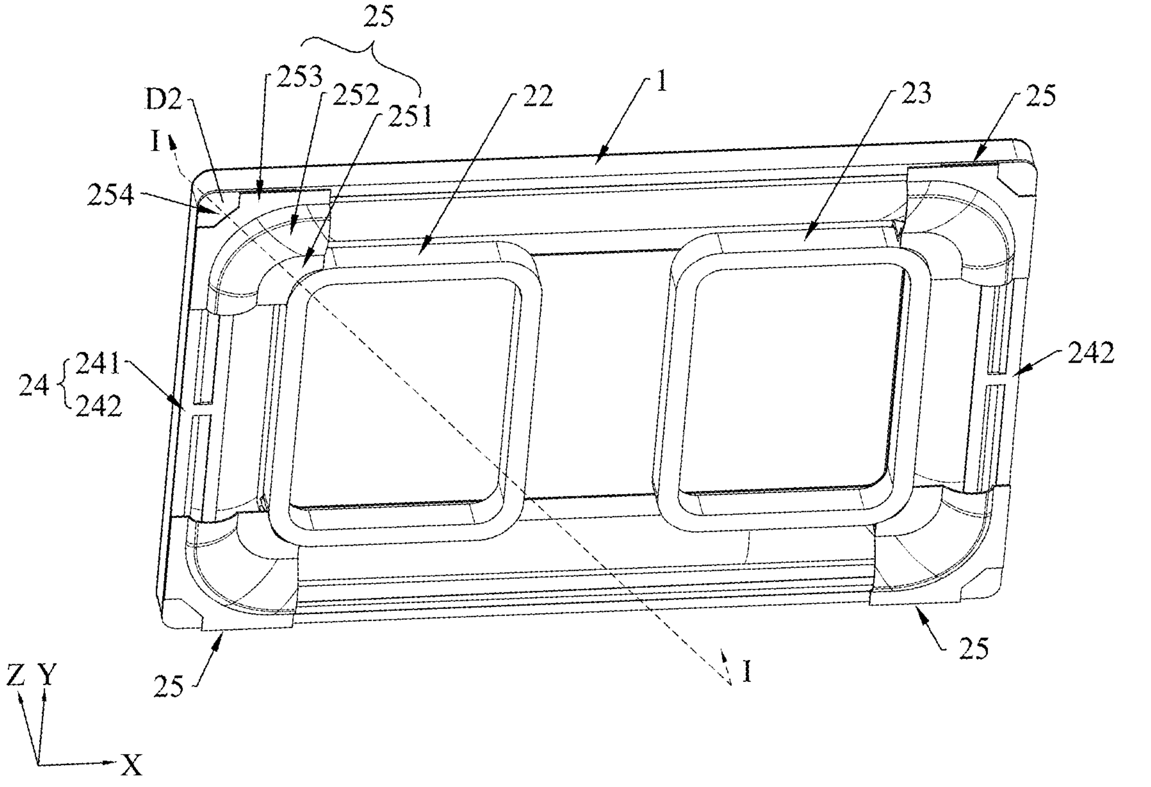
FIG. 41 is an assembly diagram of the four auxiliary diaphragms shown in FIG. 40 and the diaphragm assembly, the first voice coil set, the second voice coil set, the basket, and the second electrical connection structure in FIG. 32.

FIG. 41 is an assembly diagram of the four auxiliary diaphragms 25 shown in FIG. 40 and the diaphragm assembly 21, the first voice coil set 22, the second voice coil set 23, the basket 1, and the second electrical connection structure 24 in FIG. 32. In the four auxiliary diaphragms 25, the first fastening parts 251 of the two auxiliary diaphragms 25 are fastened to ends, away from the diaphragm assembly 21, of the first voice coil set 22, and the first fastening parts 251 of the other two auxiliary diaphragms 25 are fastened to ends, away from the diaphragm assembly 21, of the second voice coil set 23. The second fastening parts 253 of the four auxiliary diaphragms 25 are all fastened to the basket 1. In this way, ends, away from the diaphragm assembly 21, of the voice coil sets (including the first voice coil set 22 and the second voice coil set 23) are supported on the basket 1 by using the four auxiliary diaphragms 25. This can enable the voice coil sets to be back in position, prevent the voice coil sets from vibrating during operation, and prevent generation of rolling vibration. The notch 254 of the auxiliary diaphragm 25 is configured to expose a second end D2 of the second electrical connection structure 24, to help to externally connect the first electrical connection structure 604 in FIG. 10.

The four auxiliary diaphragms 25 are connected to the voice coil set in a same manner, and the four auxiliary diaphragms 25 are connected to the basket 1 in a same manner. The following uses an example in which one of the auxiliary diaphragms 25 is connected to the voice coil set and the basket 1 for description.

Figure 42:
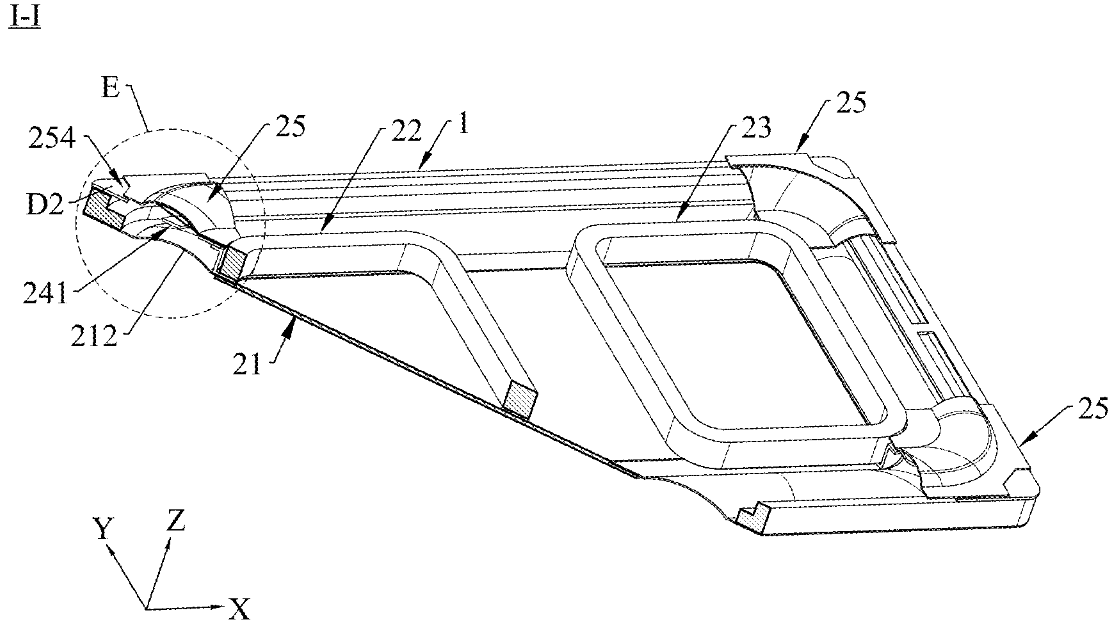
FIG. 42 is a three-dimensional sectional view of the assembly diagram shown in FIG. 41 in a line I-I.
Figure 43:
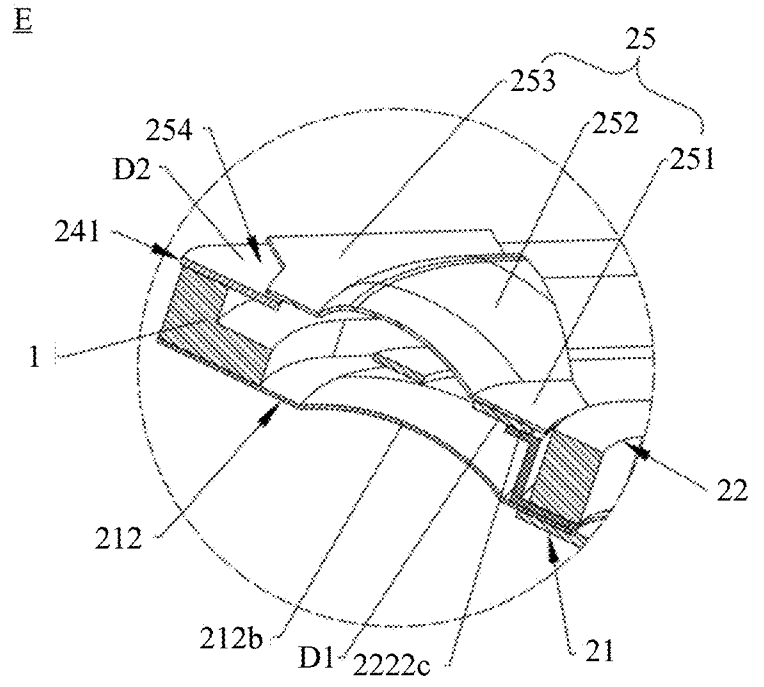
FIG. 43 is an enlarged view of the three-dimensional sectional view shown in FIG. 42 in a region E.

Specifically, refer to FIG. 42 and FIG. 43. FIG. 42 is a three-dimensional sectional view of the assembly diagram shown in FIG. 41 in a line I-I. FIG. 43 is an enlarged view of the three-dimensional sectional view shown in FIG. 42 in a region E. The first fastening part 251 of the auxiliary diaphragm 25 is fastened to a surface, away from a second outward extension unit 2222*c*, of the first end D1. The second fastening part 252 of the auxiliary diaphragm 25 is fastened to a surface, away from the basket 1, of a first electrical connection unit 241.

Based on the foregoing embodiment, still refer to FIG. 42 and FIG. 43. Both the bent annular part 252 of the auxiliary diaphragm 25 and a bent annular part 212*b* of a diaphragm 212 in the diaphragm assembly 21 are concave. In this way, during vibration of the voice coil set, a deformation direction of the bent annular part 212*b* of the diaphragm 212 in the diaphragm assembly 21 is the same as a deformation direction of the bent annular part 252 of the auxiliary diaphragm 25. This may better suppress swinging of the voice coil set. In some other parallel embodiments that produce same effect, both the bent annular part 212*b* of the diaphragm 212 in the diaphragm assembly 21 and the bent annular part 252 of the auxiliary diaphragm 25 are convex.

In some embodiments, central axes of the bent annular parts 252 of the four auxiliary diaphragms 25 are respectively collinear with central axes of four rounded corners of the bent annular parts 212*b* in the diaphragm 212. In this way, a resistance force of the diaphragm 212 and the auxiliary diaphragm 25 to the voice coil set may be reduced, to ensure smooth vibration of the voice coil set.

Based on this, radii of the bent annular parts 252 of the four auxiliary diaphragms 25 may be respectively equal to or different from radii of the four rounded corners of the bent annular parts 212*b* in the diaphragm 212. This is not specifically limited herein.

Figure 44:
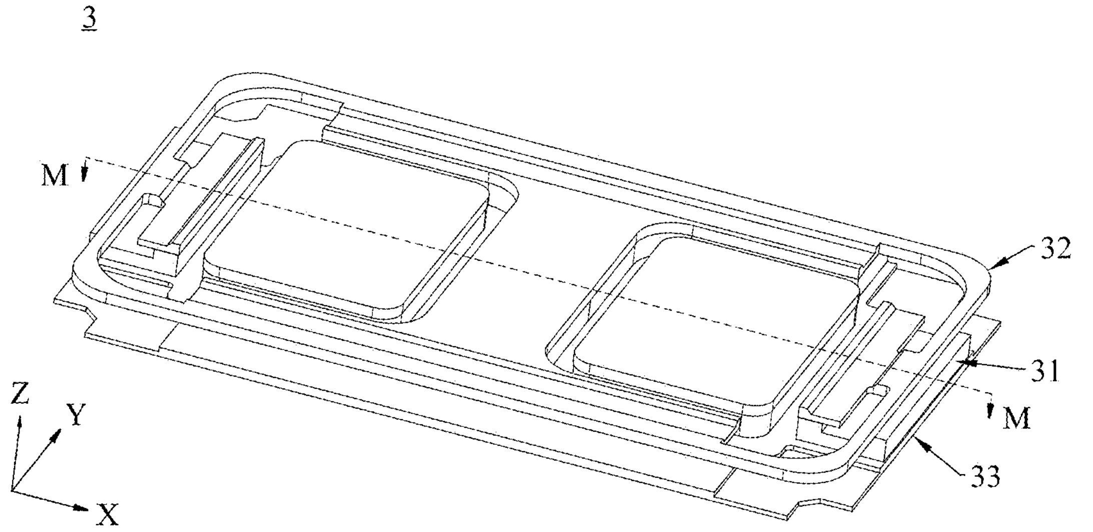
FIG. 44 is a schematic diagram of a structure of a magnetic circuit system in the core shown in FIG. 16.
Figure 45:
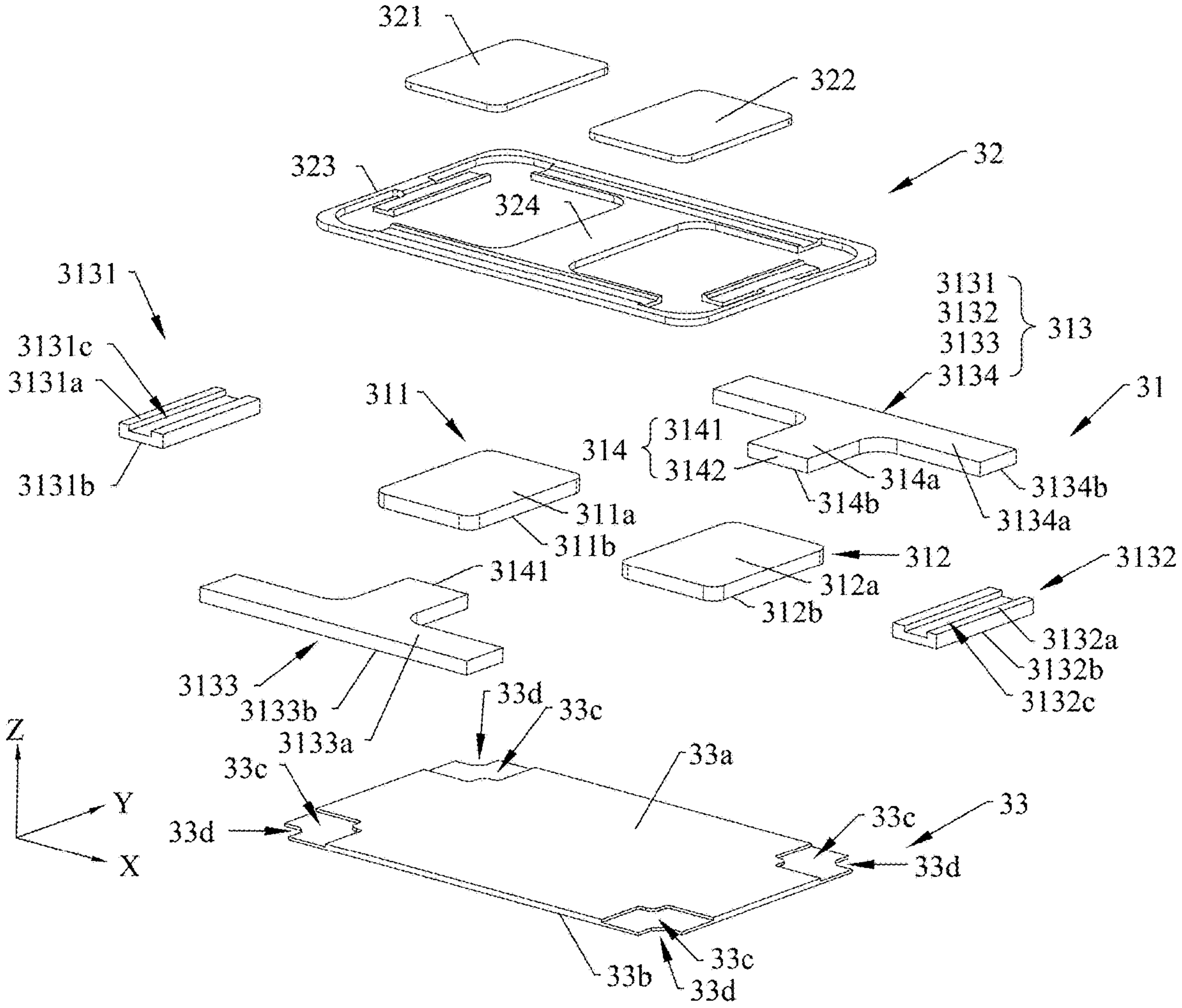
FIG. 45 is an exploded view of the magnetic circuit system shown in FIG. 44.

Refer to FIG. 16. The magnetic circuit system 3 is fastened to the basket 1. The magnetic circuit system 3 is configured to match the first voice coil set 22 and the second voice coil set 23 to drive synchronous vibration of the diaphragm assembly 21. Refer to FIG. 44 and FIG. 45. FIG. 44 is a schematic diagram of a structure of the magnetic circuit system 3 in the core 603 shown in FIG. 16. FIG. 45 is an exploded view of the magnetic circuit system 3 shown in FIG. 44. The magnetic circuit system 3 includes a magnet assembly 31, a first magnetically conductive yoke 32, and a second magnetically conductive yoke 33.

The magnet assembly 31 includes a first central magnet 311, a second central magnet 312, a side magnet 313, and an inner magnet 314. The first central magnet 311 is spaced apart from the second central magnet 312. The side magnet 313 is circumferentially disposed around a central magnet set including the first central magnet 311 and the second central magnet 312. The inner magnet 314 is disposed in a gap between the first central magnet 311 and the second central magnet 312. In addition, the inner magnet 314 and the first central magnet 311 are spaced apart, and the inner magnet 314 and the second central magnet 312 are spaced apart.

The magnet assembly 31 includes a top surface and a bottom face that are opposite to each other. Specifically, the first central magnet 311 includes a top surface 311*a* and a bottom surface 311*b* that are opposite to each other. The second central magnet 312 includes a top surface 312*a* and a bottom surface 312*b* that are away from each other. The side magnet 313 includes a top surface and a bottom face that are opposite to each other. The inner magnet 314 includes a top surface 314*a* and a bottom surface 314*b* that are opposite to each other. The top surface 311*a* of the first central magnet 311, the top surface 312*a* of the second central magnet 312, the top surface of the side magnet 313, and the top surface 314*a* of the inner magnet 314 form a top surface of the magnet assembly 31. The bottom surface 311*b* of the first central magnet 311, the bottom surface 312*b* of the second central magnet 312, the bottom surface of the side magnet 313, and the bottom surface 314*b* of the inner magnet 314 form a bottom surface of the magnet assembly 31.

In some embodiments, the side magnet 313 includes a first side magnet 3131, a second side magnet 3132, a third side magnet 3133, and a fourth side magnet 3134. The first side magnet 3131 and the second side magnet 3132 are respectively disposed on two opposite sides of the central magnet set (including the first central magnet 311 and the second central magnet 312). An arrangement direction of the first side magnet 3131 and the second side magnet 3132 is the same as an arrangement direction of the first central magnet 311 and the second central magnet 312 in the central magnet set. The third side magnet 3133 and the fourth side magnet 3134 are respectively disposed on two other opposite sides of the central magnet set. In addition, an arrangement direction of the third side magnet 3133 and the fourth side magnet 3134 is perpendicular to an arrangement direction of the first central magnet 311 and the second central magnet 312 in the central magnet set.

The inner magnet 314 is located between the third side magnet 3133 and the fourth side magnet 3134, and the inner magnet 314 includes a first inner magnet segment 3141 and a second inner magnet segment 3142. The first inner magnet segment 3141 is disposed close to the third side magnet 3133 and integrally formed with the third side magnet 3133. The second inner magnet segment 3142 is disposed close to the fourth side magnet 3134 and integrally formed with the fourth side magnet 3134. In this way, two T-shaped magnets are formed. In some other embodiments, the inner magnet 314 may be separated or spaced apart from the third side magnet 3133 and the fourth side magnet 3134, or integrally formed with the third side magnet 3133 and the fourth side magnet 3134 to form an H-shaped magnet, or integrally formed with one of the third side magnet 3133 and the fourth side magnet 3134 to form one T-shaped magnet and one strip-shaped magnet. This is not specifically limited herein.

The first side magnet 3131, the second side magnet 3132, the third side magnet 3133, and the fourth side magnet 3134 respectively have a top surface 3131*a*, a top surface 3132*a*, a top surface 3133*a*, and a top surface 3134*a*. The four top surfaces form the top surface of the side magnet 313. The first side magnet 3131, the second side magnet 3132, the third side magnet 3133, and the fourth side magnet 3134 further respectively have a bottom surface 3131*b*, a bottom surface 3132*b*, a bottom surface 3133*b*, and a bottom surface 3134*b*. The four bottom surfaces form the bottom surface of the side magnet 313.

In some other embodiments, the side magnet 313 may alternatively include more than four magnets, and may alternatively include an annular magnet circumferentially disposed around the central magnet set. This is not specifically limited herein.

The top surface 3131*a* of the first side magnet 3131 includes a first accommodating groove 3131*c*. The top surface 3131*a* of the first side magnet 3131 is separated by the first accommodating groove 3131*c* into an inner side region and an outer side region. The inner side region is located on an inner side of the first accommodating groove 3131*c*. The outer side region is located on an outer side of the first accommodating groove 3131*c*.

The top surface 3132*a* of the second side magnet 3132 includes a second accommodating groove 3132*c*. The top surface 3132*a* of the second side magnet 3132 is separated by the second accommodating groove 3132*c* into an inner side region and an outer side region. The inner side region is located on an inner side of the first accommodating groove 3131*c*. The outer side region is located on an outer side of the first accommodating groove 3131*c*.

Figure 46:
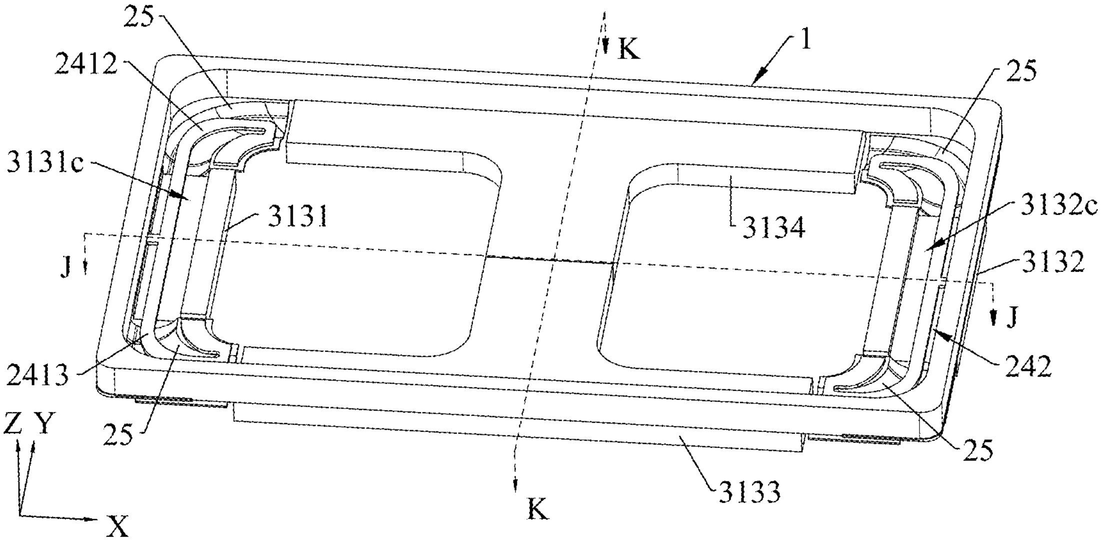
FIG. 46 is an assembly diagram of a side magnet in the magnetic circuit system shown in FIG. 45 and the basket, the second electrical connection structure, and the four auxiliary diaphragms shown in FIG. 41.
Figure 47:
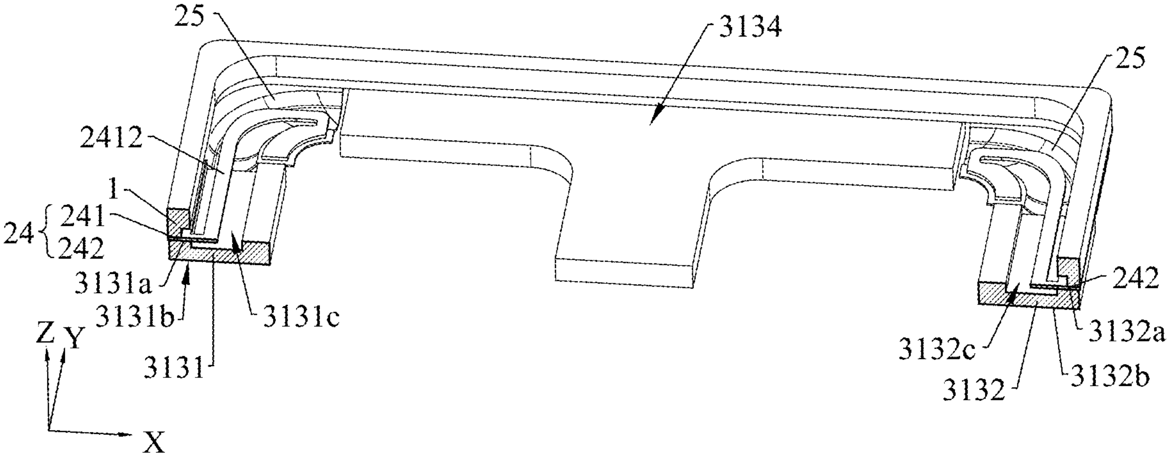
FIG. 47 is a three-dimensional sectional view of an assembly structure shown in FIG. 46 in a line J-J.

Refer to FIG. 46 and FIG. 47. FIG. 46 is an assembly diagram of the side magnet 313 in the magnetic circuit system 3 shown in FIG. 45 and the basket 1, the second electrical connection structure 24, and the four auxiliary diaphragms 25 shown in FIG. 41. FIG. 47 is a three-dimensional sectional view of an assembly structure shown in FIG. 46 in a line J-J.

The top surface 3131*a* of the first side magnet 3131 is fastened to a surface, away from the basket 1, of the first electrical connection unit 241 in the second electrical connection structure 24. Specifically, the first side magnet 3131 is fastened, by using an outer side region of the top surface 3131*a*, to a surface, away from the basket 1, of a body 2411 in the first electrical connection unit 214. A first branch 2412 and a second branch 2413 of the first electrical connection unit 241 are partially located at openings of the first accommodating groove 3131*c*.

Similarly, the top surface 3132*a* of the second side magnet 3132 is fastened to a surface, away from the basket 1, of the second electrical connection unit 242 in the second electrical connection structure 24. Specifically, the second side magnet 3132 is fastened, by using an outer side region of the top surface 3132*a*, to a surface, away from the basket 1, of a body in the second electrical connection unit 242. A first branch and a second branch of the second electrical connection unit 242 are partially located at openings of the second accommodating groove 3132*c*.

In this way, the first side magnet 3131 and the second side magnet 3132 are indirectly fastened to the basket 1 by using the second electrical connection structure 24, and the first accommodating groove 3131*c* and the second accommodating groove 3132*c* allow the second electrical connection structure 24 to move in a direction close to the magnet assembly 31.

The four auxiliary diaphragms 25 are respectively located in a gap between two adjacent side magnets.

Figure 48:
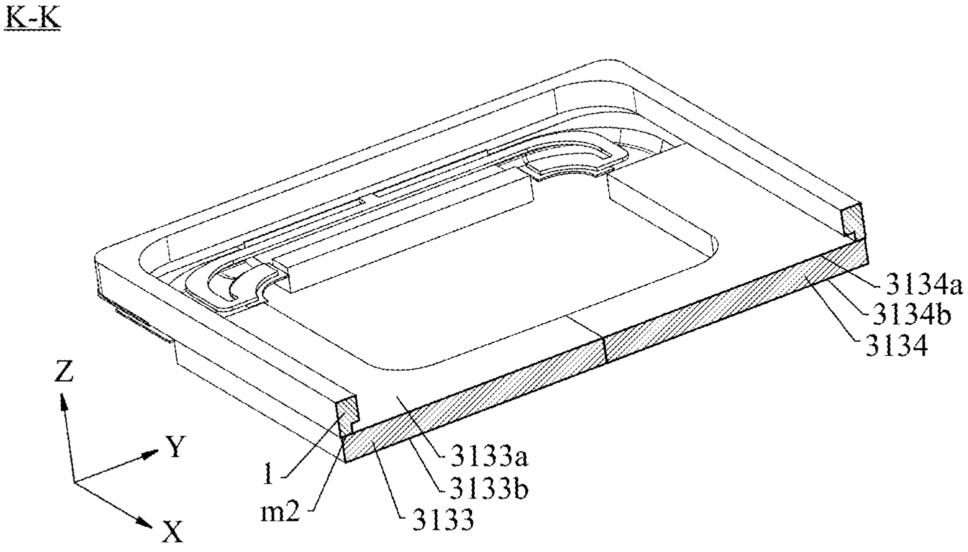
FIG. 48 is a three-dimensional sectional view of an assembly structure shown in FIG. 46 in a line K-K.

FIG. 48 is a three-dimensional sectional view of an assembly structure shown in FIG. 46 in a line K-K. The third side magnet 3133 and the fourth side magnet 3134 are fastened to a bottom surface m2 of the basket 1. Specifically, the third side magnet 3133 and the fourth side magnet 3134 are respectively fastened to the bottom surface m2 of the basket 1 by using the top surface 3133*a* and the top surface 3134*a*. In this way, the third side magnet 3133 and the fourth side magnet 3134 are directly fastened to the basket 1.

Figure 49:
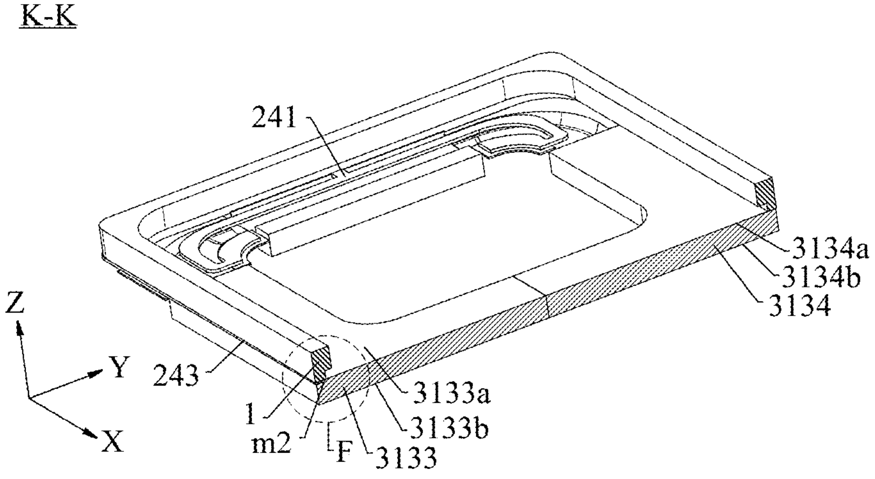
FIG. 49 is another three-dimensional sectional view of an assembly structure shown in FIG. 46 in a line K-K.
Figure 50:
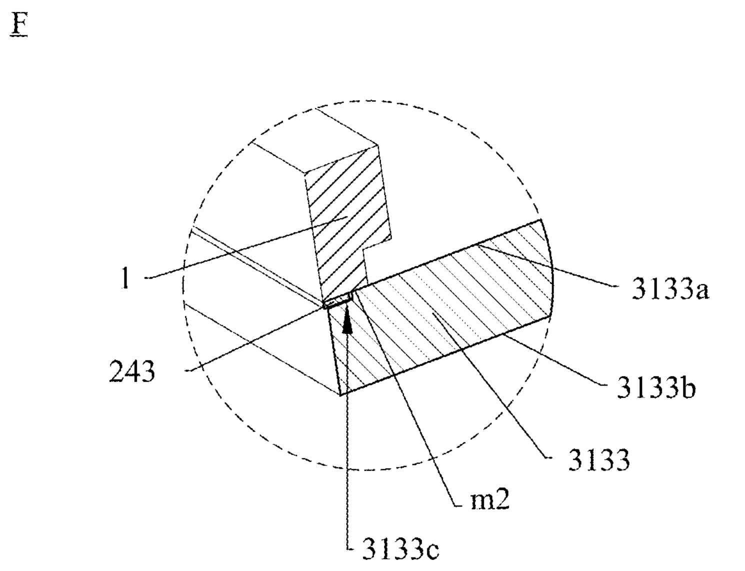
FIG. 50 is a partially enlarged view of a region F in FIG. 49.

Based on this, if the second electrical connection structure 24 further includes the electrical connection segment 243 (refer to FIG. 36) in addition to the first electrical connection unit 241 and the second electrical connection unit 242, refer to FIG. 49 and FIG. 50. FIG. 49 is another three-dimensional sectional view of an assembly structure shown in FIG. 46 in a line K-K. FIG. 50 is a partially enlarged view of a region F in FIG. 49. A third accommodating groove 3133*c* is disposed on a top surface 3133*a* of a third side magnet 3133. The third accommodating groove 3133*c* is configured to receive the electrical connection segment 243. This can ensure assembling accuracy of the core 603.

Figure 51:
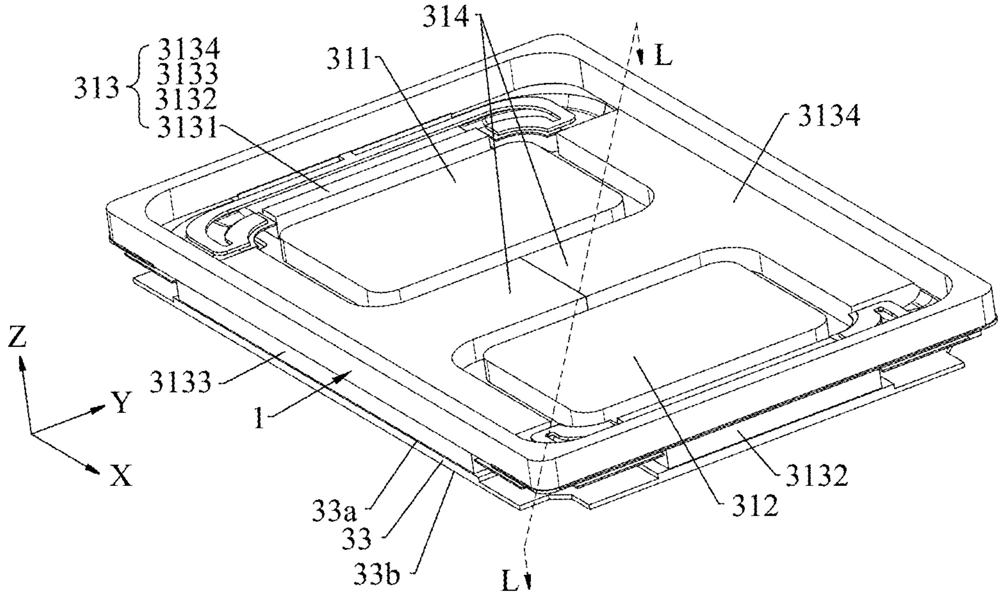
FIG. 51 is an assembly diagram of an assembly structure shown in FIG. 46 and a second magnetically conductive yoke, a first central magnet, a second central magnet, and an inner magnet.

Refer to FIG. 45 and FIG. 51. FIG. 51 is an assembly diagram of an assembly structure shown in FIG. 46 and the second magnetically conductive yoke 33, the first central magnet 311, the second central magnet 312, and the inner magnet 314. The second magnetically conductive yoke 33 is fastened to a bottom surface of the side magnet 313 in the magnet assembly 31. Specifically, the second magnetically conductive yoke 33 includes a top surface 33*a* and a bottom surface 33*b* that are opposite to each other, and the second magnetically conductive yoke 33 is configured to be fastened to the bottom surface of the side magnet 313 by using the top surface 33*a*.

The second magnetically conductive yoke 33 is rectangularly plate-shaped. Avoidance grooves 33*c* are disposed in four corner regions of edges of the top surface 33*a* of the second magnetically conductive yoke 33. Notches 33*d* are disposed in four corners of edges of the second magnetically conductive yoke 33. The bottom surface 33*b* of the second magnetically conductive yoke 33 forms a bottom surface of the core 603.

Figure 52:
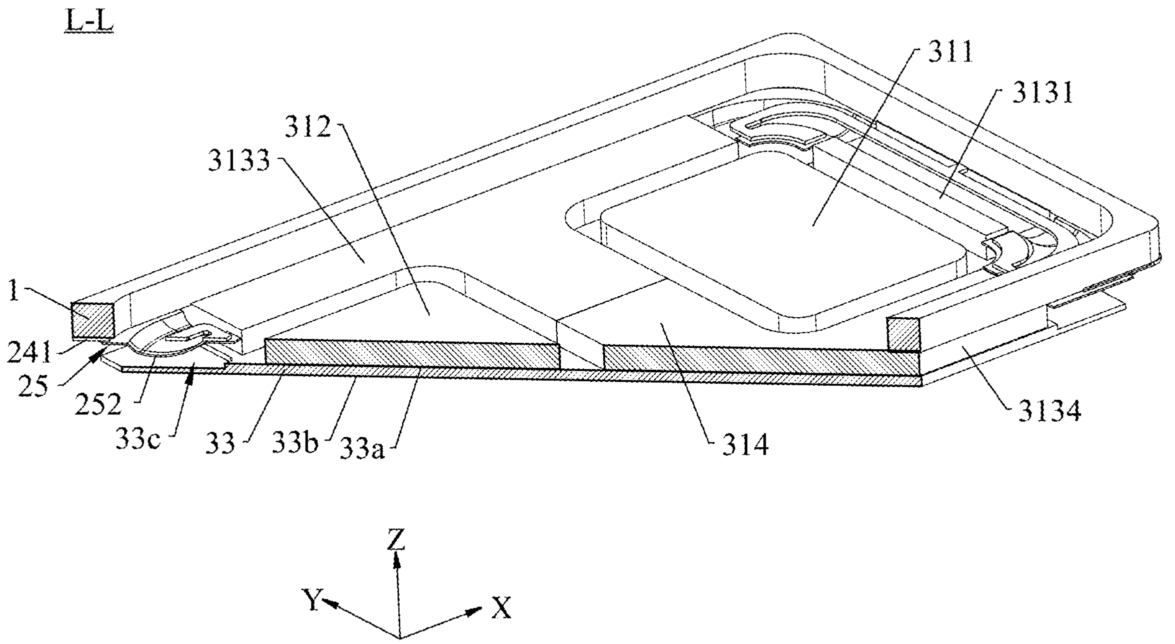
FIG. 52 is a three-dimensional sectional view of an assembly structure shown in FIG. 51 in a line L-L.

FIG. 52 is a three-dimensional sectional view of an assembly structure shown in FIG. 51 in a line L-L. The avoidance groove 33*c* is configured to avoid a bent annular part 252 of an auxiliary diaphragm 25, to reduce a thickness of the core 603 in the Z-axis direction while ensuring movement space of the bent annular part 252.

Figure 53:
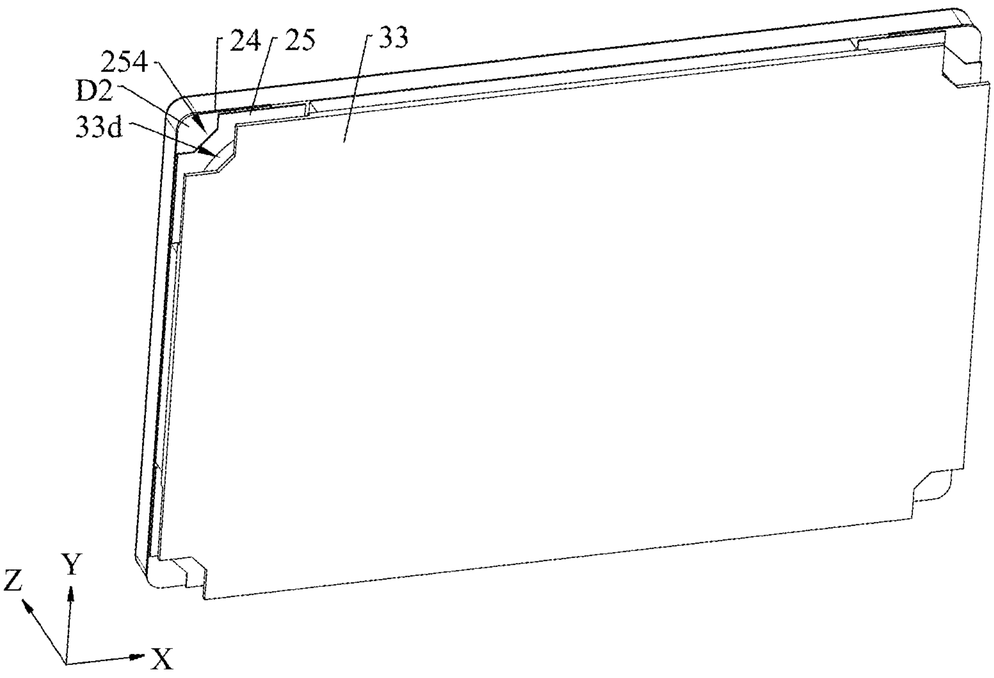
FIG. 53 is a schematic diagram of a structure of an assembly structure shown in FIG. 51 when viewed from the bottom up.

FIG. 53 is a schematic diagram of a structure of the assembly structure shown in FIG. 51 when viewed from the bottom up. A function of the notch 33*d* is the same as a function of the notch 254 on the auxiliary diaphragm 25 shown in FIG. 40. The functions are both exposing the second end D2 of the second electrical connection structure 24, to help to externally connect the first electrical connection structure 604 in FIG. 10.

Still refer to FIG. 51 and FIG. 52. The first central magnet 311, the second central magnet 312, and the inner magnet 314 in the magnet assembly 31 may be fastened to a central region of the top surface 33*a* of the second magnetically conductive yoke 33, and are in magnetic contact with the second magnetically conductive yoke 33.

Refer to FIG. 45. The first magnetically conductive yoke 32 is disposed on a side, away from the second magnetically conductive yoke 33, of the magnet assembly 31. In some embodiments, the first magnetically conductive yoke 32 includes a first central magnetically conductive yoke 321, a second central magnetically conductive yoke 322, an edge magnetically conductive yoke 323, and an inner magnetically conductive yoke 324.

The first central magnetically conductive yoke 321 is disposed on a top surface 311*a* of the first central magnet 311. The second central magnetically conductive yoke 322 is disposed on a top surface 311*a* of the second central magnet 312. In some embodiments, a shape size of the first central magnetically conductive yoke 321 may be the same as a shape size of the first central magnet 311, and a shape size of the second central magnetically conductive yoke 322 may be the same as a shape size of the second central magnet 312.

Figure 54:
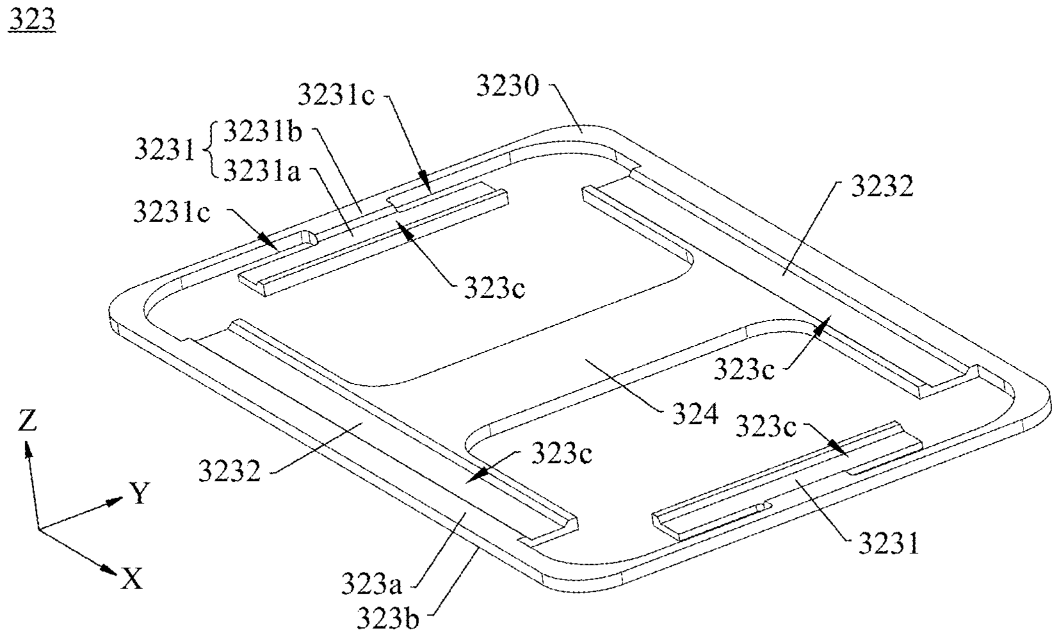
FIG. 54 is a schematic diagram of a structure of an edge magnetically conductive yoke in the magnetic circuit system shown in FIG. 45.

The edge magnetically conductive yoke 323 is disposed on the top surface of the side magnet 313. FIG. 54 is a schematic diagram of a structure of the edge magnetically conductive yoke 323 in the magnetic circuit system 3 shown in FIG. 45. The edge magnetically conductive yoke 323 includes a top surface 323*a* and a bottom surface 323*b* that are opposite to each other. An avoidance groove 323*c* is provided at the top surface 323*a* of the edge magnetically conductive yoke 323.

Figure 55:
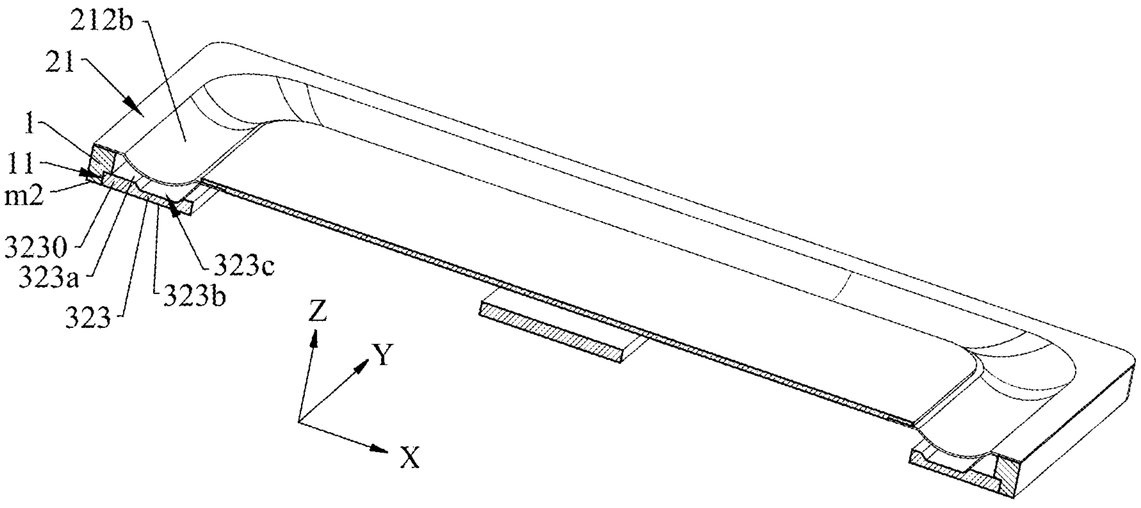
FIG. 55 is a three-dimensional sectional view of an assembly structure of the edge magnetically conductive yoke shown in FIG. 54, a basket, and a diaphragm assembly.

FIG. 55 is a three-dimensional sectional view of an assembly structure of the edge magnetically conductive yoke 323 shown in FIG. 54, the basket 1, and the diaphragm assembly 21. The top surface 323*a* of the edge magnetically conductive yoke 323 faces the diaphragm assembly 21, and the avoidance groove 323*c* is configured to avoid a bent annular part 212*b* of a diaphragm 212 in the diaphragm assembly 21, to reduce a thickness of the core 603 in a Z-axis direction while ensuring vibration space of the diaphragm assembly 21.

Still refer to FIG. 54. The edge magnetically conductive yoke 323 includes a connecting frame part 3230, two first magnetically conductive parts 3231 and two second conducting magnetically conductive parts 3232 that are located on an inner side of the connecting frame part 3230. Refer to FIG. 55. The connecting frame part 3230 is disposed in a fastening groove 11 of the basket 1. A top surface of the connecting frame part 3230 is fastened to a top surface of the fastening groove 11. In some embodiments, a bottom surface of the connecting frame part 3230 is flush with a bottom surface m2 of the basket 1, to help to fasten the second electrical connection structure 24.

The connecting frame part 3230 is rectangularly frame-shaped. The two first magnetically conductive parts 3231 are symmetrically connected to two sides of the connecting frame part 3230. The two second magnetically conductive parts 3232 are symmetrically connected to the other two sides of the connecting frame part 3230.

The first magnetically conductive part 3231 is approximately of a T-shape, and the first magnetically conductive part 3231 includes a first part 3231*a* and a second part 3231*b*. The second part 3231*b* is connected to the first part 3231*a* and the connecting frame part 3230. An avoidance gap 3231*c* is formed on both sides of the second part 3231*b* of the first magnetically conductive part 3231. The avoidance gap 3231*c* is located between the first part 3231*a* of the first magnetically conductive part 3231 and the connecting frame part 3230.

Figure 56:
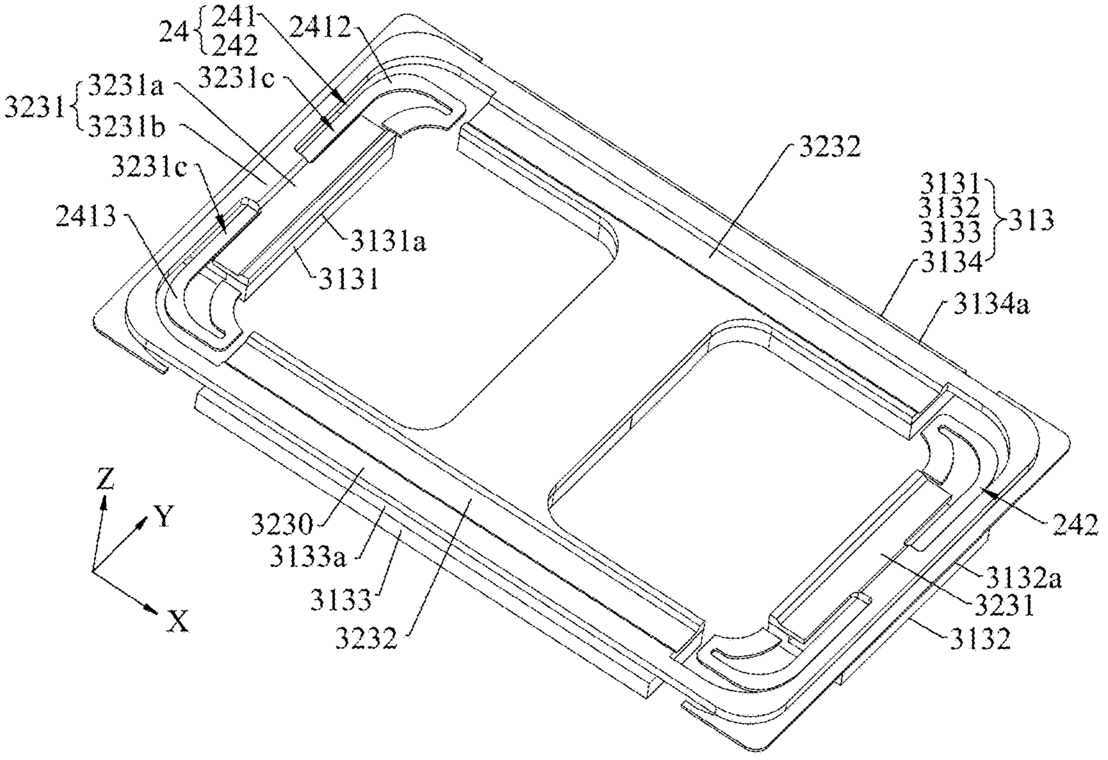
FIG. 56 is an assembly diagram of the edge magnetically conductive yoke shown in FIG. 54, a second electrical connection structure, and a side magnet.

FIG. 56 is an assembly diagram of the edge magnetically conductive yoke 323 shown in FIG. 54, a second electrical connection structure 24, and a side magnet 313. The first side magnet 3131 and the second side magnet 3132 are respectively opposite to two first magnetically conductive parts 3231 and a part of a connecting frame part 3230, and are respectively fastened to first parts 3231*a* of the two first magnetically conductive parts 3231 by using an inner side region of the top surface 3131*a* of the first side magnet 3131 and an inner side region of the top surface 3132*a* of the second side magnet 3132.

Refer to FIG. 45 and FIG. 56. The third side magnet 3133 and the fourth side magnet 3134 are respectively opposite to two second magnetically conductive parts 3232 and a part of the connecting frame part 3230, and are respectively fastened to the two second magnetically conductive parts 3232 and the part of the connecting frame part 3230 by using the top surface 3133*a* of the third side magnet 3133 and the top surface 3134*a* of the fourth side magnet 3134.

Still refer to FIG. 56. The avoidance gap 3231*c* is used to avoid a first branch 2412 and a second branch 2413 of the first electrical connection unit 241 and a first branch and a second branch of the second electrical connection unit 242 in the second electrical connection structure 24. This enables the second electrical connection unit 242 to have movement space close to the edge magnetically conductive yoke 323.

Refer to FIG. 54. The inner magnetically conductive yoke 324 is located between the two second magnetically conductive parts 3232 of the edge magnetically conductive yoke 323, and the inner magnetically conductive yoke 324 is located between the first central magnetically conductive yoke 321 and the second central magnetically conductive yoke 322 in FIG. 45. In some embodiments, the inner magnetically conductive yoke 324 is integrally formed with the edge magnetically conductive yoke 323, to reduce structure composition complexity of the core 603. In some other embodiments, the inner magnetically conductive yoke 324 may alternatively be disposed to be separated from the edge magnetically conductive yoke 323. This is not specifically limited herein.

Figure 57:
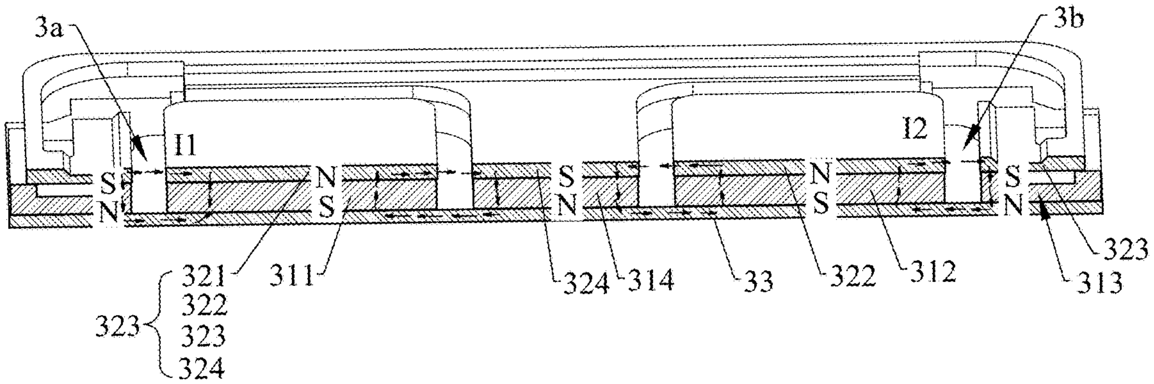
FIG. 57 is a three-dimensional sectional view of the magnetic circuit system shown in FIG. 44 in a line M-M.

FIG. 57 is a three-dimensional sectional view of the magnetic circuit system 3 shown in FIG. 44 in a line M-M. An inner magnetically conductive yoke 324 is disposed on a surface, away from the second magnetically conductive yoke 33, of the inner magnet 314 and in magnetic contact with the inner magnet 314. In this way, the inner magnet 314 forms an inner magnetically conductive part of the magnetic circuit system 3.

In this way, a first annular magnetic gap 3*a* surrounding the first central magnet 311 is formed between the side magnet 313, the inner magnetically conductive part, and the first central magnet 311, and a second annular magnetic gap 3*b* surrounding the second central magnet 312 is formed between the side magnet 313, the inner magnetically conductive part, and the second central magnet 312.

Based on this, still refer to FIG. 57. A magnetization direction of the second central magnet 312 is the same as a magnetization direction of the first central magnet 311. It should be noted that the magnetization direction means a direction from an N-pole to an S-pole in a magnet. For example, refer to FIG. 57. One end, close to a first central magnetically conductive yoke 321, of the first central magnet 311 is an N-pole, and one end close to a second magnetically conductive yoke 33 is an S-pole. One end, close to the second central magnetically conductive yoke 322, of the second central magnet 312 is an N-pole, and one end close to the second magnetically conductive yoke 33 is an S-pole.

A magnetization direction of the side magnet 313 is opposite to the magnetization direction of the first central magnet 311. For example, still refer to FIG. 57. One end, close to an edge magnetically conductive yoke 323, of the side magnet 313 is an S-pole, and one end close to the second magnetically conductive yoke 33 is an N-pole.

A magnetization direction of the inner magnet 314 is the same as a magnetization direction of the side magnet 313. For example, still refer to FIG. 57. One end, close to the inner magnetically conductive yoke 324, of the inner magnet 314 is an S-pole, and one end close to the second magnetically conductive yoke 33 is an N-pole.

In this way, two magnetic loops I1 and I2 are formed in the magnetic circuit system 3.

A path of the magnetic loop I1 is as follows: the first central magnet 311—the first central magnetically conductive yoke 321—the first magnetic gap 3*a*—the edge magnetically conductive yoke 323 and the inner magnetically conductive yoke 324—the side magnet 313 and the inner magnet 314—the second magnetically conductive yoke 33—the first central magnet 311.

A path of the magnetic loop I2 is as follows: the second central magnet 312—the second central magnetically conductive yoke 322—the second magnetic gap 3*b*—the edge magnetically conductive yoke 323 and the inner magnetically conductive yoke 324—the side magnet 313 and the inner magnet 314—the second magnetically conductive yoke 33—the second central magnet 312.

Figure 58:
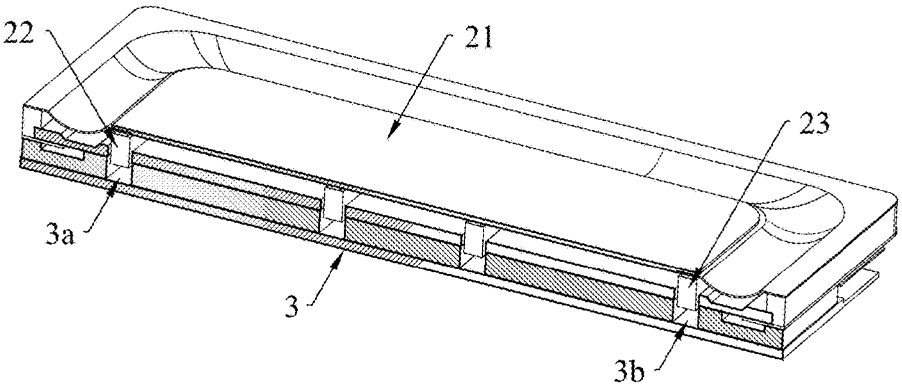
FIG. 58 is a three-dimensional sectional view of the core shown in FIG. 15 in a line N-N.

In this way, FIG. 58 is a three-dimensional sectional view of the core 603 shown in FIG. 15 in a line N-N. The magnetic circuit system 3 in FIG. 58 is the magnetic circuit system shown in FIG. 57. At least a part of the first voice coil set 22 extends into a first annular magnetic gap 3*a* of the magnetic circuit system 3. At least a part of the second voice coil set 23 extends into a second annular magnetic gap 3*b* of the magnetic circuit system 3. When the first voice coil set 22 and the second voice coil set 23 are powered on, the first voice coil set 22 and the second voice coil set 23 are respectively subject to Lorenz forces that are approximately the same in direction and magnitude under the action of a magnetic field in the first annular magnetic gap 3*a* and the second annular magnetic gap 3*b*, to synchronously drive a diaphragm assembly 21 to vibrate.

It should be noted that when a size of the core 603 in an XY plane is relatively small, a distance between the first voice coil set 22 and the second voice coil set 23 is relatively short, and a width of the inner magnet 314 is relatively small. Because a material of the magnet is usually relatively brittle, a small-sized inner magnet 314 cannot be processed in a current process. In this scenario, the inner magnet 314 may be replaced with another structure.

Figure 59:
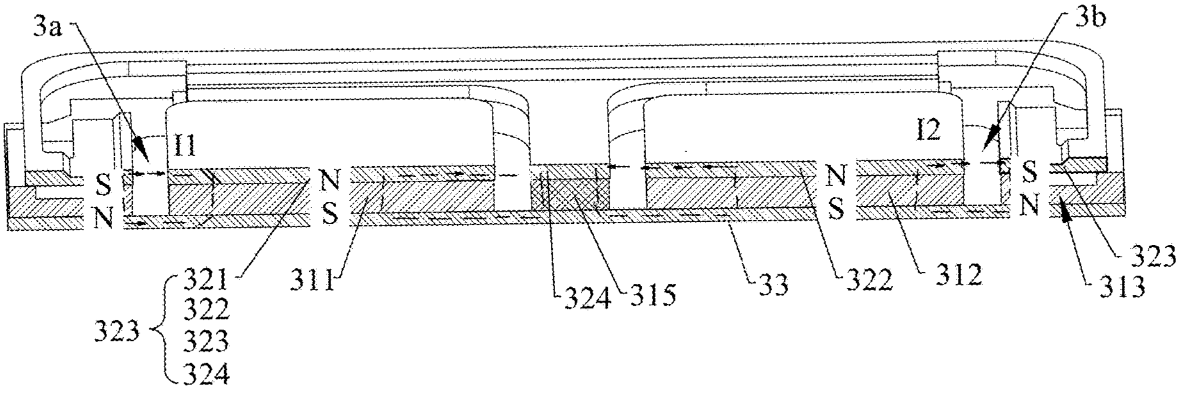
FIG. 59 is a three-dimensional sectional view of a magnetic circuit system according to some other embodiments of this application.

For example, FIG. 59 is a three-dimensional sectional view of a magnetic circuit system 3 according to some other embodiments of this application. A magnet assembly further includes an intermediate magnetically conductive yoke 315. The intermediate magnetically conductive yoke 315 is disposed within a gap between the first central magnet 311 and the second central magnet 312. In addition, a top surface of the intermediate magnetically conductive yoke 315 is in magnetic contact with an inner magnetically conductive yoke 324, and a bottom surface of the intermediate magnetically conductive yoke 315 is in magnetic contact with a second magnetically conductive yoke 33. The intermediate magnetically conductive yoke 315 forms an inner magnetically conductive part. The intermediate magnetically conductive yoke 315 is made of a magnetically conductive material such as yoke iron. The yoke iron has good toughness and is easy to process and form. Therefore, the yoke iron can replace the inner magnet 314 for use in a small-sized core 603.

Figure 60:
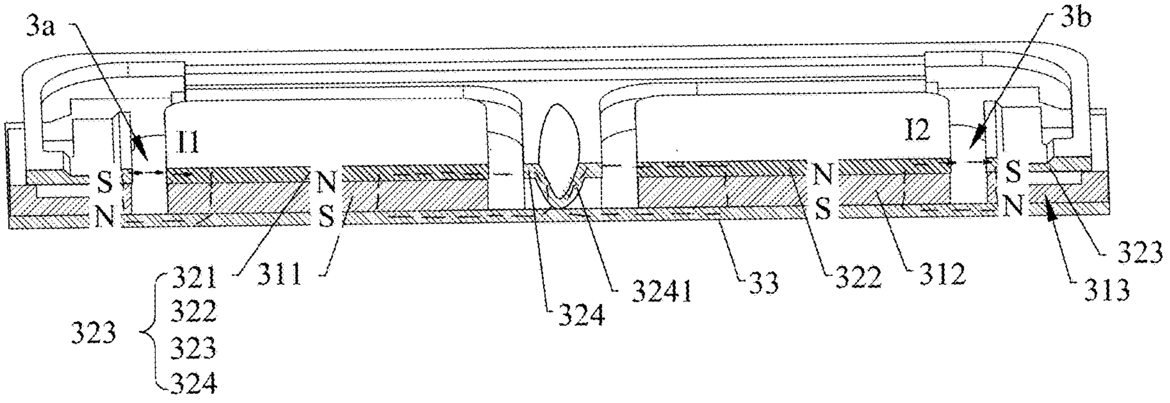
FIG. 60 is a three-dimensional sectional view of a magnetic circuit system according to some other embodiments of this application.

For another example, FIG. 60 is a three-dimensional sectional view of a magnetic circuit system 3 according to some other embodiments of this application. In this embodiment, an inner magnetically conductive yoke 324 includes a first protruding part 3241 that protrudes in a direction close to a second magnetically conductive yoke 33. The first protruding part 3241 is in magnetic contact with the second magnetically conductive yoke 33, and the first protruding part 3241 forms an inner magnetically conductive part. The inner magnetically conductive yoke 324 is made of a magnetically conductive material such as yoke iron. The yoke iron has good toughness and is easy to process and form. Therefore, a protruding part can be formed, to be magnetically connected to the second magnetically conductive yoke 33. In some embodiments, the first protruding part 3241 is molded by stamping.

Figure 61:
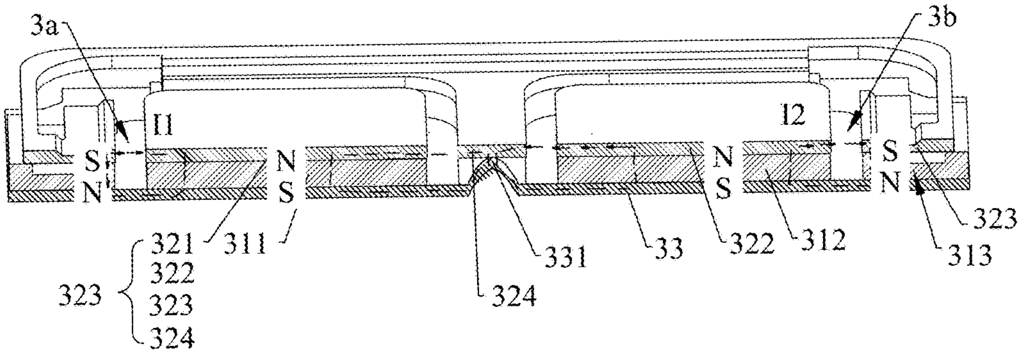
FIG. 61 is a three-dimensional sectional view of a magnetic circuit system according to some other embodiments of this application.

For another example, FIG. 61 is a three-dimensional sectional view of a magnetic circuit system 3 according to some other embodiments of this application. In this embodiment, a second magnetically conductive yoke 33 includes a second protruding part 331 that protrudes in a direction close to an inner magnetically conductive yoke 324. The second protruding part 331 is in magnetic contact with the inner magnetically conductive yoke 324. The second protruding part 331 forms an inner magnetically conductive part of the magnetic circuit system 3. In some embodiments, the second protruding part 331 is molded by stamping.

Figure 62:
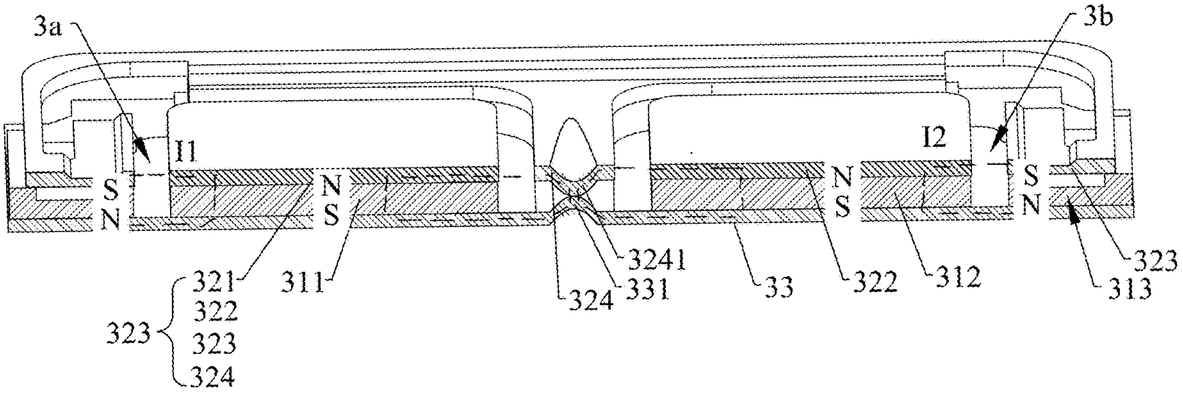
FIG. 62 is a three-dimensional sectional view of a magnetic circuit system according to some other embodiments of this application.

For another example, FIG. 62 is a three-dimensional sectional view of a magnetic circuit system 3 according to some other embodiments of this application. In this embodiment, an inner magnetically conductive yoke 324 includes a first protruding part 3241 that protrudes in a direction close to a second magnetically conductive yoke 33, the second magnetically conductive yoke 33 includes a second protruding part 331 that protrudes in a direction close to the inner magnetically conductive yoke 324. The first protruding part 3241 is in magnetic contact with the second protruding part 331. The first protruding part 3241 and the second protruding part 331 form an inner magnetically conductive part of the magnetic circuit system 3.

For the core 603 provided in this application, designing two voice coils enables the number of turns of voice coils to be far greater than the number of turns of a single voice coil, and a winding length of the voice coils to be longer. As the winding length L of the voice coils is increased, a corresponding power conversion coefficient BL is greater, and a driving force BLi of a speaker module is greater. In addition, on the premise that the driving force remains unchanged, a thickness of a voice coil set and a thickness of the magnetic circuit system may be reduced, to implement a thinning design of the core 603. Therefore, thinning and audio performance can be balanced to some extent for the core 603 provided in this application. In addition, driven by two voice coils, follow performance of parts of the diaphragm is good. This can not only meet a low frequency requirement, but also meet a high frequency requirement. Therefore, a high-frequency speaker module is not to be disposed in the electronic device. This can simplify a structure of the electronic device. In addition, voice coil mass Mms of the two voice coils is relatively large, and a BL of a multi-path magnetic circuit and the two voice coils are relatively large, to enable the speaker module to have a lower Fo and a larger amplitude. Therefore, better low-frequency performance and low-frequency sensitivity are obtained, a capability of playing sound on speaker is increased by 2 dB to 3 dB, greatly improving effect of playing sound on speaker.

It should be noted that, to further optimize a thickness and audio performance of the core 603, a quantity of voice coil sets in the core 603 may be further increased. For example, the quantity may be set to three, four, five, or the like. In addition, in the magnetic circuit system, inner magnetically conductive parts are formed between two adjacent voice coil sets, to form magnetic loops of a corresponding quantity. However, this may increase structural complexity of the core 603. In different application scenarios, cores 603 having voice coil sets with different quantities and magnetic loops with different quantities may be designed in different application scenarios, in consideration of thicknesses, audio performance, and structural complexity of the cores 603.

Because the speaker module 60 provided in the embodiments of this application includes the core 603 in any one of the foregoing embodiments, by using the speaker module 60 or the core 603, a same technical problem can be resolved, and same effect can be achieved.

Because the electronic device 100 provided in some embodiments of this application includes the foregoing speaker module 60, audio performance of the electronic device 100 can be improved while a thinning design of the electronic device 100 is met.

In the descriptions of this specification, specific features, structures, materials, or characteristics may be combined in a proper manner in any one or more of embodiments or examples.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A core, comprising a diaphragm assembly, a first voice coil set, a second voice coil set, and a magnetic circuit system, wherein the first voice coil set, the second voice coil set, and the magnetic circuit system are located on a same side of the diaphragm assembly, and the first voice coil set and the second voice coil set are fastened to the diaphragm assembly;

the magnetic circuit system comprises a magnet assembly, the magnet assembly comprises a first central magnet, a second central magnet, and a side magnet, the first central magnet is spaced apart from the second central magnet, the side magnet is circumferentially disposed around a central magnet set comprising the first central magnet and the second central magnet, a magnetization direction of the second central magnet is the same as a magnetization direction of the first central magnet, and a magnetization direction of the side magnet is opposite to the magnetization direction of the first central magnet, wherein the magnetic circuit system further comprises a first magnetically conductive yoke and a second magnetically conductive yoke, wherein the first magnetically conductive yoke comprises an inner magnetically conductive yoke, wherein the inner magnetically conductive yoke comprises a first protruding part that protrudes in a direction close to the second magnetically conductive yoke;

an inner magnetically conductive part is disposed in a gap between the first central magnet and the second central magnet, a first annular magnetic gap is formed between the side magnet, the inner magnetically conductive part, and the first central magnet, and a second annular magnetic gap is formed between the side magnet, the inner magnetically conductive part, and the second central magnet; and at least a part of the first voice coil set extends into the first annular magnetic gap, at least a part of the second voice coil set extends into the second annular magnetic gap, and the first voice coil set and the second voice coil set cooperate with the magnetic circuit system to synchronously drive the diaphragm assembly to vibrate.

2. The core according to claim 1, wherein the magnet assembly further comprises an inner magnet; and the inner magnet is disposed in a gap between the first central magnet and the second central magnet, a magnetization direction of the inner magnet is the same as a magnetization direction of the side magnet, and the inner magnet forms the inner magnetically conductive part.

3. The core according to claim 2, wherein the side magnet comprises a first side magnet, a second side magnet, a third side magnet, and a fourth side magnet;

the first side magnet and the second side magnet are respectively disposed on two opposite sides of the central magnet set, and an arrangement direction of the first side magnet and the second side magnet is the same as an arrangement direction of the first central magnet and the second central magnet in the central magnet set; and the third side magnet and the fourth side magnet are respectively disposed on two other opposite sides of the central magnet set, and an arrangement direction of the third side magnet and the fourth side magnet is perpendicular to the arrangement direction of the first central magnet and the second central magnet in the central magnet set.

4. The core according to claim 3, wherein the inner magnet is located between the third side magnet and the fourth side magnet, the inner magnet comprises a first inner magnet segment and a second inner magnet segment, the first inner magnet segment is disposed close to the third side magnet and integrally formed with the third side magnet, and the second inner magnet segment is disposed close to the fourth side magnet and integrally formed with the fourth side magnet.

5. The core according to claim 3, wherein the inner magnet is integrally formed with the third side magnet and the fourth side magnet.

6. The core according to claim 1, wherein the first magnetically conductive yoke is disposed on a surface, close to the diaphragm assembly, of the magnet assembly, and the second magnetically conductive yoke is disposed on a surface, away from the diaphragm assembly, of the magnet assembly; and the first magnetically conductive yoke is magnetically connected to the second magnetically conductive yoke in a gap between the first central magnet and the second central magnet to form the inner magnetically conductive part.

7. The core according to claim 6, wherein the first magnetically conductive yoke comprises a first central magnetically conductive yoke, a second central magnetically conductive yoke, and an edge magnetically conductive yoke;

the first central magnetically conductive yoke is disposed on a surface, close to the diaphragm assembly, of the first central magnet, and the second central magnetically conductive yoke is disposed on a surface, close to the diaphragm assembly, of the second central magnet;

the edge magnetically conductive yoke is disposed on a surface, close to the diaphragm assembly, of the side magnet; and the inner magnetically conductive yoke is disposed between the first central magnetically conductive yoke and the second central magnetically conductive yoke, and the inner magnetically conductive yoke is magnetically connected to the second magnetically conductive yoke in the gap between the first central magnet and the second central magnet, to form the inner magnetically conductive part.

8. The core according to claim 7, wherein the magnet assembly further comprises an intermediate magnetically conductive yoke; and the intermediate magnetically conductive yoke is disposed in the gap between the first central magnet and the second central magnet, a surface, close to the diaphragm assembly, of the intermediate magnetically conductive yoke is in magnetic contact with the inner magnetically conductive yoke, a surface, away from the diaphragm assembly, of the intermediate magnetically conductive yoke is in magnetic contact with the second magnetically conductive yoke, and the intermediate magnetically conductive yoke forms the inner magnetically conductive part.

9. The core according to claim 1, wherein the first protruding part is in magnetic contact with the second magnetically conductive yoke, and the first protruding part forms the inner magnetically conductive part.

10. The core according to claim 7, wherein the second magnetically conductive yoke comprises a second protruding part that protrudes in a direction close to the inner magnetically conductive yoke, the second protruding part is in magnetic contact with the inner magnetically conductive yoke, and the second protruding part forms the inner magnetically conductive part.

11. The core according to claim 7, wherein the second magnetically conductive yoke comprises a second protruding part that protrudes in a direction close to the inner magnetically conductive yoke, the first protruding part is in magnetic contact with the second protruding part, and the first protruding part and the second protruding part form the inner magnetically conductive part.

12. The core according to claim 1, further comprising a basket, wherein the first voice coil set and the second voice coil set are located in the basket; and the core further comprises a first electrical connection unit and a second electrical connection unit, the first electrical connection unit is connected between a positive electrode of the first voice coil set, a negative electrode of the first voice coil set, and the basket, and the second electrical connection unit is connected between a positive electrode of the second voice coil set, a negative electrode of the second voice coil set, and the basket.

13. The core according to claim 12, wherein the first electrical connection unit comprises two first ends and two second ends;

the two first ends of the first electrical connection unit are respectively connected to the positive electrode and the negative electrode of the first voice coil set, the two second ends of the first electrical connection unit are fastened to the basket, and in the first electrical connection unit, the two first ends of the first electrical connection unit are respectively electrically connected to the two second ends of the first electrical connection unit;

the second electrical connection unit comprises two first ends and two second ends; and the two first ends of the second electrical connection unit are respectively connected to the positive electrode and the negative electrode of the second voice coil set, the two second ends of the second electrical connection unit are fastened to the basket, and in the second electrical connection unit, the two first ends of the second electrical connection unit are respectively electrically connected to the two second ends of the second electrical connection unit.

14. The core according to claim 13, wherein the core further comprises an electrical connection segment, the electrical connection segment electrically connects one second end of the first electrical connection unit to one second end of the second electrical connection unit.

15. The core according to claim 1, wherein a basket comprises a first side and a second side that are opposite to each other; the first voice coil set is located between the first side and the second voice coil set, and the second voice coil set is located between the first voice coil set and the second side; and a first electrical connection unit is connected between a positive electrode of the first voice coil set, a negative electrode of the first voice coil set, and the first side, and a second electrical connection unit is connected between a positive electrode of the second voice coil set, a negative electrode of the second voice coil set, and the second side.

16. The core according to claim 15, wherein the positive electrode and the negative electrode of the first voice coil set are respectively located at two corners, away from the second voice coil set, of the first voice coil set, and the positive electrode and the negative electrode of the second voice coil set are respectively located at two corners, away from the first voice coil set, of the second voice coil set.

17. The core according to claim 1, further comprising a basket, wherein the first voice coil set and the second voice coil set are located in the basket; and the core further comprises a first electrical connection unit and a second electrical connection unit, the first electrical connection unit is connected between one electrode of the first voice coil set, one electrode of the second voice coil set, and the basket, and the second electrical connection unit is connected between the other electrode of the first voice coil set, the other electrode of the second voice coil set, and the basket.

18. The core according to claim 17, wherein the first electrical connection unit comprises two first ends and two second ends;

the two first ends of the first electrical connection unit are respectively connected to the electrode of the first voice coil set and the electrode of the second voice coil set, the two second ends of the first electrical connection unit are connected to the basket, and in the first electrical connection unit, the two first ends of the first electrical connection unit are respectively electrically connected to the two second ends of the first electrical connection unit; and the second electrical connection unit comprises two first ends, the two first ends of the second electrical connection unit are respectively connected to the other electrode of the first voice coil set and the other electrode of the second voice coil set, and the second electrical connection unit electrically connects the two first ends of the second electrical connection unit.

19. A speaker module, comprising a housing and a core disposed in the housing, wherein the housing is separated by a diaphragm assembly of the core into a front cavity and a rear cavity, a first voice coil set, a second voice coil set, and a magnetic circuit system of the core are located in the rear cavity, a sound output channel is disposed at the housing, and the front cavity is connected to the sound output channel, wherein, the core comprises the diaphragm assembly, the first voice coil set, the second voice coil set, and the magnetic circuit system, wherein the first voice coil set, the second voice coil set, and the magnetic circuit system are located on a same side of the diaphragm assembly, and the first voice coil set and the second voice coil set are fastened to the diaphragm assembly;

the magnetic circuit system comprises a magnet assembly, the magnet assembly comprises a first central magnet, a second central magnet, and a side magnet, the first central magnet is spaced apart from the second central magnet, the side magnet is circumferentially disposed around a central magnet set comprising the first central magnet and the second central magnet, a magnetization direction of the second central magnet is the same as a magnetization direction of the first central magnet, and a magnetization direction of the side magnet is opposite to the magnetization direction of the first central magnet, wherein the magnetic circuit system further comprises a first magnetically conductive yoke and a second magnetically conductive yoke, wherein the first magnetically conductive yoke comprises an inner magnetically conductive yoke, wherein the inner magnetically conductive yoke comprises a first protruding part that protrudes in a direction close to the second magnetically conductive yoke;

an inner magnetically conductive part is disposed in a gap between the first central magnet and the second central magnet, a first annular magnetic gap is formed between the side magnet, the inner magnetically conductive part, and the first central magnet, and a second annular magnetic gap is formed between the side magnet, the inner magnetically conductive part, and the second central magnet; and at least a part of the first voice coil set extends into the first annular magnetic gap, at least a part of the second voice coil set extends into the second annular magnetic gap, and the first voice coil set and the second voice coil set cooperate with the magnetic circuit system to synchronously drive the diaphragm assembly to vibrate.

20. An electronic device, comprising:

an external housing, a main board, and a speaker module, wherein the main board and the speaker module are disposed in the external housing, the speaker module is electrically connected to the main board, a sound output hole is provided at the external housing, and a sound output channel is connected to the sound output hole, wherein the speaker module comprises:

a core comprising a diaphragm assembly, a first voice coil set, a second voice coil set, and a magnetic circuit system, wherein the first voice coil set, the second voice coil set, and the magnetic circuit system are located on a same side of the diaphragm assembly, and the first voice coil set and the second voice coil set are fastened to the diaphragm assembly;

the magnetic circuit system comprises a magnet assembly, the magnet assembly comprises a first central magnet, a second central magnet, and a side magnet, the first central magnet is spaced apart from the second central magnet, the side magnet is circumferentially disposed around a central magnet set comprising the first central magnet and the second central magnet, a magnetization direction of the second central magnet is the same as a magnetization direction of the first central magnet, and a magnetization direction of the side magnet is opposite to the magnetization direction of the first central magnet, wherein the magnetic circuit system further comprises a first magnetically conductive yoke and a second magnetically conductive yoke, wherein the first magnetically conductive yoke comprises an inner magnetically conductive yoke, wherein the inner magnetically conductive yoke comprises a first protruding part that protrudes in a direction close to the second magnetically conductive yoke;

an inner magnetically conductive part is disposed in a gap between the first central magnet and the second central magnet, a first annular magnetic gap is formed between the side magnet, the inner magnetically conductive part, and the first central magnet, and a second annular magnetic gap is formed between the side magnet, the inner magnetically conductive part, and the second central magnet; and at least a part of the first voice coil set extends into the first annular magnetic gap, at least a part of the second voice coil set extends into the second annular magnetic gap, and the first voice coil set and the second voice coil set cooperate with the magnetic circuit system to synchronously drive the diaphragm assembly to vibrate.

* * * * *